(12) United States Patent
Kawamura

(10) Patent No.: US 10,558,025 B2
(45) Date of Patent: Feb. 11, 2020

(54) VARIABLE MAGNIFICATION OPTICAL SYSTEM AND IMAGE PICKUP APPARATUS USING THE SAME

(71) Applicant: OLYMPUS CORPORATION, Hachioji-shi, Tokyo (JP)

(72) Inventor: Kazuteru Kawamura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 422 days.

(21) Appl. No.: 15/479,673

(22) Filed: Apr. 5, 2017

(65) Prior Publication Data
US 2017/0293121 A1 Oct. 12, 2017

(30) Foreign Application Priority Data

Apr. 6, 2016 (JP) ................. 2016-076431
Apr. 6, 2016 (JP) ................. 2016-076432
Apr. 6, 2016 (JP) ................. 2016-076537

(51) Int. Cl.
*G02B 15/16* (2006.01)
*G02B 15/163* (2006.01)
(Continued)

(52) U.S. Cl.
CPC ............ *G02B 15/16* (2013.01); *G02B 15/163* (2013.01); *G02B 27/0025* (2013.01); *G02B 27/646* (2013.01)

(58) Field of Classification Search
CPC ............... G02B 27/46; G02B 27/0927; G02B 27/0075; G02B 27/58; G02B 2207/129; G02B 27/0025; G02B 27/0944; G02B 27/48; G02B 19/0014; G02B 19/0052; G02B 26/0808; G02B 27/0012;
(Continued)

(56) References Cited

U.S. PATENT DOCUMENTS 6,449,433 B2 9/2002 Hagimori et al.
7,126,759 B2 10/2006 Sensui
(Continued)

FOREIGN PATENT DOCUMENTS

JP H11223770 A 8/1999
JP 2001350093 A 12/2001
(Continued)

OTHER PUBLICATIONS

Office Action (Non Final Rejection) dated Jan. 14, 2019 issued in U.S. Appl. No. 15/479,714.
(Continued)

*Primary Examiner* — Evan P Dzierzynski
*Assistant Examiner* — Sharrief I Broome
(74) *Attorney, Agent, or Firm* — Holtz, Holtz & Volek PC

(57) ABSTRACT

A variable magnification optical system includes, sequentially from an object side, a first lens unit having a positive refractive power, a second lens unit having a negative refractive power, a third lens unit having a positive refractive power, a fourth lens unit, and a fifth lens unit having a positive refractive power, and each of the lens units makes a different movement relatively to a lens unit that is adjacently positioned at least at one of a time of changing magnification, a time of focusing, and a time of image stabilization.

65 Claims, 17 Drawing Sheets

(51) Int. Cl.
*G02B 27/00* (2006.01)
*G02B 27/64* (2006.01)

(58) Field of Classification Search
CPC .......... G02B 27/09; G02B 27/52; G02B 5/00; G02B 21/14; G02B 26/06; G02B 26/0841; G02B 27/0938; G02B 27/0988; G06E 3/00; G06E 3/003; G06E 1/00; G06E 3/005; G06E 3/001; G03H 1/22; G03H 1/2294; G03H 2001/085; G03H 2001/221; G03H 1/0005; G03H 1/08; G03H 1/0808; G03H 2001/0816; G03H 2210/12; G03H 2223/54; G03H 2225/31; G03H 2240/12; G03H 1/0011; G03H 1/02; G03H 1/0866; G03H 1/2205; G03H 1/265; G03H 1/32; G03H 2001/005; G03H 2001/0066
See application file for complete search history.

(56) References Cited

U.S. PATENT DOCUMENTS

| | | | |
|---|---|---|---|
| 8,605,362 B2 | 12/2013 | Ito | |
| 8,891,173 B2 | 11/2014 | Hagiwara | |
| 2009/0290232 A1 | 11/2009 | Hagiwara | |
| 2010/0053766 A1 | 3/2010 | Okada | |
| 2010/0134901 A1 | 6/2010 | Kimura | |
| 2011/0080653 A1 | 4/2011 | Kimura | |
| 2012/0300313 A1 | 11/2012 | Wada | |
| 2012/0314299 A1* | 12/2012 | Tashiro | G02B 13/0065 359/687 |
| 2014/0009652 A1 | 1/2014 | Sugita | |
| 2014/0009832 A1* | 1/2014 | Sugita | G02B 15/173 359/557 |
| 2014/0036137 A1 | 2/2014 | Inoue | |
| 2014/0118603 A1 | 5/2014 | Saito | |
| 2014/0218808 A1* | 8/2014 | Ogata | G02B 27/64 359/695 |
| 2015/0281588 A1 | 10/2015 | Izuhara et al. | |
| 2017/0108676 A1* | 4/2017 | Hori | G02B 15/173 |

FOREIGN PATENT DOCUMENTS

| | | |
|---|---|---|
| JP | 2005049843 A | 2/2005 |
| JP | 2007148056 A | 6/2007 |
| JP | 2011175098 A | 9/2011 |
| JP | 2011221554 A | 11/2011 |
| JP | 2012113285 A | 6/2012 |
| JP | 2014021256 A | 2/2014 |

OTHER PUBLICATIONS

Related U.S. Appl. No. 15/479,626, filed Apr. 5, 2017, First Named Inventor: Kazuteru Kawamura, Title: "Zoom Optical System and Image Pickup Apparatus Using the Same".

Related U.S. Appl. No. 15/479,714, filed Apr. 5, 2017, First Named Inventor: Kazuteru Kawamura, Title: "Variable Magnification Optical System and Image Pickup Apparatus Using the Same".

Notice of Allowance dated Jan. 18, 2019 issued in U.S. Appl. No. 15/479,626.

Japanese Office Action dated Nov. 28, 2019 (and English translation thereof) issued in Japanese Patent Application No. 2016-076537.

* cited by examiner

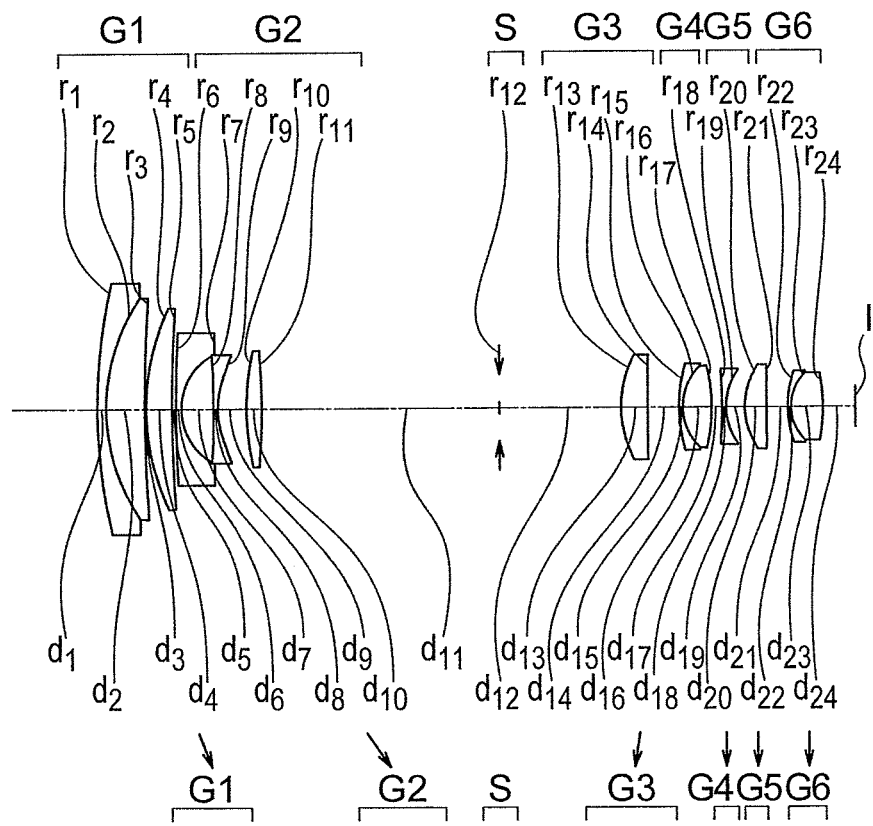
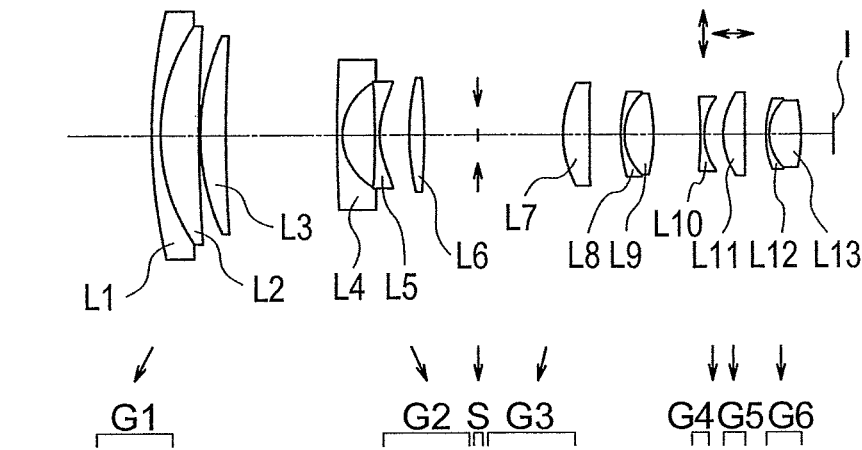
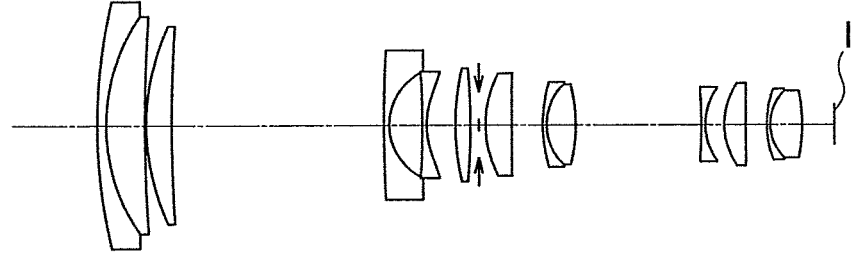

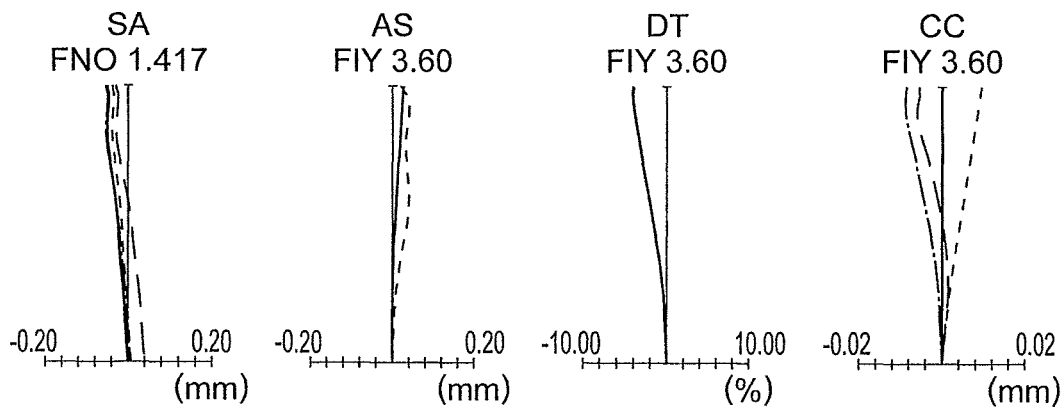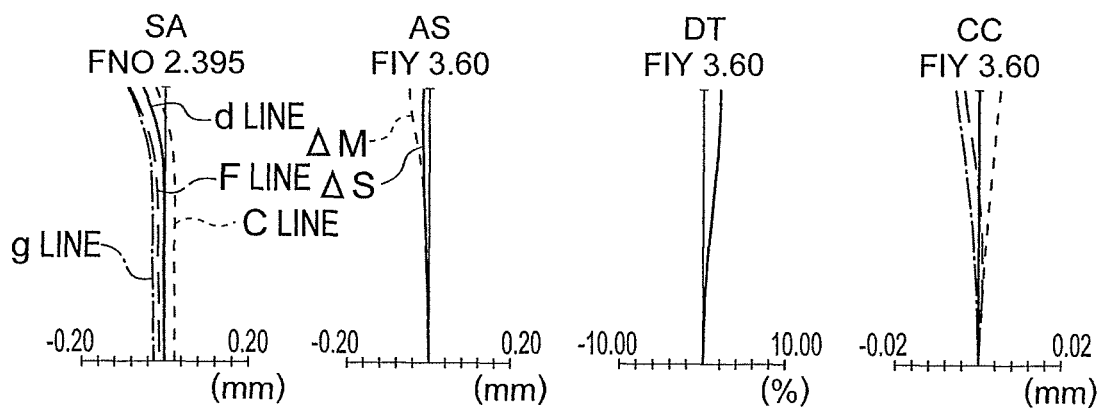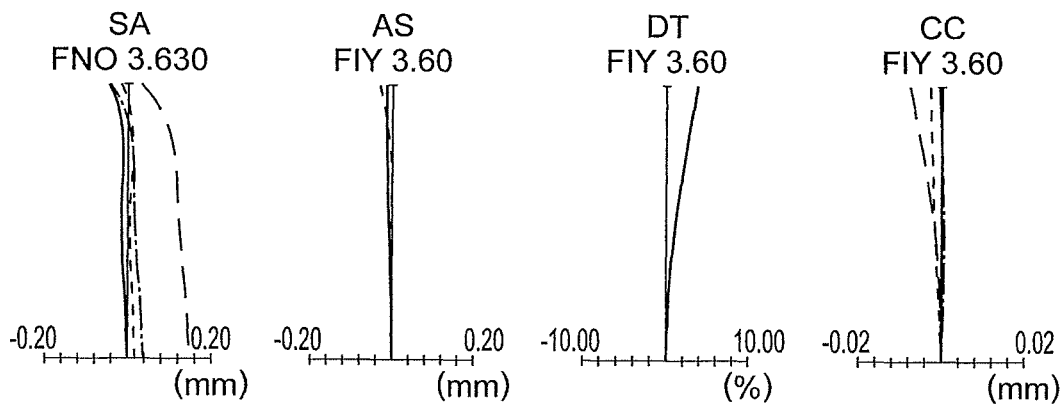

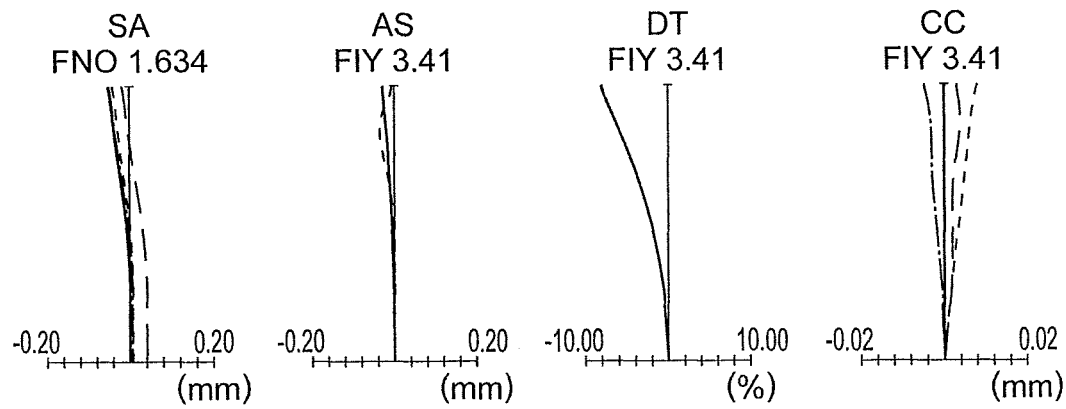
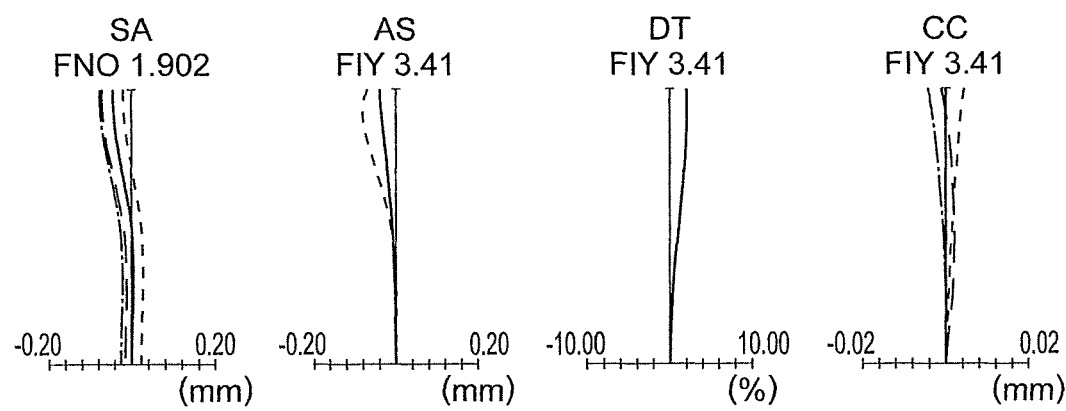
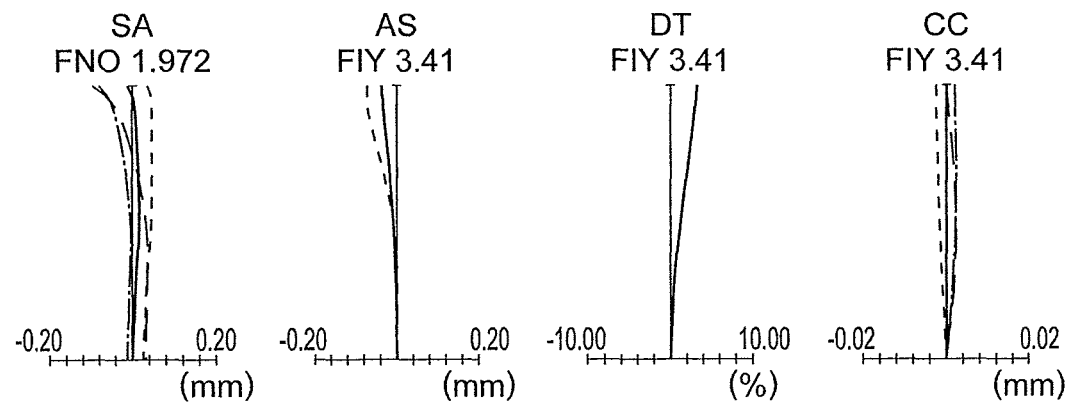

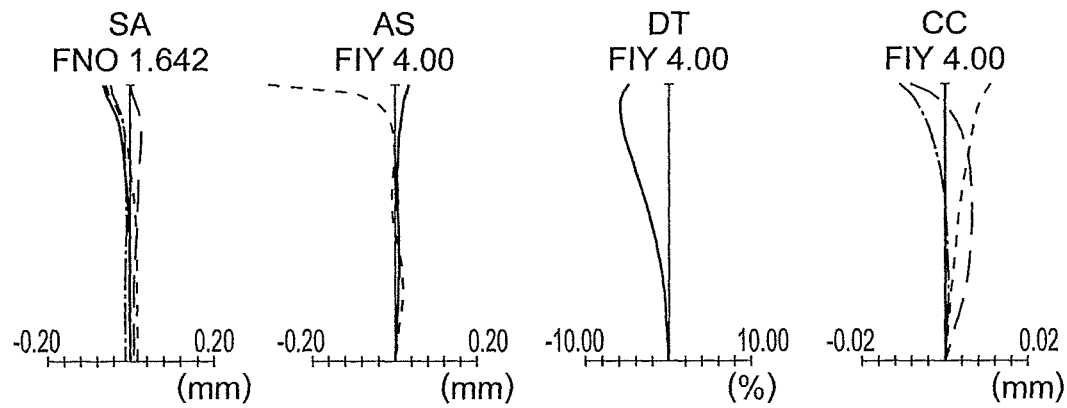
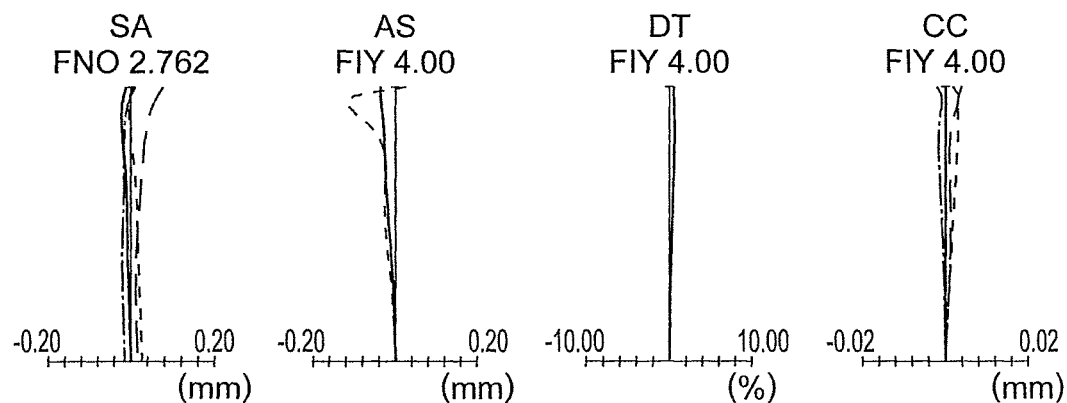
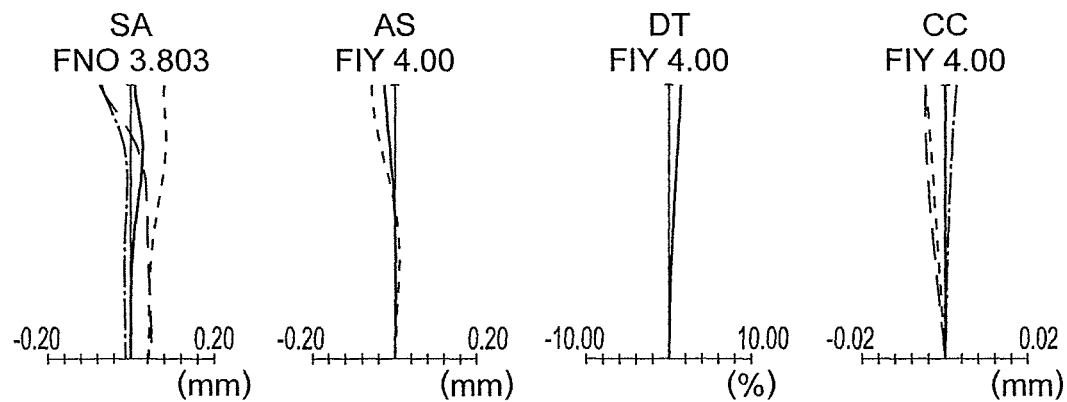

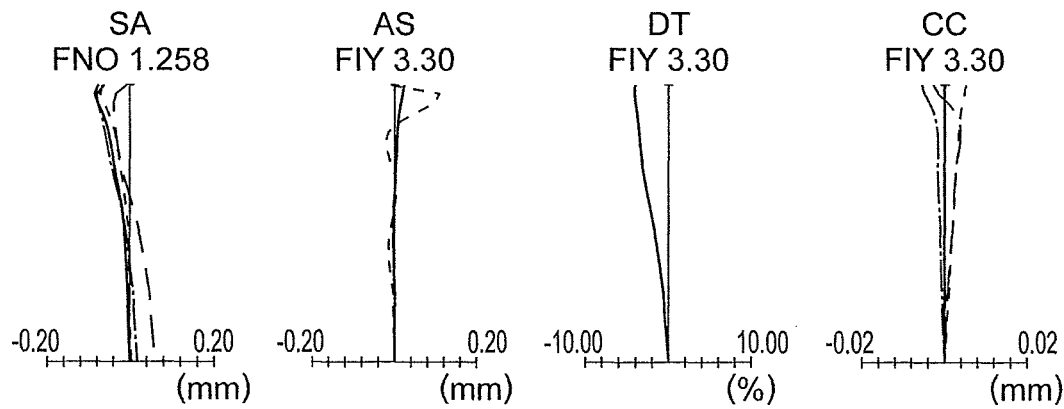
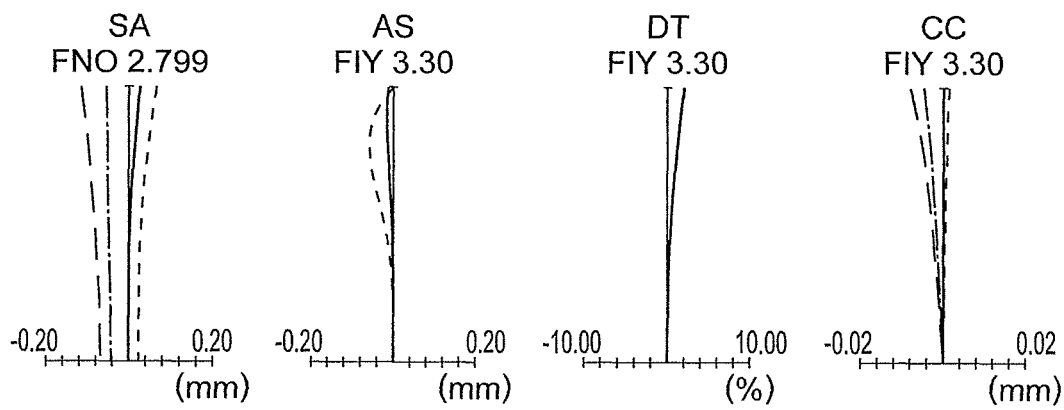
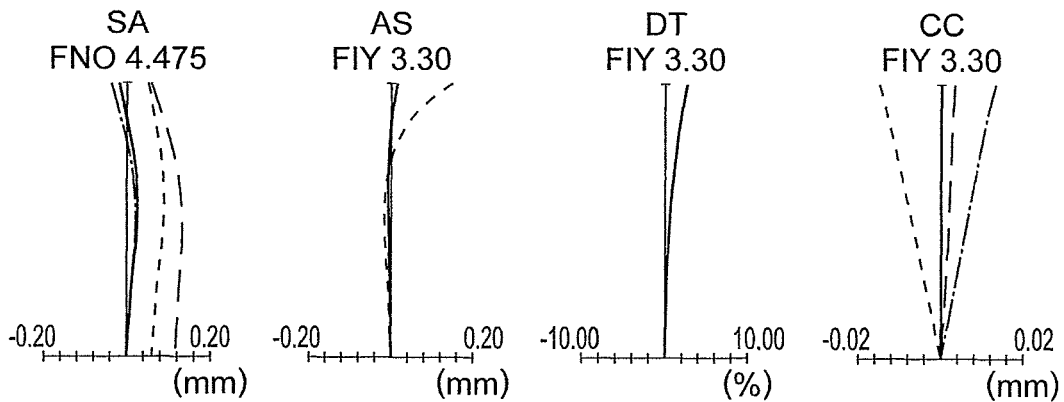

VARIABLE MAGNIFICATION OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2016-076537 filed on Apr. 6, 2016, 2016-076431 filed on Apr. 6, 2016 and 2016-076432 filed on Apr. 6, 2016; the entire contents of which are incorporated herein by reference.

BACKGROUND OF THE INVENTION

Field of the Invention

The present invention relates to a variable magnification optical system and an image pickup apparatus using the same.

Description of the Related Art

In recent years, image pickup optical systems are used in fields of wide range, such as digital cameras, video cameras, monitoring cameras, and cameras for television conference systems.

A zoom optical system is used for such image pickup optical systems. Examples of a zoom optical system are zoom optical systems disclosed in Japanese Patent Application Laid-open No. 2012-113285, Japanese Patent Application Laid-open No. 2011-221554, and Japanese Patent Application Laid-open No. 2001-350093. The zoom optical system disclosed in Japanese Patent Application Laid-open No. 2012-113285 includes, in order from the object side, a first lens unit having a negative refractive power, a second lens unit having a positive refractive power, a third lens unit having a negative refractive power, and a fourth lens unit having a positive refractive power.

The zoom optical systems disclosed in Japanese Patent Application Laid-open No. 2011-221554 and Japanese Patent Application Laid-open No. 2001-350093 include, in order from the object side, a first lens unit having a positive refractive power, a second lens unit having a negative refractive power, a third lens unit having a positive refractive power, a fourth lens unit having a negative refractive power, and a fifth lens unit having a positive refractive power.

SUMMARY OF THE INVENTION

A variable magnification optical system according to the present invention comprises:
sequentially from an object side,
a first lens unit having a positive refractive power;
a second lens unit having a negative refractive power;
a third lens unit having a positive refractive power;
a fourth lens unit;
a fifth lens unit having a positive refractive power, wherein
each of the lens units makes a different movement relatively to a lens unit that is adjacently positioned at least at one of a time of changing magnification, a time of focusing, and a time of image stabilization.

Moreover, an image pickup apparatus according to the present invention comprises:

an optical system; and
an image pickup element having an image pickup surface and converting an image formed on the image pickup surface with the optical system into an electrical signal, wherein
the variable magnification optical system is the variable magnification optical system described above.

BRIEF DESCRIPTION OF THE DRAWINGS

FIG. 4A, FIG. 4B, and FIG. 4C are lens cross-sectional views of a variable magnification optical system of Example 4;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams of the variable magnification optical system of Example 1;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams of the variable magnification optical system of Example 2;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams of the variable magnification optical system of Example 3;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams of the variable magnification optical system of Example 6;

DETAILED DESCRIPTION OF THE INVENTION

Figure 1A:
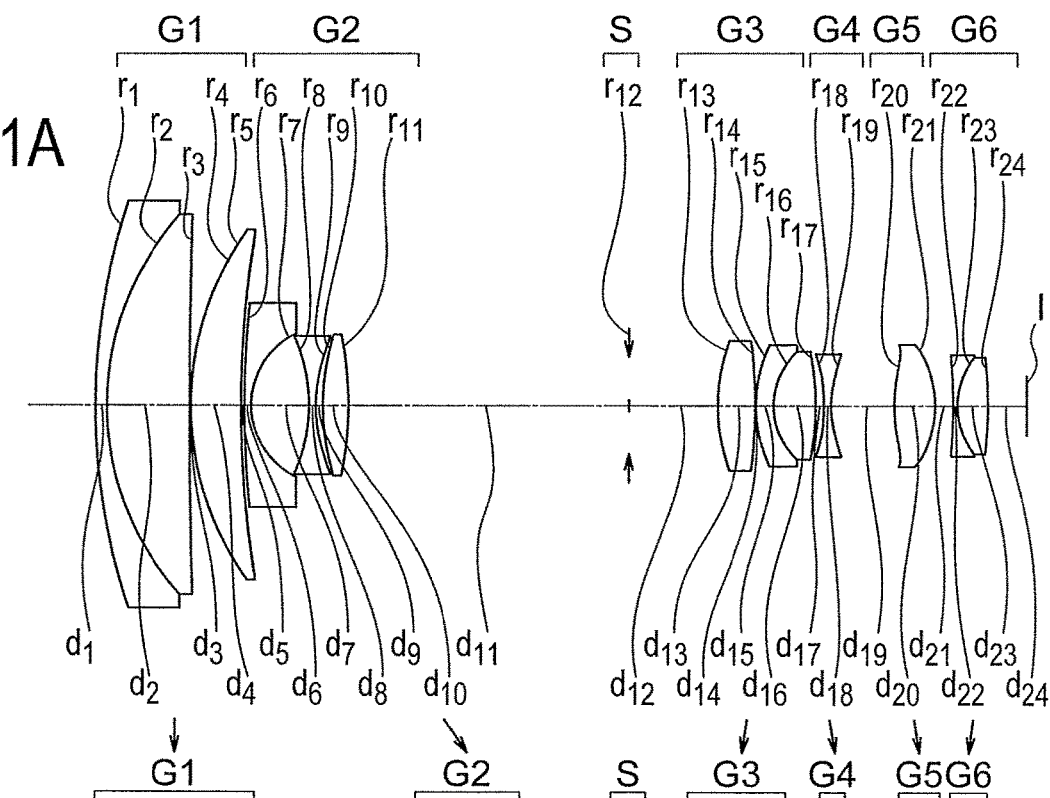
FIG. 1A, FIG. 1B, and FIG. 1C are lens cross-sectional views of a variable magnification optical system of Example 1.
Figure 1B:
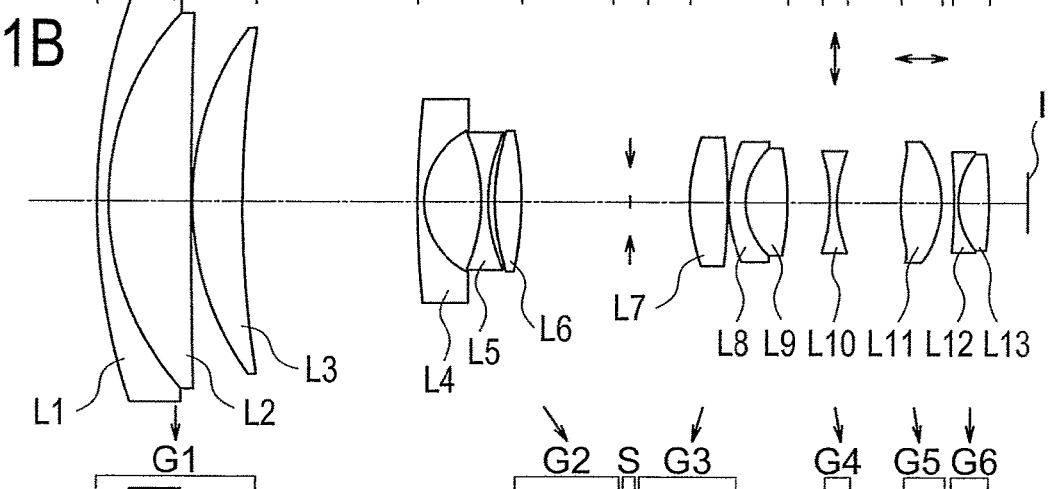
Figure 1C:
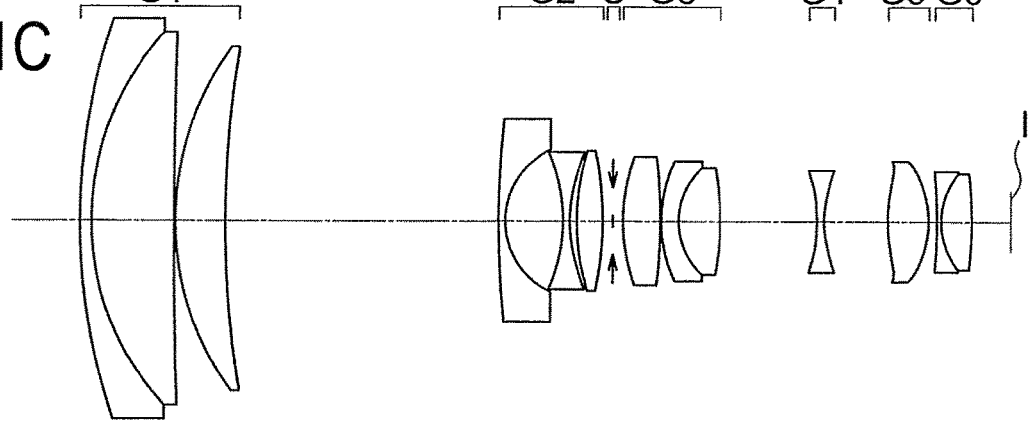
Figure 2A:
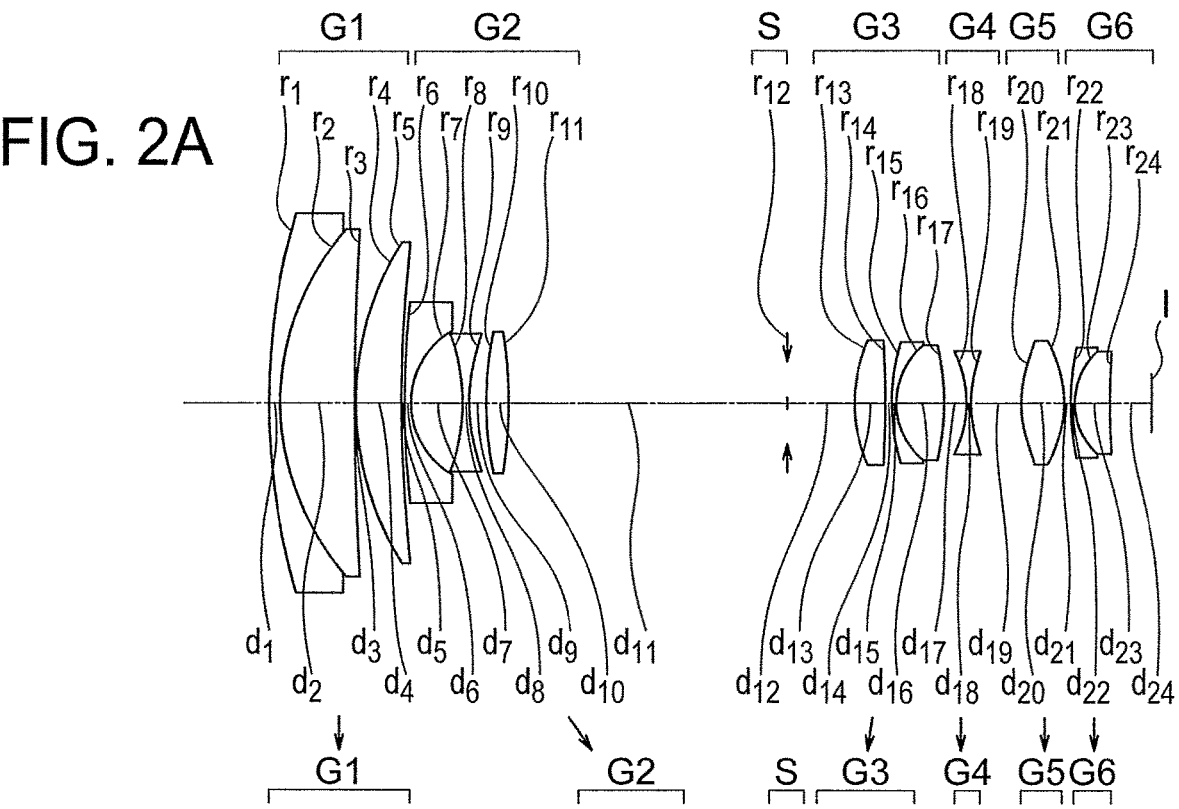
FIG. 2A, FIG. 2B, and FIG. 2C are lens cross-sectional views of a variable magnification optical system of Example 2.
Figure 2B:
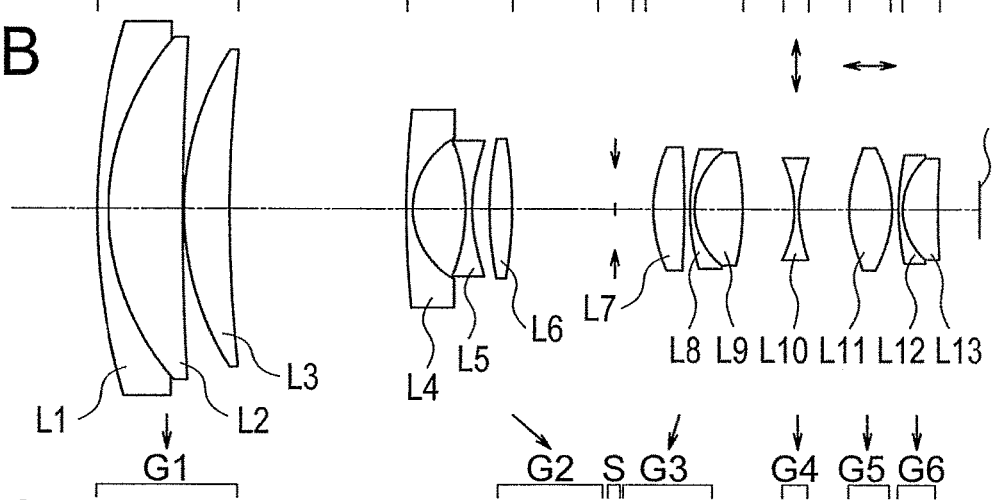
Figure 2C:
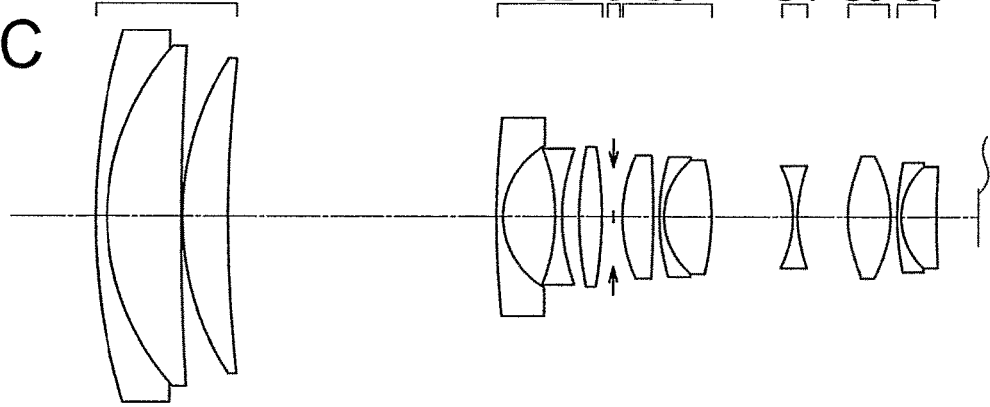
Figure 3A:
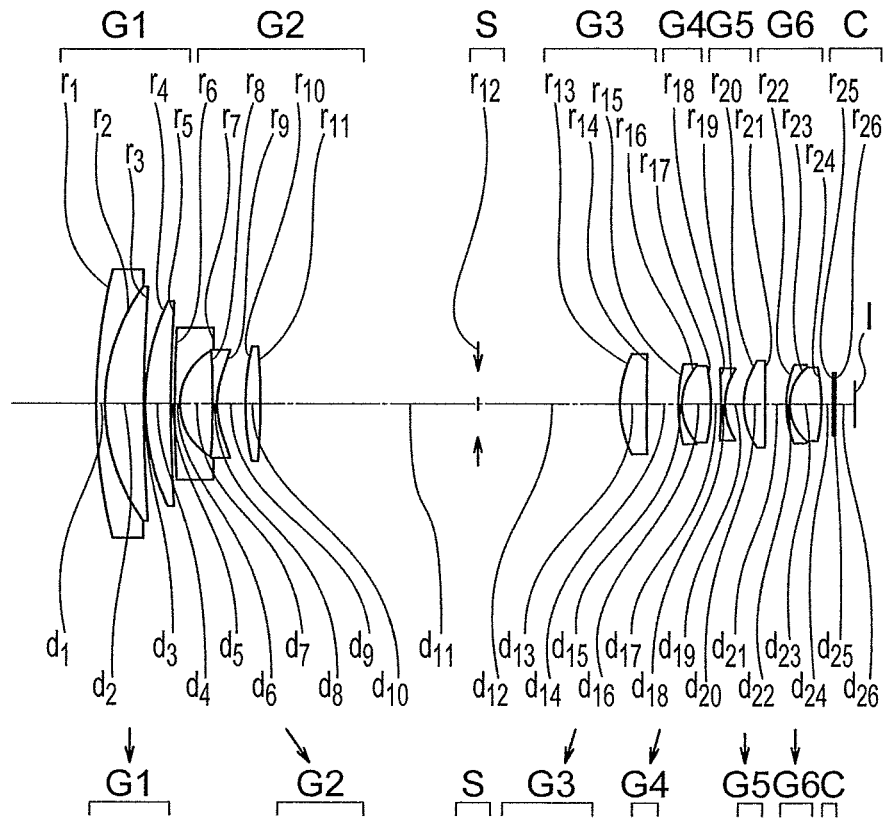
FIG. 3A, FIG. 3B, and FIG. 3C are lens cross-sectional views of a variable magnification optical system of Example 3.
Figure 3B:
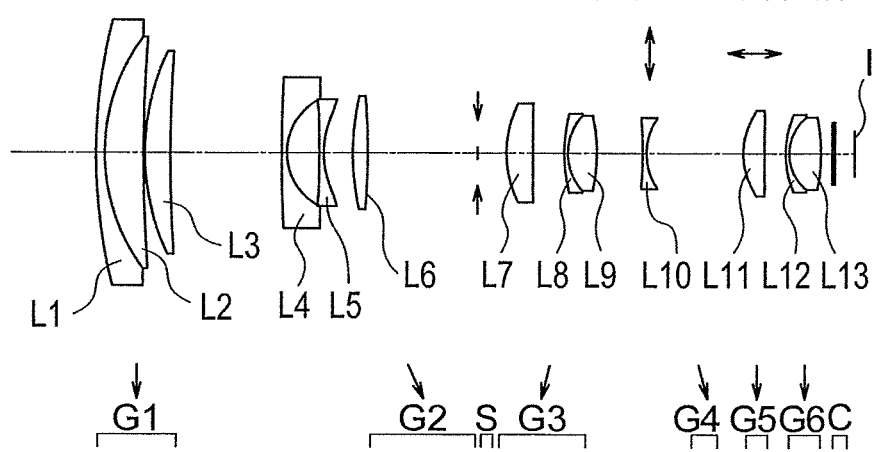
Figure 3C:
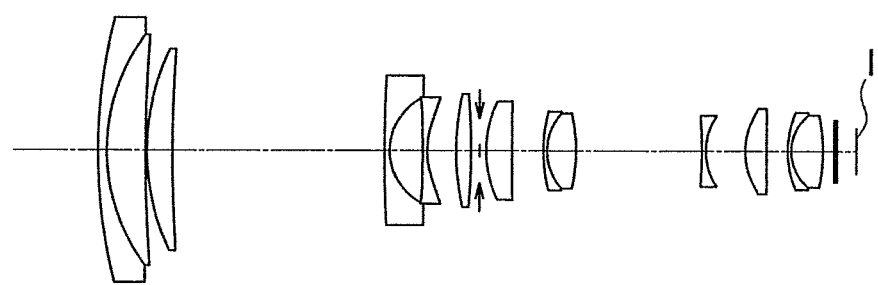
Figure 5A:
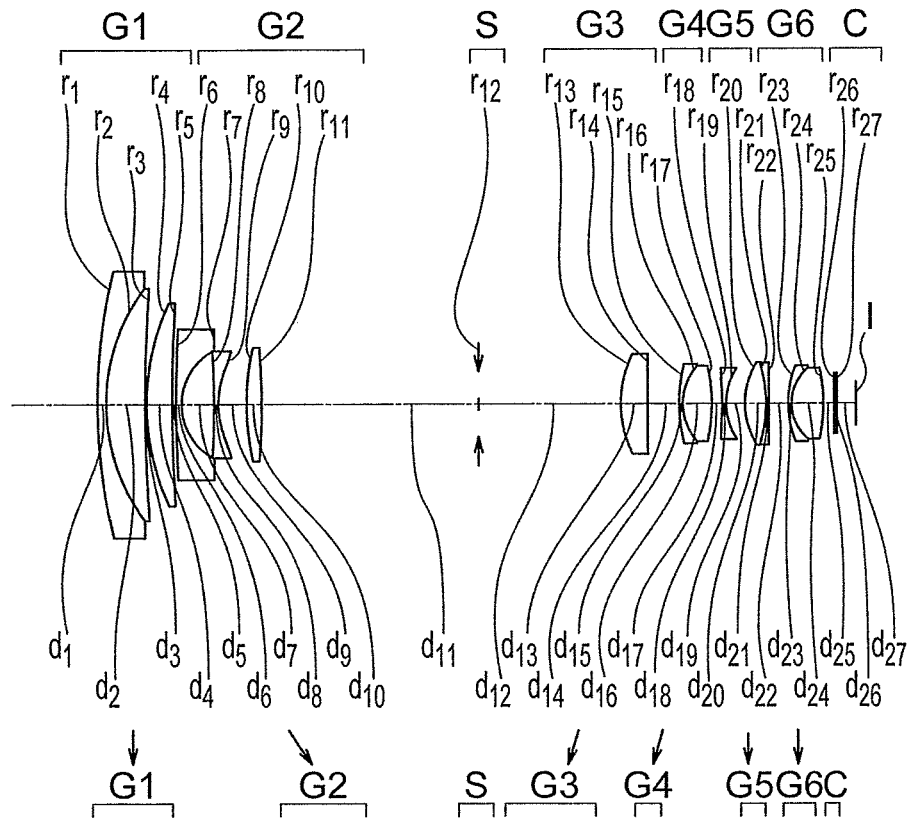
FIG. 5A, FIG. 5B, and FIG. 5C are lens cross-sectional views of a variable magnification optical system of Example 5.
Figure 5B:
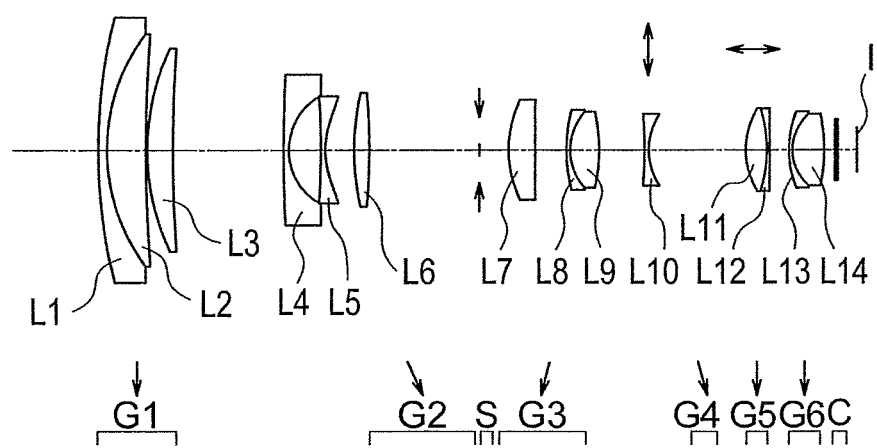
Figure 5C:
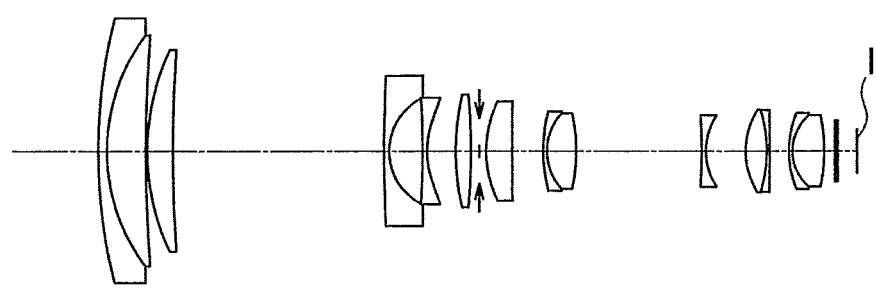
Figure 6A:
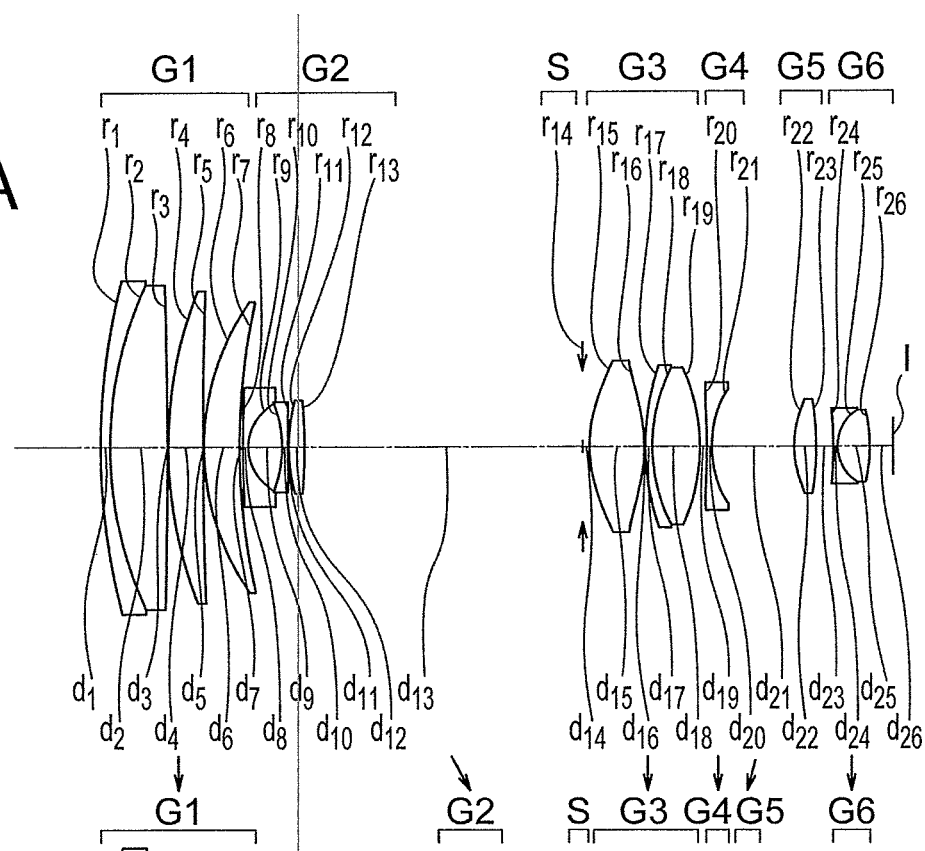
FIG. 6A, FIG. 6B, and FIG. 6C are lens cross-sectional views of a variable magnification optical system of Example 6.
Figure 6B:
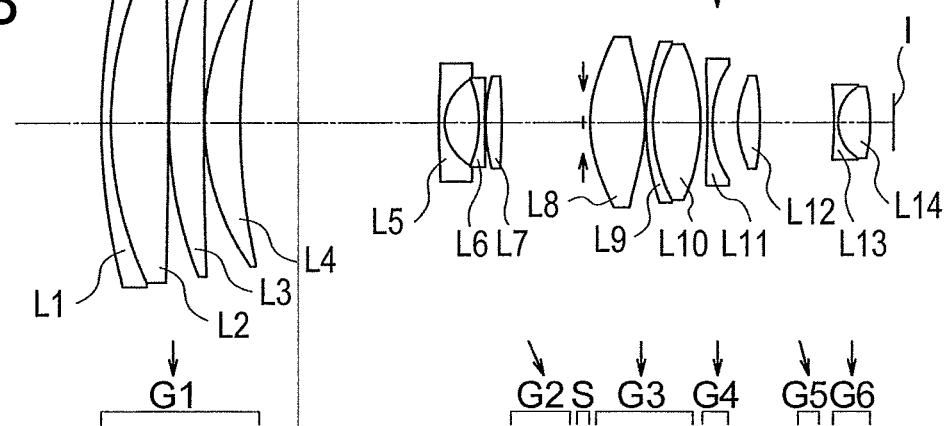
Figure 6C:
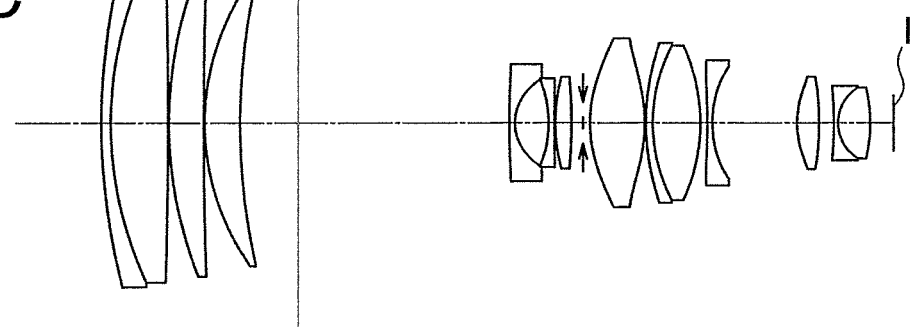
Figures 10A, 10B, 10C, 10D:
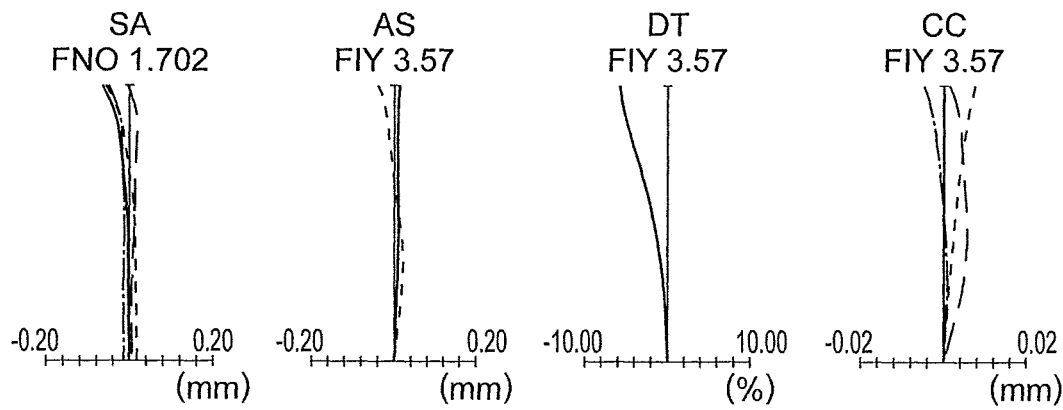
FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams of the variable magnification optical system of Example 4.
Figures 10E, 10F, 10G, 10H:
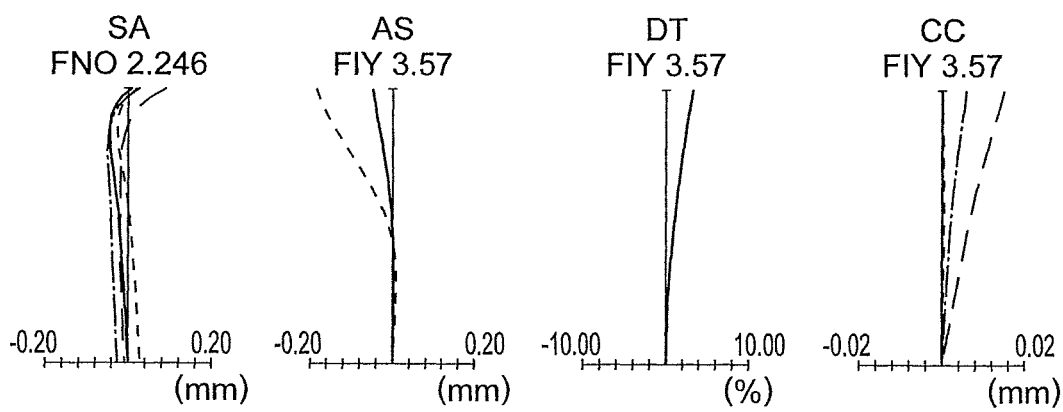
Figures 10I, 10J, 10K, 10L:
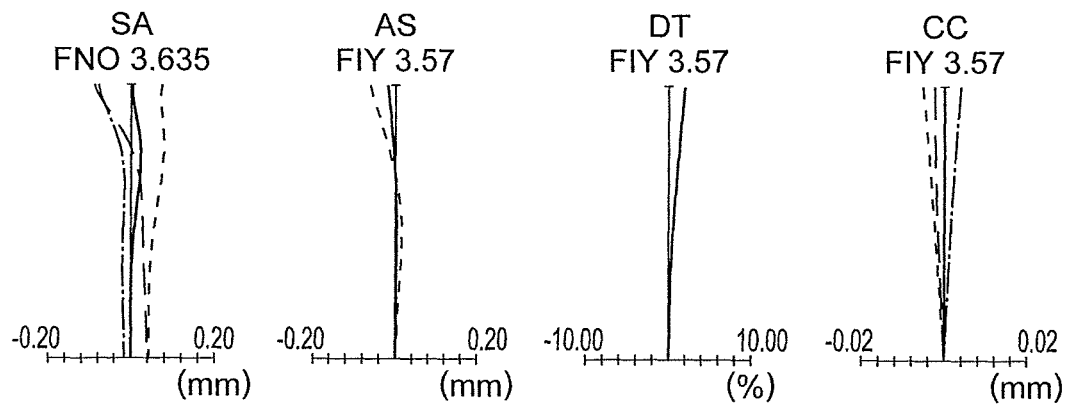
Figures 11A, 11B, 11C, 11D:
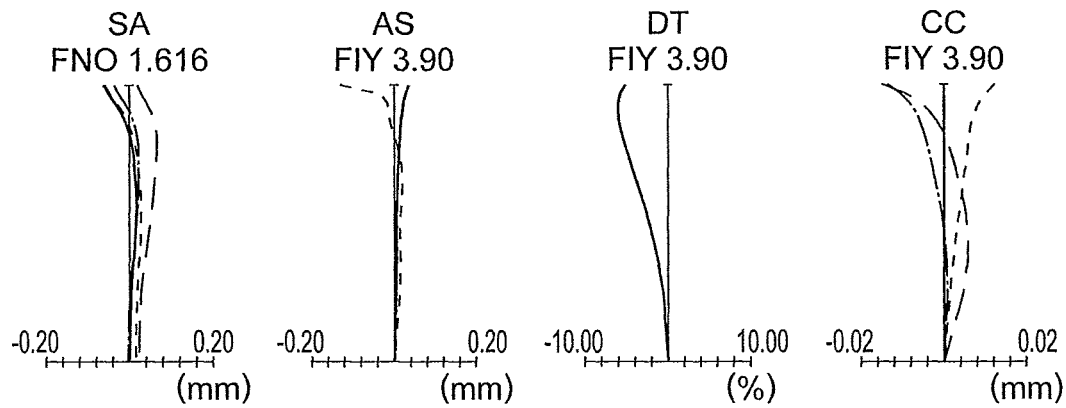
FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams of the variable magnification optical system of Example 5.
Figures 11E, 11F, 11G, 11H:
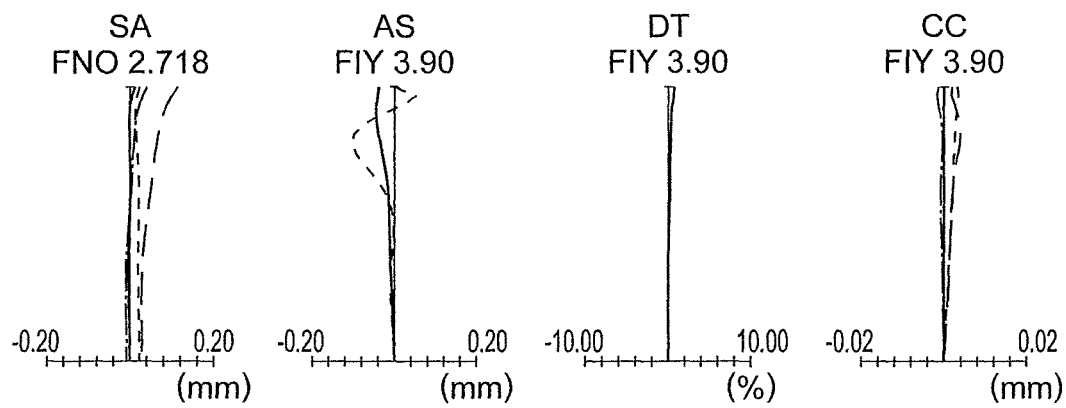
Figures 11I, 11J, 11K, 11L:
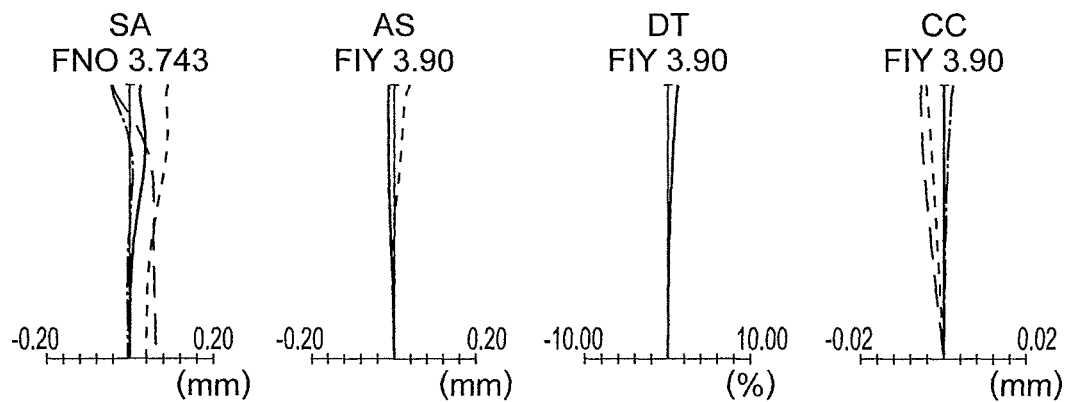

Prior to explanation of Examples, the following is explanation of operations and effects of an embodiment according to an aspect of the present invention. When the operations and effects of the present embodiment are specifically explained, they are explained with specific examples. However, in the same manner as Examples described later, the illustrated aspects are mere part of aspects included in the present invention, and many variations of the aspects exist. Accordingly, the present invention is not limited to the illustrated aspects.

In the following explanation, the term "corrected" means that the aberration amount is equal to or less than an allowable value, with respect to aberration correction. The term "corrected" means that an image blurring amount caused by camera shake is equal to or less than an allowable value, with respect to image stabilization.

The following is explanation of a basic structure of a variable magnification optical system according to a first embodiment to a variable magnification optical system according to a seventh embodiment (hereinafter referred to as "variable magnification optical system according to the present embodiment"). When the technical meaning of a similar structure has already been described, explanation thereof is omitted. In addition, with respect to the technical meaning of a conditional expression, for example, because the technical meaning of Conditional Expression (1) is the same as the technical meaning of Conditional Expression (1-*) (* means number), explanation of the technical meaning of Conditional Expression (1-*) is omitted. In the following explanation, the lens component means a single lens or a cemented lens.

There are three basic configurations, a first basic configuration, a second basic configuration, and a third basic configuration.

The first basic configuration includes, sequentially from an object side, a first lens unit having a positive refractive power, a second lens unit having a negative refractive power, a third lens unit having a positive refractive power, a fourth lens unit, and a fifth lens unit having a positive refractive power, and each of the lens units makes a different movement relatively to a lens unit that is adjacently positioned at least at one of a time of changing magnification, a time of focusing, and a time of image stabilization.

The second basic configuration includes, sequentially from the object side, the first lens unit having a positive refractive power, the second lens unit having a negative refractive power, the third lens unit having a positive refractive power, the fourth lens unit having a negative refractive power, and the fifth lens unit having a positive refractive power, and each of the lens units makes a different movement relatively to a lens unit that is adjacently positioned at least at one of a time of changing magnification, a time of focusing, and a time of image stabilization, and the second lens unit is moved such that a space between the first lens unit and the second lens unit is widened at the telephoto end than at the wide angle end, at the time of focusing to an object at infinity.

The third basic configuration includes, sequentially from the object side, the first lens unit having a positive refractive power, the second lens unit having a negative refractive power, the third lens unit having a positive refractive power, the fourth lens unit having a negative refractive power, the fifth lens unit having a positive refractive power, and a sixth lens unit, and the sixth lens unit includes a negative lens and a positive lens, and each of the lens units makes a different movement relatively to a lens unit that is adjacently positioned at least at one of a time of changing magnification, a time of focusing, and a time of image stabilization, and the second lens unit is moved such that a space between the first lens unit and the second lens unit is widened at the telephoto end than at the wide angle end, at the time of focusing to an object at infinity, and an aperture stop is positioned between a lens surface positioned closest to the image in the second lens unit and a lens surface positioned closest to the image in the third lens unit, or is adjacently positioned to the lens surface positioned closest to the image in the third lens unit.

In the first basic configuration, the second basic configuration, and the third basic configuration, each of the lens units can make a different movement relatively to a lens unit that is adjacently positioned at least at one of a time of changing magnification, a time of focusing, and a time of image stabilization.

The phrase "at least at one of times" means at least at one of a time of changing magnification, a time of focusing, and a time of image stabilization. In the first basic configuration, the second basic configuration, and the third basic configuration, a smallest unit of lenses in which such a group can move independently from a lens that is adjacently positioned is as considered one lens unit. One lens unit includes one or more lenses.

It is now assumed that the lenses are grouped into four lens units, from a viewpoint of "the distance therebetween changes at the time of changing magnification". It is also assumed that a fourth lens unit includes one focusing lens unit, one camera-shake correcting lens unit, and another lens unit that is neither the focusing lens unit nor the camera-shake correcting lens unit. Under such assumptions, the focusing lens unit or the camera-shake correcting lens unit is considered as one lens unit making a different movement with respect to that of the adjacent unit. Therefore, the fourth lens unit is considered to include at least three lens units. As a result, when the lenses are grouped from the viewpoint of "making a different movement with respect to adjacent units", the lenses can be grouped into at least six lens units.

The fourth lens unit may be positioned between the third lens unit and the fifth lens unit. The refractive power of the third lens unit and the refractive power of the fifth lens unit may both be a positive refractive power. Because the refractive power of the fourth lens unit may be a negative refractive power, the lateral magnification of the fourth lens unit can be increased.

If the lateral magnification of the lens unit can be increased, the ratio between the amount of movement of the image on the image plane and the amount of movement of the lens unit can also be increased, and the diameter and the weight of the lens unit can be reduced. The movement of the lens unit includes a movement in the direction along the optical axis, and a movement in a direction orthogonal to the optical axis.

The movement of the lens unit in the direction along the optical axis is performed at the time of changing magnification, or at the time of focusing. If the lateral magnification of the lens unit can be increased, the magnifying effect and the focus sensitivity can also be increased. The movement of the lens unit is moved in a direction orthogonal to the optical axis is performed at the time of at a time of image stabilization. If the lateral magnification of the lens unit can be increased, image stabilization sensitivity can also be increased. As mentioned earlier, because the lateral magnification of the fourth lens unit can be increased, the fourth lens unit can be used for any of changing magnification, focusing, and image stabilization.

Moreover, at any one of changing magnification, focusing, and image stabilization, making the fourth lens unit to have a large lateral magnification contributes to a size reduction of the optical system. In this manner, because the lateral magnification of the fourth lens unit can be increased, it is possible to make the optical system small-sized.

The second basic configuration and the third basic configuration include the first lens unit, the second lens unit, the third lens unit, the fourth lens unit, and the fifth lens unit. In this configuration, the refractive power can be arranged in the order of a positive refractive power, a negative refractive power, a positive refractive power, a negative refractive power, and a positive refractive power. Therefore, in the second basic configuration and the third basic configuration, the arrangement of the refractive power is symmetrical with respect to the third lens unit at the center. As a result, a wide angle of view at the wide angle end and a high magnification ratio can be ensured, while reducing the whole length of the optical system.

A half angle of view exceeding 25 degrees is referred to as a wide angle of view, for example. A magnification ratio exceeding 5.5 times is referred to as a high magnification ratio, for example. However, definitions of the wide angle of view and the magnification ratio are not limited to these values.

In the second basic configuration and the third basic configuration, the arrangement of the refractive powers is substantially symmetrical or symmetrical across a broad range of the variable magnification range. Therefore, the whole length of the optical system can be reduced, and aberrations can be corrected across a broad range of the variable magnification range. As to the correction of the aberrations, mainly the curvature of field and the coma can be corrected across a broad range of the variable magnification range.

The diameter of the first lens unit is the largest in the optical system. By using the second basic configuration or the third basic configuration in the variable magnification optical system, because the refractive power of the fourth lens unit may be a negative refractive power, and the refractive power of the fifth lens unit may be a positive refractive power, a magnifying optical system can be implemented using these two lens units. As a result, the diameter of the first lens unit can be reduced.

In this manner, in the second basic configuration and the third basic configuration, the optical system can be reduced in size, and favorable imaging performance can be ensured in an optical system having a wide angle of view and a high magnification ratio.

If the refractive power of each of the lens units can be increased, the magnifying effect can be increased. If a higher magnifying effect can be achieved, the whole length of the optical system can be reduced, and the diameter of the optical system can be reduced. If the magnifying effect is increased, however, when a small F-number is to be achieved, it becomes difficult to ensure favorable imaging performance across a broad range of the variable magnification range.

The second lens unit can get involved in ensuring a wide angle of view at the wide angle end. If a higher magnifying effect can be achieved, chromatic aberration of magnification is more likely to occur in the second lens unit. Even if chromatic aberration of magnification occurs in the second lens unit, as long as the chromatic aberration of magnification in the entire optical system can be suppressed, a broader angle of view at the wide angle end can be ensured, the optical system can be reduced in size, and a small F-number can be ensured.

In the third basic configuration, the aperture stop can be disposed at a position between the lens surface positioned closest to the image in the second lens unit and the lens surface positioned closest to the image in the third lens unit. Alternatively, the aperture stop may be disposed adjacently to the lens surface positioned closest to the image in the third lens unit. As a result, the diameter of each of the first lens unit, the second lens unit, and the third lens unit can be reduced. Furthermore, as mentioned earlier, because the refractive powers can be arranged substantially symmetrically with the third lens unit at the center, the whole length of the optical system can be reduced.

Within a section from the fifth lens unit to the image plane, the separation between an axial light flux and an off-axis light flux at the wide angle end is similar to that in the second lens unit. If a lens unit can be disposed within the section from the fifth lens unit to the image plane, chromatic aberration of magnification can be occurred in the lens unit. At this time, the direction in which chromatic aberration of magnification occurs in the lens unit can be set reverse to the direction in which chromatic aberration of magnification occurs in the second lens unit.

In the third basic configuration, the sixth lens unit may be disposed in the section from the fifth lens unit to the image plane. The sixth lens unit includes a negative lens and a positive lens. Therefore, using the negative lens and the positive lens, it is possible that the direction in which chromatic aberration of magnification occurs in the sixth lens unit can be set reverse to the direction in which chromatic aberration of magnification occurs in the second lens unit.

In the manner described above, because the sixth lens unit can be provided with a function of correcting the chromatic aberration of magnification, the chromatic aberration of magnification occurred in the second lens unit can be corrected with the sixth lens unit. As a result, the chromatic aberration of magnification can be corrected, and highly variable magnification can be achieved from the wide-angle range.

However, when the chromatic aberration of magnification is selectively corrected, astigmatism and/or coma may occur. Accordingly, when only the chromatic aberration of magnification is selectively suppressed, an adverse influence may occur on imaging performance. The fifth lens unit having a positive refractive power can be disposed on the object side of the sixth lens unit. By doing this, it is possible to suppress occurrence of aberrations other than the chromatic aberration of magnification in the fifth lens unit.

If the fifth lens unit and the sixth lens unit can be separated, the aberration correction function in the fifth lens unit and the aberration correction function in the sixth lens unit can both be enhanced.

A variable magnification optical system according to a first embodiment includes the first basic configuration described above, and the fourth lens unit is enabled to move in the direction orthogonal to the optical axis, and the following Conditional Expression (34) is satisfied:

$$-2.0 \leq ft/fw + 13.38 \times \tan(\Omega Hw/2) - 21.0 \leq 140 \quad (34)$$

where fw is a focal length of the variable magnification optical system at a wide angle end, ft is a focal length of the variable magnification optical system at a telephoto end, and $\Omega Hw$ is a total angle of view in a horizontal direction at the wide angle end.

When the image pickup apparatus is held with the hand, the image pickup apparatus may be shaken due to camera shake in some cases. When a shake is applied to the optical system due to camera shake, a clear image cannot be obtained due to influence of the shake. Image stabilization may be performed in the optical system, to obtain a clearer image with higher resolution.

For example, in the case where the image pickup apparatus is fixed on a tripod or the image pickup apparatus is fixed on the external wall of a building, when a shake occurs on the side on which the image pickup apparatus is fixed, the shake may be transmitted to the image pickup apparatus. Such a shake may be regarded as the same as a shake caused by camera shake. Accordingly, such a shake in the above case may be regarded as being included in a shake caused by camera shake.

In the manner described above, the fourth lens unit can be used for any of changing magnification, focusing, and image stabilization. In the variable magnification optical system according to the first embodiment, the fourth lens unit may be moved in the direction orthogonal to the optical axis. By doing this, it is possible to perform image stabilization.

For example, in a monitoring camera, there are cases where a visual field range at the wide angle end is checked, or a predetermined area is enlarged to check the predetermined area in detail. In view of acquisition of more detailed information, the zoom ratio may be increased.

In the variable magnification optical system, the imaging area can be proportional to f×tan ω (f is a focal length, and ω is an angle of view). For this reason, as the horizontal angle of view is narrowed at the wide angle end, the information amount in the imaging area may reduce in proportion to tan of the angle of view. Specifically, reduction rate of the information amount is equal to or higher than the change rate of the angle of view.

When the horizontal angle of view at the wide angle end is narrow, the information amount can be compensated by more increasing the zoom ratio and more narrowing the angle of view at the telephoto end than those in the case where the horizontal angle of view at the wide angle end is wide. In a case of exceeding a lower limit value of the Conditional Expression (34), a sufficient amount of information can be obtained.

A variable magnification optical system according to a second embodiment includes the first basic configuration described above, and the second lens unit is moved such that a space between the first lens unit and the second lens unit is widened at the telephoto end than at the wide angle end, at the time of focusing to an object at infinity, and the fourth lens unit may be moved in the direction orthogonal to the optical axis, and the following Conditional Expression (33) is satisfied:

$$-1.5 \le ft/fw + 126.52 \times \tan(\Omega Hw/2) - 101.91 \le 140 \quad (33)$$

where
fw is the focal length of the variable magnification optical system at the wide angle end,
ft is the focal length of the variable magnification optical system at the telephoto end, and
ΩHw is the total angle of view in the horizontal direction at the wide angle end.

The technical meaning of Conditional Expression (33) is the same as the technical meaning of Conditional Expression (34).

A variable magnification optical system according to a third embodiment includes the second basic configuration described above, and the following Conditional Expressions (27-1), (30-1) are satisfied:

$$-5.0 \le SFG5 \le 0.91 \quad (27\text{-}1), \text{ and}$$

$$0.6 \le FNOw \le 1.79 \quad (30\text{-}1)$$

where
SFG5 is expressed by the following Equation:

$$SFG5 = (RG5f + RG5r)/(RG5f - RG5r),$$

RG5f is a radius of curvature of a lens surface positioned closest to the object in the fifth lens unit,
RG5r is a radius of curvature of a lens surface positioned closest to the image in the fifth lens unit, and
FNOw is an F-number at the wide angle end.

In a case of exceeding a lower limit value of the Conditional Expression (27-1) or in a case of falling below an upper limit value of the Conditional Expression (27-1), the occurrence amount of various types of aberrations in the fifth lens unit does not increase. For example, the occurrence amount of spherical aberration, the occurrence amount of astigmatism, and the occurrence amount of coma do not increase. Therefore, favorable imaging performance can be obtained.

Moreover, in a case where focusing or image stabilization is performed in the fifth lens unit, spherical aberration or a displacement of the image plane at a very close distance increases. Furthermore, if the lens unit is moved for the image stabilization, asymmetry of spherical aberration or asymmetry of astigmatism becomes large. Therefore, it becomes difficult to obtain favorable imaging performance.

In a case of exceeding a lower limit value of the Conditional Expression (30-1), it is possible to suppress occurrence of spherical aberration and occurrence of astigmatism near the wide angle end in each of the first lens unit, the second lens unit, and the third lens unit. Even when favorable imaging performance is to be obtained, each of the lens units will not be increased in size. Therefore, the optical system can be reduced in size.

In a case of falling below an upper limit value of the Conditional Expression (30-1), sufficient brightness can be ensured at the wide angle end. Therefore, in the case of a monitoring camera, a favorable image can be obtained in monitoring in cloudy weather or at night.

A variable magnification optical system according to a fourth embodiment includes the second basic configuration described above, and the following Conditional Expressions (28), (29), and (30-1) are satisfied:

$$26.9° \le \Omega Hw/2 \le 75° \quad (28),$$

$$5.5 \le ft/fw \le 120 \quad (29), \text{ and}$$

$$0.6 \le FNOw \le 1.79 \quad (30\text{-}1)$$

where
ΩHw is the total angle of view in the horizontal direction at the wide angle end,
ft is the focal length of the variable magnification optical system at the telephoto end, and
fw is the focal length of the variable magnification optical system at the wide angle end.

In a case of exceeding a lower limit value of the Conditional Expression (28), the image pickup device can capture images covering a wider area. Therefore, in the case of a monitoring camera, for example, blind spots can be reduced. In the case of a camera for a television conference, a plurality of persons can be captured in the image even when the room size is small. In a case of falling below an upper limit value of the Conditional Expression (28), because the diameter of the first lens unit will not increase, it is possible to make the optical system small-sized.

In a case of exceeding a lower limit value of the Conditional Expression (29), it is possible to obtain a high-definition image. For this reason, for example, in the monitoring camera, it is possible to photograph a license plate of an automobile and/or a face of a person clearly. In a case of falling below an upper limit value of the Conditional Expression (29), it is possible to shorten the whole length of the optical system. Consequently, it is possible to make the optical system small-sized.

A variable magnification optical system according to a fifth embodiment includes the second basic configuration described above, and fourth lens unit is enabled to move in the direction orthogonal to the optical axis, and the following Conditional Expressions (29) and (30-1) are satisfied:

$$5.5 \leq ft/fw \leq 120 \quad (29), \text{ and}$$

$$0.6 \leq FNOw \leq 1.79 \quad (30\text{-}1)$$

where ft is the focal length of the variable magnification optical system at the telephoto end, and fw is the focal length of the variable magnification optical system at the wide angle end.

A variable magnification optical system according to a sixth embodiment includes the third basic configuration described above, and the fourth lens unit may be fixed at the time of changing magnification, and the fourth lens unit may be moved in the direction orthogonal to the optical axis, and the following Conditional Expression (1) is satisfied:

$$0.012 \leq DG5G6aw/fG5 \leq 5.0 \quad (1)$$

where

DG5G6aw is an air space between the fifth lens unit and the sixth lens unit at the wide angle end, and fG5 is a focal length of the fifth lens unit.

A movement of the lens unit can be described from viewpoints of a function of changing magnification, a function of focusing, and a function of image stabilization. "The fourth lens unit may be fixed at the time of changing magnification" is a description of the movement of the fourth lens unit only from the viewpoint of the function of changing magnification. Therefore, the description "the fourth lens unit may be fixed at the time of changing magnification" may include a mode in which the fourth lens unit is moved in the direction orthogonal to the optical axis to image stabilization while changing magnification at the same time, for example, and include a mode in which the fourth lens unit is moved in the direction along the optical axis to focus, while changing magnification at the same time.

Because the lateral magnification of the fourth lens unit is high, it is preferable to perform positional control for the fourth lens unit simply. For this reason, the fourth lens unit is fixed at the time of changing magnification, despite the fourth lens unit may be used for changing magnification. By doing this, the positional error of the fourth lens unit will not be caused at the time of changing magnification. As a result, image stabilization can be performed with high accuracy, while maintaining the imaging performance high. Because the fourth lens unit can be reduced in weight, the image stabilization can be performed with high followability.

In a case of exceeding a lower limit value of the Conditional Expression (1), an effect of correcting astigmatism and effect of correcting coma can be obtained. In a case of falling below an upper limit value of the Conditional Expression (1), the sum of the thickness of the fifth lens unit along the optical axis and the thickness of the sixth lens unit along the optical axis is reduced. On the object side of the fifth lens unit, a lens unit is moved at the time of changing magnification. If the sum of the thicknesses of the two lens units is reduced, a space in which the moving lens units can move increases. Therefore, a higher magnification ratio can be obtained.

A variable magnification optical system according to a seventh embodiment includes the third basic configuration described above, and the sixth lens unit may be fixed at the time of changing magnification, and the following Conditional Expression (1-1) is satisfied:

$$0.014 \leq DG5G6aw/fG5 \leq 5.0 \quad (1\text{-}1)$$

where

DG5G6aw is the air space between the fifth lens unit and the sixth lens unit at the wide angle end, and fG5 is the focal length of the fifth lens unit.

The height of the ray made incident on the sixth lens unit is changed at a time of changing magnification. When the sixth lens unit is fixed at the time of changing magnification, it is possible to reduce both change in a central light flux diameter and a change in peripheral ray height made incident on the sixth lens unit. Consequently, it is possible to suppress fluctuations in chromatic aberration of magnification from the wide angle end to the telephoto end, and to secure a small F-number.

The central light flux diameter indicates a diameter of the light flux imaged on the center of the image surface. The peripheral ray height indicates height of a ray imaged on the peripheral portion of the image surface.

When the lens unit is moved in the vicinity of the image surface, dust easily occurs due to movement of the lens unit. The sixth lens unit is disposed close to the image surface. Therefore, it is possible to reduce the occurrence of dust by making the sixth lens unit to be immovable. Adhesion of dust onto the image pickup surface can be reduced when the image pickup element is disposed on the image surface.

A lens unit (hereinafter referred to as "focus lens unit") moving along the optical axis at a time of focusing can be disposed close to the sixth lens unit. When the sixth lens unit is fixed at a time of changing magnification, an actuator for changing magnification may not be disposed in the vicinity of the sixth lens unit. Accordingly, an actuator for focusing can be disposed in the vicinity of the focus lens unit. As a result, the size of the focus unit can be reduced. The focus unit can be formed of, for example, a focusing lens unit and an actuator for focusing.

As described above, the movement of the lens unit can be described from viewpoints of a function of changing magnification, a function of focusing, and a function of image stabilization. "The sixth lens unit may be fixed at the time of changing magnification" is a description of the movement of the sixth lens unit only from the viewpoint of the function of changing magnification. Therefore, the description "the sixth lens unit may be fixed at the time of changing magnification" may include a mode in which the sixth lens unit is moved in the direction orthogonal to the optical axis to image stabilization while changing magnification at the same time, for example, and include a mode in which the sixth lens unit is moved in the direction along the optical axis to focus, while changing magnification at the same time.

In the variable magnification optical systems according to the first and the variable magnification optical systems according to the second embodiment, the fourth lens unit may have a negative refractive power.

By doing this, in the variable magnification optical systems according to the first embodiment and the variable magnification optical systems according to the second embodiment, the refractive power can be arranged in the order of a positive refractive power, a negative refractive power, a positive refractive power, a negative refractive power, and a positive refractive power. Therefore, the advantageous effects explained for the second basic configuration and the third basic configuration can be obtained.

In the variable magnification optical system according to the first embodiment to the variable magnification optical system according to the fifth embodiment, the aperture stop may be positioned between the lens surface positioned closest to the image in the second lens unit and the lens surface positioned closest to the image in the third lens unit. Alternatively, the aperture stop may be disposed adjacently to the lens surface positioned closest to the image in the third lens unit. By doing this, the advantageous effects explained for the third basic configuration can be obtained.

In the variable magnification optical systems according to the first embodiment to the variable magnification optical system according to the fifth embodiment, the sixth lens unit may be disposed in a section from the fifth lens unit to the image plane, and the sixth lens unit may include a negative lens and a positive lens. By doing this, the advantageous effects explained for the third basic configuration can be achieved.

In the variable magnification optical systems according to the third embodiment, the variable magnification optical system according to fourth embodiment, and the variable magnification optical system according to seventh embodiment, the fourth lens unit may be moved in the direction orthogonal to the optical axis.

By doing this, the advantageous effects explained for the variable magnification optical systems according to the first embodiment can be achieved.

In the variable magnification optical systems according to the first embodiment to the variable magnification optical systems according to the sixth embodiment, the sixth lens unit may be fixed at the time of changing magnification.

By doing this, the advantageous effects explained for the variable magnification optical systems according to the seventh embodiment can be achieved.

In the variable magnification optical systems according to the first embodiment to the variable magnification optical systems according to the fifth embodiment, and the variable magnification optical systems according to the seventh embodiment, the following Conditional Expression (1) may be satisfied:

$$0.012 \leq DG5G6aw/fG5 \leq 5.0 \quad (1)$$

where

DG5G6aw is the air space between the fifth lens unit and the sixth lens unit at the wide angle end, and fG5 is the focal length of the fifth lens unit.

The technical significance of Conditional Expression (1) is as described above.

In the variable magnification optical system according to the present embodiment, the fourth lens unit may be moved in at least one of the direction along the optical axis and the direction orthogonal to the optical axis.

As mentioned earlier, the fourth lens unit can be reduced in weight. At any of the time of changing magnification, the time of focusing, and the time of image stabilization, it is possible to achieve changing magnification, focusing, and image stabilization with a high precision and high followability. Furthermore, it is possible to make the optical system small-sized.

In the variable magnification optical system according to the present embodiment, the fourth lens unit may be moved in the direction along the optical axis at the time of changing magnification.

By doing this, the magnification can be changed with high accuracy and with high followability. Furthermore, it is possible to make the optical system small-sized.

In the variable magnification optical system according to the present embodiment, the fourth lens unit may be moved at the time of changing magnification such that a space between the third lens unit and the fourth lens unit at the time of focusing to an object at infinity is widened at the telephoto end than at the wide angle end.

The position of the image plane can be corrected across a broad range of the variable magnification range. As a result, favorable imaging performance can be obtained.

In the variable magnification optical system according to the present embodiment, at the time of changing magnification, the fourth lens unit may be moved to the object side, and thereafter moved to the image side.

In such a case, the fourth lens unit moves a convex trajectory toward the object. Therefore, variations in the position of the image plane at an intermediate focal length can be corrected. Furthermore, favorable imaging performance can be obtained across a broad range of the variable magnification range.

In the variable magnification optical systems according to the first to the variable magnification optical systems according to the fifth, and the variable magnification optical systems according to the seventh embodiment, the fourth lens unit may be fixed at the time of changing magnification.

In the variable magnification optical system according to the present embodiment, the fifth lens unit may be moved in at least one of the direction along the optical axis and the direction orthogonal to the optical axis.

The sixth lens unit can be disposed on the image side of the fifth lens unit. By doing this, the fifth lens unit may be positioned closer to the object. Because the fourth lens unit is disposed on the object side of the fifth lens unit, the fifth lens unit comes to be positioned in proximity to the fourth lens unit. In such a configuration, because the fourth lens unit has a negative refractive power, and the fifth lens unit has a positive refractive power, the lateral magnification of the fifth lens unit can be increased.

As described above, if the lateral magnification of the lens unit can be increased, the ratio between the amount of movement of the image on the image plane and the amount of movement of the lens unit can also be increased, and the diameter and the weight of the lens unit can be reduced. Because the lateral magnification of the fifth lens unit can be increased, the fifth lens unit can be used for any of changing magnification, focusing, and image stabilization.

Moreover, at any one of changing magnification, focusing, and image stabilization, making the fourth lens unit to have a large lateral magnification contributes to a size reduction of the optical system. In this manner, because the lateral magnification of the fourth lens unit can be increased, it is possible to make the optical system small-sized.

In the variable magnification optical system according to the present embodiment, the fifth lens unit may be moved in the direction along the optical axis at the time of changing magnification.

By doing this, the magnification can be changed with high accuracy and with high followability. Furthermore, it is possible to make the optical system small-sized.

In the variable magnification optical system according to the present embodiment, the fifth lens unit may be moved in the direction along the optical axis at the time of focusing.

By doing this, the magnification can be changed with high accuracy and with high followability. Furthermore, it is possible to make the optical system small-sized.

In the variable magnification optical system according to the present embodiment, the distance between the fifth lens unit and the sixth lens unit may be kept constant at the time of changing magnification.

The sixth lens unit may be fixed at the time of changing magnification. In such a case, the fifth lens unit can be fixed at the time of changing magnification if the distance between fifth lens unit and the sixth lens unit can be kept constant.

In the variable magnification optical system according to the present embodiment, the whole length of the variable magnification optical system can be kept constant at a time of changing magnification.

When the lens unit disposed closest to the object side is moved at a time of changing magnification, the position of the center of gravity of the whole optical system may be changed. When the position of the center of gravity of the whole optical system is changed, the posture in imaging may be changed from the posture before changing magnification. As described above, when the lens unit disposed closest to the object side is moved at a time of changing magnification, imaging at a fixed posture may become difficult.

Fixing the whole length of the variable magnification optical system at a time of changing magnification immobilizes the lens unit disposed closest to the object side at a time of changing magnification. When the lens unit disposed closest to the object side at a time of changing magnification can be immobilized, changing magnification is enabled with reduced change in posture in imaging.

In addition, in the external appearance, no movable portion exists in the lens barrel. Accordingly, when the optical unit is formed using the variable magnification optical system of the present embodiment and the lens barrel, it is possible to form an optical unit with higher durability, higher dust resistance, and higher waterproof property. For example, when the optical unit is used for a monitoring camera, the monitoring camera can be installed outdoors for a long period of time.

In the variable magnification optical system according to the present embodiment, the following Conditional Expression (2) may be satisfied:

$$0.0 \leq \Delta SS/LTLw \leq 0.11 \quad (2)$$

where $\Delta SS$ is a maximum amount of movement of the aperture stop at the time of changing magnification, and $LTLw$ is a whole length of the variable magnification optical system at the wide angle end.

By satisfying the Conditional Expression (2), it is possible to reduce abrupt change in the F-number due to changing magnification. As a result, the amount of a change in the diameter of the aperture stop at the time of changing magnification can be reduced. Furthermore, even in a case where F-number is small, variation in the light amount can be kept small across a broad range of the variable magnification range.

Moreover, electrical means may be used for changing the aperture diameter of the aperture stop. An example of the electric means includes an electric wire for transmitting electric signals. The length of a channel for transmitting the electric signals, that is, the length of the electric wire may change, as the aperture stop is moved at the time of changing magnification. By satisfying the Conditional Expression (2), since it is possible to reduce the movement amount of the aperture stop, it is possible to reduce change in length of the electrical wire. Consequently, it is possible to achieve electrical means with a structure with high durability.

$\Delta SS/LTLw=0$ means that the position of the aperture stop is fixed.

In the variable magnification optical system according to the present embodiment, the following Conditional Expression (3) may be satisfied:

$$1.30 \leq |fG2/fw| \leq 4.50 \quad (3)$$

where $fG2$ is a focal length of the second lens unit, and $fw$ is the focal length of the variable magnification optical system at the wide angle end.

In a case of exceeding a lower limit value of the Conditional Expression (3), an angle of light ray made incident on the second lens unit from the first lens unit become small in off-axis light ray. As a result, the diameter of the first lens unit can be reduced. Furthermore, the occurrence amount of chromatic aberration of magnification and the occurrence amount of distortion near the wide angle end are both reduced.

In a case of falling below an upper limit value of the Conditional Expression (3), the refractive power of the second lens unit will be reduced, and therefore, a wider angle of view can be ensured.

In the variable magnification optical system according to the present embodiment, the following Conditional Expression (4) may be satisfied:

$$-0.065 \leq fG2 \times PG1G2a \leq 0.190 \quad (4)$$

where $PG1G2a$ is expressed by the following Equation:

$$PG1G2a = 1/RG1B - 1/RG2F,$$

$RG1B$ is a radius of curvature of the lens surface positioned closest to the image in the first lens unit, and $RG2F$ is a radius of curvature of the lens surface positioned closest to the object in the second lens unit.

In a case of exceeding a lower limit value of the Conditional Expression (4), it is possible to make small mainly occurrence of astigmatism and variations in distortion near the wide angle end. As a result, the angle of view at the wide angle end can be increased.

In a case of falling below an upper limit value of the Conditional Expression (4), the refractive power of the second lens unit can be reduced. Therefore, even when the angle of view at the wide angle end is increased, the diameter of the second lens unit can be made small.

In the variable magnification optical system according to the present embodiment, the following Conditional Expression (5) may be satisfied:

$$-0.11 \leq (LTLt-LTLw)/LTLw \leq 0.11 \quad (5)$$

where $LTLt$ is a whole length of the variable magnification optical system at the telephoto end, and $LTLw$ is the whole length of the variable magnification optical system at the wide angle end.

In a case of exceeding a lower limit value of the Conditional Expression (5), it is possible to suppress an increase in the curvature of field near the wide angle end, while ensuring a high magnification ratio. Moreover, it is possible to suppress an increase in spherical aberration near the telephoto end. Therefore, favorable imaging performance can be obtained.

In a case of falling below an upper limit value of the Conditional Expression (5), it is possible to suppress an increase in the amount of movement of the first lens unit at the time of changing magnification. If an increase in the amount of the movement of the first lens unit can be suppressed, changing magnification can be performed while keeping the posture in imaging stably. Therefore, imaging can be performed stably.

In the variable magnification optical system according to the present embodiment, the following Conditional Expression (6) may be satisfied:

$$4.0 \le fG1/fw \le 35 \qquad (6)$$

where fG1 is a focal length of the first lens unit, and fw is the focal length of the variable magnification optical system at the wide angle end.

In a case of exceeding a lower limit value of the Conditional Expression (6), it is possible to prevent the entrance pupil from moving away from the position of the lens surface closest to the object side toward the image. Therefore, even if the angle of view is made to be wider at the wide angle end, the diameter of the first lens unit does not become large. As a result, it is possible to make the optical system small-sized.

In a case of falling below an upper limit value of the Conditional Expression (6), the effect of magnification obtained by the first lens unit and the second lens unit can be enhanced. Therefore, a high magnification ratio can be ensured.

In the variable magnification optical system according to the present embodiment, the following Conditional Expression (7) may be satisfied:

$$0.30 \le fG1/ft \le 2.5 \qquad (7)$$

where fG1 is the focal length of the first lens unit, and fw is the focal length of the variable magnification optical system at the telephoto end.

The technical meaning of Conditional Expression (7) is the same as the technical meaning of Conditional Expression (6).

In the variable magnification optical system according to the present embodiment, the following Conditional Expression (8) may be satisfied:

$$3.5 \le |fG1/fG2| \le 9.1 \qquad (8)$$

where fG1 is the focal length of the first lens unit, and fG2 is the focal length of the second lens unit.

The technical meaning of Conditional Expression (8) is the same as the technical meaning of Conditional Expression (6).

In the variable magnification optical system according to the present embodiment, the following Conditional Expression (9) may be satisfied:

$$1.0 \le fG3/fw \le 8.0 \qquad (9)$$

where fG3 is a focal length of the third lens unit, and fw is the focal length of the variable magnification optical system at the wide angle end.

In a case of exceeding a lower limit value (9), the occurrence amount of spherical aberration in the third lens unit is mainly reduced. Therefore, small F-number can be ensured at the wide angle end. In a case of falling below an upper limit value of the Conditional Expression (9), the magnifying effect of the third lens unit is increased. As a result, a high magnification ratio can be ensured.

In the variable magnification optical system according to the present embodiment, the following Conditional Expression (10) may be satisfied:

$$-14\% < DTw < 5\% \qquad (10)$$

where

DTw is a distortion amount at the maximum angle of view at the wide angle end, and is indicated with the following Equation:

$$DTw = (IHw1 - IHw2)/IHw2 \times 100(\%),$$

IHw1 is a real image height when light flux including the ray of the maximum angle of view is imaged on the image surface at the wide angle end, IHw2 is a paraxial image height when light flux including the ray of the maximum angle of view is imaged on the image surface at the wide angle end, and both image heights are image heights at the time of focusing to an infinite object point.

In a case of falling below a lower limit value of the Conditional Expression (10), since distortion of the image becomes small, it is possible to pick up the subject accurately. Furthermore, even when the distortion is electrically corrected, it is possible to prevent the image around the peripherals of the image from being stretched by a larger degree. Therefore, deterioration of the image around the peripherals of the image can be prevented.

In a case of falling below an upper limit value of the Conditional Expression (10), the angle of view which is obtained with respect to a state of occurring no distortion becomes wide. Therefore, a sufficient amount of information can be obtained at the wide angle end.

In the variable magnification optical system according to the present embodiment, the first lens unit may include a negative lens, and a positive meniscus lens having a convex surface facing the object side.

By doing this, it is possible to make the magnification ratio high, and it is possible to reduced chromatic aberration across a broad range of the variable magnification range. Furthermore, because a positive meniscus lens having a convex surface facing the object side can be provided to the first lens unit, variation in the astigmatism at the time of changing magnification can be reduced. As a result, stable imaging performance can be achieved across a broad range of the variable magnification range.

In the variable magnification optical system according to the present embodiment, the first lens unit may include a negative lens and two positive lenses.

By doing this, it is possible to suppress occurrence of spherical aberration in the first lens unit near the telephoto end. As a result, it is possible to make the magnification ratio high. Furthermore, at least one of the positive lenses may be a positive meniscus lens having a convex surface facing the object side. If such a configuration is possible, it is possible to suppress occurrence of spherical aberration, and it is possible to reduce variation in the astigmatism at the time of changing magnification. As a result, stable imaging performance can be achieved across a broad range of the variable magnification range.

In the variable magnification optical system according to the present embodiment, the two positive lenses may both be positive meniscus lenses having their convex surfaces facing the object side.

By doing this, it is possible to it is possible to variation in the astigmatism at the time of changing magnification. As a result, stable imaging performance can be achieved across a broad range of the variable magnification range.

In the variable magnification optical system according to the present embodiment, one positive lens, separately from the two positive lenses may be included.

By doing this, it is possible to make the refractive power in the first lens unit large. As a result, whole length of the optical system can be reduced.

In the variable magnification optical system according to the present embodiment, the third lens unit may include a positive lens and a negative lens.

In order to make the F-number smaller while increasing the magnification ratio, it is preferable to correct spherical aberration across a broad range of the used wavelength range. The third lens unit may be disposed near the aperture stop. In this case, the third lens unit will be more involved in correcting the spherical aberration. If a positive lens and a negative lens can be disposed in third lens unit, the spherical aberration can be corrected.

Once the spherical aberration is corrected, variations in the aberrations due to movement can be suppressed, even when the lens unit is moved. Because the third lens unit can be moved in the direction orthogonal to the optical axis, it is possible to perform image stabilization while maintaining high imaging performance.

In the variable magnification optical system according to the present embodiment, the third lens unit may be moved so as to be positioned closer to the object at the telephoto end than at the wide angle end, at the time of focusing to an object at infinity.

By doing this, the magnifying effect achieved by the third lens unit can be increased. As a result, it is possible to make magnification ratio high.

In the variable magnification optical system according to the present embodiment, the third lens unit may be fixed at the time of changing magnification.

When the lens unit is moved, the position at which the lens unit is stopped may vary due to a backslash of the moving mechanism. Because the third lens unit contributes greatly to the magnifying effect, the third lens unit is kept fixed at the time of changing magnification. By doing this, any displacement of the third lens unit with respect to the designed position can be suppressed across a broad range of the variable magnification range. As a result, favorable imaging performance can be obtained across a broad range of the variable magnification range. The third lens unit may be fixed at the time of changing magnification, or may correspond to at least one of the focusing lens unit or the image stabilization lens unit.

In the variable magnification optical system according to the present embodiment, the third lens unit may include a predetermined positive lens satisfying the following Conditional Expression (11):

$$63 \leq vdG3P1 \leq 100 \tag{11}$$

where vdG3P1 is Abbe number of the predetermined positive lens.

In a case of exceeding a lower limit value of the Conditional Expression (11), the longitudinal chromatic aberration in the third lens unit will be reduced. Therefore, even when the magnification ratio is increased, favorable imaging performance can be ensured across a broad range of the variable magnification range. For example, even when a magnification ratio exceeding 10 times is to be achieved, favorable imaging performance can be ensured across a broad range of the variable magnification range.

In the variable magnification optical system according to the present embodiment, the third lens unit may include a first positive lens and a cemented lens, and the cemented lens may consist of a positive lens and a negative lens.

It is possible to make high correction effect of longitudinal chromatic aberration and correction effect of chromatic aberration of magnification by the cemented lens. In addition, it is possible to make high correction effect of spherical aberration and correction effect of coma mainly with the first positive lens and the cemented surface of the cemented lens.

In the variable magnification optical system according to the present embodiment, the shape of the cemented lens may be a meniscus shape having a convex surface facing the object side.

It is possible to make high correction effect of longitudinal chromatic aberration and correction effect of chromatic aberration of magnification by the cemented lens. In addition, it is possible to make high correction effect of spherical aberration and correction effect of coma mainly with the first positive lens and the cemented surface of the cemented lens.

A lens component having a biconvex shape and a positive refractive power may be disposed on the image side of the cemented lens. By doing this, it is possible to make high the correction effect of spherical aberration and the correction effect coma. As a result, it is possible to make the magnification ratio high, and to make F-number small.

In the variable magnification optical system according to the present embodiment, a relative position between the third lens unit and the fourth lens unit, or a relative position between the fourth lens unit and the fifth lens unit may be changed between the wide angle end and the telephoto end.

By doing this, the curvature of field can be corrected even when the magnification ratio is increased. For example, the curvature of field can be corrected even when the magnification ratio exceeds 10 times.

In the variable magnification optical system according to the present embodiment, the fourth lens unit may include a predetermined negative lens satisfying the following Conditional Expression (12):

$$51 \leq vdG4N1 \leq 100 \tag{12}$$

where vdG4N1 is Abbe number of the predetermined negative lens.

In a case of exceeding a lower limit value of the Conditional Expression (12), it is possible to make small variation in chromatic aberration at the time of focusing, that is, variation in longitudinal chromatic aberration or in chromatic aberration of magnification. Therefore, favorable imaging performance can be obtained.

As a method for suppressing chromatic aberration, a method in which a positive lens having a higher dispersion than that of the negative lens is disposed in the fourth lens unit is available. However, when a positive lens is disposed in the fourth lens unit, the weight of the fourth lens unit may be increased. By satisfying the Conditional Expression (12), it will be no longer necessary to dispose a high-dispersion positive lens in the fourth lens unit. In this case, it is possible to prevent the weight of the fourth lens unit from increasing. Therefore, it is possible to perform focusing at a high speed in a case of performing the focusing by the fourth lens unit.

In the variable magnification optical system according to the present embodiment, the following Conditional Expression (13) may be satisfied:

$$-1.5 \leq SFG4 \leq 1.8 \tag{13}$$

where
SFG4 is expressed by the following Equation:

$$SFG4=(RG4f+RG4r)/(RG4f-RG4r),$$

RG4f is a radius of curvature of a lens surface positioned closest to the object in the fourth lens unit, and RG4r is a radius of curvature of a lens surface positioned closest to the image in the fourth lens unit.

In a case of exceeding a lower limit value of the Conditional Expression (13), or in a case of falling below an upper limit value of the Conditional Expression (13), the amount of the various aberrations in the fourth lens unit becomes small. For example, occurrence of spherical aberration, occurrence of astigmatism, and occurrence of coma become small. Therefore, favorable imaging performance can be obtained.

When the Conditional Expression (13) is satisfied, spherical aberration or displacement of the image plane at a very close distance can be reduced, when focusing or image stabilization is performed by the fourth lens unit. Furthermore, even when the lens unit is moved to perform image stabilization, asymmetry of the spherical aberration or asymmetry of of the astigmatism is enhanced less. Therefore, favorable imaging performance can be obtained.

In the variable magnification optical system according to the present embodiment, the fourth lens unit may consist of one negative lens.

The fourth lens unit may be moved for focusing, or for image stabilization. By allowing the fourth lens unit to consist of one lens, the fourth lens unit can be reduced in weight. The fourth lens unit can then be moved at a higher speed at the time of focusing or image stabilization. In other words, focusing with a high followability, or image stabilization with a high followability can be achieved. Furthermore, the position of the lens unit can be easily controlled. Therefore, improvement of imaging accuracy and improvement of speed can be achieved.

In the variable magnification optical system according to the present embodiment, the fifth lens unit may be formed of a lens component with no air space.

By doing this, it is possible to reduce the thickness of the fifth lens unit in the optical axis direction. In this case, it is possible to increase the space on the object side or the space on the image side of the fifth lens unit. Moreover, it is possible to suppress occurrence of chromatic aberration of magnification of a high order.

In the variable magnification optical system according to the present embodiment, the sixth lens unit may consist of a negative lens and a positive lens.

By doing this, it is possible to reduce the thickness of the sixth lens unit in the optical axis direction. In this case, it is possible to increase the space on the object side of the sixth lens unit.

The negative lens and the positive lens in the sixth lens unit may be cemented. By doing this, it is possible to suppress occurrence of coma of a high order or occurrence of astigmatism of a high order.

In the variable magnification optical system according to the present embodiment, the fifth lens unit may consist of one positive lens, and the sixth lens unit may consist of one negative lens and one positive lens.

By doing this, it is possible to reduce the thickness in the optical axis direction in each of the fifth lens unit and the sixth lens unit. In this case, it is possible to increase the spaces of both sides of the fifth lens unit. When a lens unit disposed on the object side is moved along the optical axis, it is possible to increase a moving space. As a result, a high magnification ratio can be ensured.

The fifth lens unit may be moved for focusing, or for image stabilization. By allowing the fifth lens unit to consist of one lens, the fifth lens unit can be reduced in weight. The fifth lens unit can then be moved at a higher speed at the time of focusing or image stabilization. In other words, camera shake focusing with a high followability, or image stabilization with a high followability can be achieved. Furthermore, the position of the lens unit can be easily controlled. Therefore, improvement of imaging accuracy and improvement of speed can be achieved.

In the variable magnification optical system according to the present embodiment, the following Conditional Expression (14) may be satisfied:

$$0.5 \leq fG5/fG56w \leq 2.5 \tag{14}$$

where fG5 is the focal length of the fifth lens unit, and fG56w is a composite focal length of the fifth lens unit and the sixth lens unit at the wide angle end.

In a case of exceeding a lower limit value of the Conditional Expression (14), it is less likely that correction of astigmatism or correction of coma becomes excessive. Therefore, favorable imaging performance can be obtained. In a case of falling below an upper limit value of the Conditional Expression (15), it is less likely that the correction of astigmatism or the correction of coma becomes insufficient. Therefore, favorable imaging performance can be obtained.

In the variable magnification optical system according to the present embodiment, the following Conditional Expression (15) may be satisfied:

$$0.5 \leq |fG5/fG4| \leq 2.5 \tag{15}$$

where fG4 is a focal length of the fourth lens unit, and fG5 is the focal length of the fifth lens unit.

In a case of exceeding a lower limit value of the Conditional Expression (15), it is less likely that correction of astigmatism or correction of coma becomes excessive. Therefore, favorable imaging performance can be obtained. In a case of falling below an upper limit value of the Conditional Expression (15), it is less likely that the correction of astigmatism or the correction of coma becomes insufficient. Therefore, favorable imaging performance can be obtained. Furthermore, because variation of the position of the image plane becomes small at the time of focusing, favorable imaging performance can be obtained.

In the variable magnification optical system according to the present embodiment, the following Conditional Expression (16) may be satisfied:

$$0.026 \leq DG56aw/fG56w \leq 0.4 \tag{16}$$

where

DG56aw is the air space between the fifth lens unit and the sixth lens unit at the wide angle end, and fG56w is the composite focal length of the fifth lens unit and the sixth lens unit at the wide angle end.

In a case of exceeding a lower limit value of the Conditional Expression (16), an effect of correcting astigmatism and effect of correcting coma can be obtained sufficiently. In a case of falling below an upper limit value of the Conditional Expression (16), the thickness of the fifth lens unit along the optical axis is not increased. In this case, a space in which a lens unit moves at a time of changing magnification increases. Therefore, a higher magnification ratio can be obtained.

In the variable magnification optical system according to the present embodiment, the following Conditional Expression (17) may be satisfied:

$$0.1 \leq DG56aw/fw \leq 2.0 \quad (17)$$

where

DG56aw is the air space between the fifth lens unit and the sixth lens unit at the wide angle end, and fw is the focal length of the variable magnification optical system at the wide angle end.

The technical meaning of Conditional Expression (17) is the same as the technical meaning of Conditional Expression (16).

In the variable magnification optical system according to the present embodiment, the following Conditional Expression (18) may be satisfied:

$$0.3 \leq |MGG4backw \times (MGG4w-1)| \leq 1.5 \quad (18)$$

where

MGG4w is a lateral magnification in the fourth lens unit at the wide angle end,

MGG4backw is a lateral magnification in a predetermined optical system at the wide angle end, the predetermined optical system is an optical system including the entire lenses that are positioned closer to the image side than the fourth lens unit is, and the lateral magnification is a lateral magnification at the time of focusing to an object at infinity.

In a case of exceeding a lower limit value of the Conditional Expression (18), correction of astigmatism or correction of coma will not tend to insufficient. Therefore, favorable imaging performance can be obtained. Furthermore, when the image stabilization is performed by moving the fourth lens unit, the sensitivity of the image stabilization does not become too low. In such a case, because the amount of movement of the fourth lens unit does not increase, the followability at the time of image stabilization can be improved.

In a case of falling below an upper limit value (18), the correction of astigmatism or the correction of coma will not be excessive. Therefore, favorable imaging performance can be obtained.

In the variable magnification optical system according to the present embodiment, the fifth lens unit may consist of one positive lens, and the following Conditional Expression (19) may be satisfied:

$$52 \leq vdG5P \leq 100 \quad (19)$$

where vdG5P is Abbe number of the positive lens in the fifth lens unit.

In a case of exceeding a lower limit value of the Conditional Expression (19), chromatic aberration of magnification can be corrected. Therefore, favorable imaging performance can be obtained. When image stabilization is performed by moving the fifth lens uni, the chromatic aberration will not be increased. Therefore, favorable imaging performance can be obtained.

In the variable magnification optical system according to the present embodiment, the following Conditional Expression (20) may be satisfied:

$$18.5 \leq vdG6N \leq 50 \quad (20)$$

where vdG6N is minimum Abbe number among Abbe numbers of the negative lenses in the sixth lens unit.

In a case of exceeding a lower limit value of the Conditional Expression (20), occurrence of a secondary spectrum can be suppressed. In such a case, correction of the chromatic aberration of magnification can be performed. Therefore, favorable imaging performance can be obtained.

In the variable magnification optical system according to the present embodiment, the aperture stop may be disposed between the second lens unit and the third lens unit.

By doing this, the diameters of the first lens unit and the diameters of the second lens unit, in particular, can be reduced.

In the variable magnification optical system according to the present embodiment, the aperture stop may be fixed at the time of changing magnification.

When the aperture stop is moved at the time of changing magnification, the position at which the aperture stop is stopped may vary. When the position where the aperture stop is stopped varies, the F-number also changes. When the aperture stop can be fixed at the time of changing magnification, variation in the position of the aperture stop does not occur. In this case, the F-number can be stabilized. As a result, even when F-number is small, a stable amount of light can be ensured across a broad range of the variable magnification range.

Moreover, electrical means may be used for changing the aperture diameter of the aperture stop. An example of the electric means includes an electric wire for transmitting electric signals. When the aperture stop is fixed at the time of changing magnification, since it is possible to reduce the movement amount of the aperture stop, it is possible to reduce change in length of the electrical wire. Consequently, it is possible to achieve electrical means with a structure with high durability.

In the variable magnification optical system according to the present embodiment, the following Conditional Expression (21) may be satisfied:

$$2.3 \leq |fG1/fG3| \leq 7 \quad (21)$$

where fG1 is the focal length of the first lens unit, and fG3 is the focal length of the third lens unit.

In a case of exceeding a lower limit value (21), the magnifying effect of the third lens unit is increased. Therefore, a high magnification ratio can be ensured. In a case of falling below an upper limit value of the Conditional Expression (21), the occurrence of spherical aberration or occurrence of coma in the third lens unit is mainly suppressed. As a result, small F-number can be obtained.

In the variable magnification optical system according to the present embodiment, the following Conditional Expression (22) may be satisfied:

$$0.5 \leq |fG3/fG4| \leq 2.0 \quad (22)$$

where f3 is the focal length of the third lens unit, and fG4 is the focal length of the fourth lens unit.

In a case of exceeding a lower limit value of the Conditional Expression (22), the effect of the correction of the curvature of field in the fourth lens unit is enhanced. Therefore, favorable imaging performance can be obtained across a broad range of the variable magnification range. In a case of falling below an upper limit value of the Conditional Expression (22), occurrence amount of astigmatism in the fourth lens unit does not increase. Therefore, it is less likely that a state in which the image becomes a biased blur due to assembly error occurs.

In the variable magnification optical system according to the present embodiment, the following Conditional Expression (23) may be satisfied:

$$0.25 \leq fG2/fG4 \leq 1.5 \quad (23)$$

where fG2 is the focal length of the second lens unit, and
fG4 is the focal length of the fourth lens unit.

In a case of exceeding a lower limit value of the Conditional Expression (23), the chromatic aberration of magnification in the second lens unit is not increased. Therefore, favorable imaging performance can be obtained. In a case of falling below an upper limit value of the Conditional Expression (23), the magnifying effect of the second lens unit is increased. Therefore, a high magnification ratio can be obtained.

In the variable magnification optical system according to the present embodiment, the following Conditional Expression (24) may be satisfied:

$$0.25 \leq |fG2/fG3| \leq 1.5 \quad (24)$$

where fG2 is the focal length of the second lens unit, and
fG3 is the focal length of the third lens unit.

The technical meaning of Conditional Expression (24) is the same as the technical meaning of Conditional Expression (23).

In the variable magnification optical system according to the present embodiment, the first lens unit includes, sequentially from the object side, a negative lens and a positive lens, and the positive lens in the first lens unit is in proximity to the negative lens in the first lens unit, and the following Conditional Expression (25) may be satisfied:

$$-0.1 \leq fG1 \times PG1NPa \leq 0.27 \quad (25)$$

where fG1 is the focal length of the first lens unit,
PG1NPa is expressed by the following Equation:

$$PG1NPa = 1/RG1NB - 1/RG1PF,$$

RG1NB is a radius of curvature of the image-side lens surface of the negative lens in the first lens unit, and
RG1PF is a radius of curvature of the object-side lens surface of the positive lens in the first lens unit.

In a case of exceeding a lower limit value of the Conditional Expression (25), occurrence amount of astigmatism near the telephoto end does not become large. Therefore, favorable imaging performance can be obtained. In a case of falling below an upper limit value of the Conditional Expression (25), occurrence amount of spherical aberration near the telephoto end does not become large. Therefore, favorable imaging performance can be obtained.

The negative lens in the first lens unit and the positive lens in the first lens unit may be cemented. By doing this, a relative positioning error resulting from assembling the two lenses can be reduced. Therefore, favorable imaging performance can be obtained.

In the variable magnification optical system according to the present embodiment, the following Conditional Expression (26) may be satisfied:

$$2.5 \leq fG5/fw \leq 15 \quad (26)$$

where fG5 is the focal length of the fifth lens unit, and
fw is the focal length of the variable magnification optical system at the wide angle end.

In a case of exceeding a lower limit value of the Conditional Expression (26), it is less likely that correction of astigmatism or correction of coma becomes excessive. Therefore, even when the angle of view is increased, favorable imaging performance can be obtained. In a case of falling below an upper limit value of the Conditional Expression (26), it is less likely that the correction of astigmatism or the correction of coma becomes insufficient. Therefore, favorable imaging performance can be obtained.

In the variable magnification optical system according to the first embodiment, and the variable magnification optical system according to the fourth to the variable magnification optical system according to the seventh embodiment, the following Conditional Expression (27) may be satisfied:

$$-1.9 \leq SFG5 \leq 0.95 \quad (27)$$

where

SFG5 is expressed by the following Equation:

$$SFG5 = (RG5f + RG5r)/(RG5f - RG5r), \text{ where}$$

RG5f is the radius of curvature of the lens surface positioned closest to the object in the fifth lens unit, and
RG5r is the radius of curvature of the lens surface positioned closest to the image in the fifth lens unit.

The technical meaning of Conditional Expression (27) is the same as the technical meaning of Conditional Expression (27-1).

In the variable magnification optical system according to the present embodiment, the aperture stop may be moved only in one direction or fixed, at the time of changing magnification.

At a time of changing magnification, the aperture stop is movable along the optical axis. At the time of changing magnification, when the movement direction of the aperture stop is reversed in the middle, an error may occur in the position of the aperture stop with respect to the image surface. An error of the position is caused by backlash, for example, in the movement mechanism using a gear. The position of the aperture stop can be always stabilized by setting the movement direction of the aperture stop only in one direction at the time of changing magnification. The F-number is changed together with changing magnification. When the position of the aperture stop is stabilized, the position of the aperture stop can be made agree or substantially agree with the position at a time of design. Consequently, it is possible to reduce an error at a time when the F-number is changed.

When F-number is made small, flare easily occurs. At the time of changing magnification, when the position of the aperture stop can be fixed, an error caused when the F-number is changed can be further reduced. Consequently, occurrence of flare can be reduced.

In the variable magnification optical systems according to the first embodiment to the variable magnification optical systems according to the third, and the variable magnification optical systems according to the fifth to the seventh embodiment, the following Conditional Expression (28) may be satisfied:

$$26.9° \leq \Omega Hw/2 \leq 75° \quad (28)$$

where $\Omega Hw$ is the total angle of view in the horizontal direction at the wide angle end.

The technical significance of Conditional Expression (28) is as described above.

In the variable magnification optical systems according to the first embodiment to the variable magnification optical systems according to the third embodiment, the variable magnification optical systems according to the sixth embodiment, and the variable magnification optical systems according to the seventh embodiment, the following Conditional Expression (29) may be satisfied:

$$5.5 \leq ft/fw \leq 120 \tag{29}$$

where ft is the focal length of the variable magnification optical system at the telephoto end, and fw is the focal length of the variable magnification optical system at the wide angle end.

The technical significance of Conditional Expression (29) is as described above.

In the variable magnification optical systems according to the first embodiment, the variable magnification optical systems according to the second embodiment, the variable magnification optical systems according to the sixth embodiment, and the variable magnification optical systems according to the seventh embodiment, the following Conditional Expression (30) may be satisfied:

$$0.6 \leq FNOw \leq 1.84 \tag{30}$$

where

FNOw is the F-number at the wide angle end.

The technical significance of Conditional Expression (30) is as described above.

In the variable magnification optical system according to the present embodiment, the following Conditional Expression (31) may be satisfied:

$$0.7 \leq FNOt \leq 5.1 \tag{31}$$

where

FNOt is the F-number at the telephoto end.

In a case of exceeding a lower limit value of the Conditional Expression (31), it is possible to suppress occurrence of spherical aberration and occurrence of astigmatism near the telephoto end in each of the first lens unit, the second lens unit, and the third lens unit. Even when favorable imaging performance is to be obtained, each of the lens units will not be increased in size. Therefore, it is possible to make the optical system small-sized.

In a case of falling below an upper limit value of the Conditional Expression (31), sufficient brightness can be ensured at the telephoto end. Therefore, in the case of a monitoring camera, a favorable image can be obtained in monitoring in cloudy weather or at night.

In the variable magnification optical system according to the present embodiment, the following Conditional Expression (32) may be satisfied:

$$-20 \leq ft/fw+143.9 \times \tan(\Omega Hw/2)-121.88 \leq 140 \tag{32}$$

where fw is the focal length of the variable magnification optical system at the wide angle end ft is the focal length of the variable magnification optical system at the telephoto end, and ΩHw is the total angle of view in the horizontal direction at the wide-angle.

The technical meaning of Conditional Expression (32) is the same as the technical meaning of Conditional Expression (34).

In the variable magnification optical systems according to the first embodiment, and the variable magnification optical systems according to the third embodiment to the variable magnification optical systems according to the seventh embodiment, the following Conditional Expression (33) may be satisfied:

$$-1.5 \leq ft/fw+126.52 \times \tan(\Omega Hw/2)-101.91 \leq 140 \tag{33}$$

where fw is the focal length of the variable magnification optical system at the wide angle end, ft is the focal length of the variable magnification optical system at the telephoto end, and ΩHw is the total angle of view in the horizontal direction at the wide angle end.

The technical significance of Conditional Expression (33) is as described above.

In the variable magnification optical system according to the second embodiment to the variable magnification optical system according to the seventh embodiment, the following Conditional Expression (34) may be satisfied:

$$-2.0 \leq ft/fw+13.38 \times \tan(\Omega Hw/2)-21.0 \leq 140 \tag{34}$$

where fw is the focal length of the variable magnification optical system at the wide angle end ft is the focal length of the variable magnification optical system at the telephoto end, and ΩHw is the total angle of view in the horizontal direction at the wide angle end.

The technical significance of Conditional Expression (34) is as described above.

In the variable magnification optical system according to the present embodiment, the following Conditional Expression (35) may be satisfied:

$$-3 \leq ft/fw+80.72 \times \tan(\Omega Hw/2)-62.0 \leq 140 \tag{35}$$

where fw is the focal length of the variable magnification optical system at the wide angle end ft is the focal length of the variable magnification optical system at the telephoto end, and ΩHw is the total angle of view in the horizontal direction at the wide angle end.

The technical meaning of Conditional Expression (35) is the same as the technical meaning of Conditional Expression (34).

In the variable magnification optical system according to the present embodiment, a positive lens and a negative lens may be included within a section from the fifth lens unit to the image plane.

If the refractive power of each of the lens units can be increased, the magnifying effect can be increased. If a higher magnifying effect can be achieved, the whole length of the optical system can be reduced, and the diameter of the optical system can be reduced. If the magnifying effect is increased, however, when a small F-number is to be achieved, it becomes difficult to ensure favorable imaging performance across a broad range of the variable magnification range.

The second lens unit can get involved in ensuring a wide angle of view at the wide angle end. If a higher magnifying effect can be achieved, chromatic aberration of magnification is more likely to occur in the second lens unit. Even if chromatic aberration of magnification occurs in the second lens unit, as long as the chromatic aberration of magnification in the entire optical system can be suppressed, a broader angle of view at the wide angle end can be ensured, the optical system can be reduced in size, and a small F-number can be ensured.

Within a section from the fifth lens unit to the image plane, the separation between an axial light flux and an off-axis light flux at the wide angle end is similar to that in the second lens unit. If a lens unit can be disposed within the section from the fifth lens unit to the image plane, chromatic aberration of magnification can be occurred in the lens unit. At this time, the direction in which chromatic aberration of magnification occurs in the lens unit can be set reverse to the direction in which chromatic aberration of magnification occurs in the second lens unit.

The positive lens and the negative lens can be disposed within the section from the fifth lens unit to the image plane. Using the negative lens and the positive lens, it is possible that the direction in which chromatic aberration of magnification occurs in the negative lens and the positive lens can be set reverse to the direction in which chromatic aberration of magnification occurs in the second lens unit.

In this manner, because the positive lens and the negative lens can be provided with a function of correcting the chromatic aberration of magnification, the chromatic aberration of magnification occurred in the second lens unit can be corrected with the positive lens and the negative lens. As a result, chromatic aberration of magnification can be corrected, and highly variable magnification can be achieved from the wide-angle range.

However, when the chromatic aberration of magnification is selectively corrected, astigmatism and/or coma may occur. Accordingly, when only the chromatic aberration of magnification is selectively suppressed, an adverse influence may occur on imaging performance. In a section closer to the fourth lens unit, aberration correction ability becomes high in the section from the fifth lens unit to the image plane. A lens component having a positive refractive power may, therefore, be disposed in the section closest to the fourth lens unit. In this manner, the lens component can suppress the aberrations other than the chromatic aberration of magnification.

In the variable magnification optical system according to the present embodiment, the following Conditional Expression (36) may be satisfied:

$$0.04 \leq \Sigma G1/LTLw \leq 0.33 \quad (36)$$

where
$\Sigma G1$ is the thickness of the first lens unit, and
LTLw is the whole length of the variable magnification optical system at the wide angle end.

In a case of exceeding a lower limit value of the Conditional Expression (36), a sufficient refractive power can be ensured in the first lens unit. Therefore, the whole length of the optical system can be reduced. In a case of falling below an upper limit value of the Conditional Expression (36) and the whole length of the optical system is reduced, it is possible to ensure a space for allowing the second lens unit to move at the time of changing magnification. Therefore, a wide angle of view can be ensured on the wide-angle side, and highly variable magnification can be achieved.

In the variable magnification optical system according to the present embodiment, the fourth lens unit and the fifth lens unit can both be moved at the time of focusing.

By doing this, the imaging performance at the time of focusing to an object at a very close distance can be improved.

In the variable magnification optical system according to the present embodiment, the following Conditional Expression (37) may be satisfied:

$$0.01 \leq |fG5/fG6| \leq 3.0 \quad (37)$$

where
fG5 is the focal length of the fifth lens unit, and
fG6 is a focal length of the sixth lens unit.

A function of correcting astigmatism and a function of correcting chromatic aberration of magnification are achieved between the fifth lens unit and the sixth lens unit. In a case of exceeding a lower limit value of the Conditional Expression (36), or in a case of falling below an upper limit value of the Conditional Expression (36), the function of correcting astigmatism correction or the function of correcting chromatic aberration of magnification are enhanced. Therefore, favorable imaging performance can be obtained.

The image pickup apparatus according to the present embodiment includes an optical system, and an image pickup element having an image pickup surface and converting an image formed on the image pickup surface with the optical system into an electrical signal, wherein the optical system is the variable magnification optical system according to the present embodiment.

It is possible to provide an image pickup apparatus capable of acquiring an image of high image quality.

In the image pickup apparatus according to the present embodiment, the following Conditional Expression (38) can be satisfied:

$$2.5 \text{ mm} \leq Rimg \leq 40.0 \text{ mm} \quad (38)$$

where
Rimg is a radius of an image circle at the image pickup element.

The optical system used for a monitoring camera can have high resolution to secure a sufficient information amount. The high resolution means, for example, resolution of a high-definition television, or resolution higher than the resolution of the high-definition television. To obtain such resolution, the number of pixels of the image pickup element is, for example, 2.5 million or more, 3 million or more, or 8 million.

In a case of exceeding a lower limit value of the Conditional Expression (30), even when a high resolution is to be ensured, the pixel pitch does not become too small. In this case, the sensitivity of the image pickup element can be kept high. Therefore, favorable image can be acquired.

Examples of the image pickup apparatus are a digital camera, a video camera, a monitoring camera, and a camera for a television conference system.

Imaging needs in digital cameras and video cameras include, for example, two imaging needs. The first one is a demand for imaging a large building, and a demand for shooting a commemorative picture with a vast background. The second one is a demand for imaging with one imaging lens from imaging of a wide range to enlarged imaging of a subject.

To satisfy the first need, the view angle of the optical system may be increased. To satisfy the second need, the magnification ratio of the optical system may be increased. As an exemplary optical system satisfying these two needs, a variable magnification optical system having a half angle of view of 33 degrees or greater, and a magnification ratio of five times or higher is available. A variable magnification optical system having such specifications can be said to be an easy-to-use variable magnification optical system, because such an optical system can be used for various applications in capturing images.

Examples of needs in a monitoring camera include monitoring in a wider range, and monitoring with a higher magnification. For example, monitoring with a higher magnification enables easy identification of the numbers of the license plate, and identification of the person.

Other needs in the television conference system include a need for a capability for enabling users to see the entire conference room, or for seeing a part of the conference room more in detail.

Based on these, there might be greater needs for optical systems with a greater angle of view at the wide angle end, and with a magnification ratio exceeding five times, in applications for such image pickup apparatuses.

Moreover, there are cases where mobility is important in digital cameras and video cameras. Herein, the mobility indicates, for example, easy portability, stability in hand-held shooting, and high focus speed. To achieve excellent mobility of the apparatus, the optical system may have a small size and light weight. Moreover, in a monitoring camera, the optical system may be required to achieve reduction in size and reduction in diameter, because the place in which the monitoring camera is installed may be limited.

Moreover, when the image pickup apparatus may be shaken due to camera shake, in a case of capturing images at a low speed, the images may become blurry in some cases. In order to obtain clear images, F-number may be made small.

The variable magnification optical system according to the present embodiment can mainly be used for an optical system of an image pickup apparatus using an electronic image pickup element. In this case, the half angle of view can be set to 36° or more. The half angle of view may be set to 40° or more, or 42° or more. The following is correspondence between the half angle of view and the focal length.

| Half Angle of View | Focal Length |
|---|---|
| 40° or more | 25.7 mm or less |
| 42° or more | 24 mm or less |

The variable magnification optical system according to the present embodiment can secure a wide angle of view at the wide angle end and a small F-number, and enables favorable correction of aberrations. In addition, the variable magnification optical system according to the present embodiment achieves excellent mobility and excellent degree of freedom of installment, and includes an optical system with a small size and a small diameter. The variable magnification optical system according to the present embodiment can provide an image pickup optical system effective for stable imaging and rapid imaging without missing an imaging chance.

The variable magnification optical system and the optical apparatus described above can satisfy a plurality of structures simultaneously. In this manner, a favorable variable magnification optical system and a favorable optical apparatus can be obtained. Any combination of the structure may be adopted. For each of the conditional expressions, only the upper limit value or the lower limit value of the numerical value range of a more limited conditional expression can be limited.

At least one of the Conditional Expressions (1-1) to (38) may be combined with the basic configurations of the variable magnification optical system according to the present embodiments. In these combinations, the Conditional Expression (1) may be excluded.

For each of the conditional expressions, the lower limit value or the upper limit value can be changed as follows.

The following applies to the Conditional Expressions (1) and (1-1).

The lower limit value can be set any one of 0.013, 0.014, 0.02, 0.023, 0.025, 0.034, 0.035, 0.04, 0.045, 0.046, 0.05, and 0.06.

The upper limit value can be set to any one of 3.8, 2.6, 1.4, 0.6, 0.5, 0.3, 0.25, and 0.17.

The following applies to the Conditional Expression (2).

The upper limit value can be set to any one of 0.11, 0.1, 0.065, and 0.03.

The following applies to the Conditional Expression (3).

The lower limit value can be set to any one of 1.4, 1.5, 1.52, 1.6, 1.8, 2.0, 2.2, and 2.5.

The upper limit value can be set to any one of 4.3, 4.2, 4.1, 4.0, 3.8, 3.6, 3.5, 3.2, and 2.76.

The following applies to the Conditional Expression (4).

The lower limit value can be set to any one of −0.06, −0.059, −0.053, −0.05, −0.048, −0.04, and −0.02.

The upper limit value can be set to any one of 0.15, 0.11, 0.08, 0.074, 0.05, and 0.035.

The following applies to the Conditional Expression (5).

The lower limit value can be set to any one of −0.089, −0.068, −0.048, and −0.03.

The upper limit value can be set to any one of 0.083, 0.055, 0.05, and 0.028.

The following applies to the Conditional Expression (6).

The lower limit value can be set to any one of 5.6, 6.0, 7.2, 8.0, 8.8, 10, and 10.45.

The upper limit value can be set to any one of 31, 30, 27, 25, 22, and 18.

The following applies to the Conditional Expression (7).

The lower limit value can be set to any one of 0.33, 0.36, 0.38, 0.41, 0.50, 0.60, 0.70, and 0.80.

The upper limit value can be set to any one of 2.3, 2.2, 2.0, 1.9, 1.8, 1.6, and 1.29.

The following applies to the Conditional Expression (8).

The lower limit value can be set to any one of 4.0, 4.5, 4.6, 5.1, and 5.6.

The upper limit value can be set to any one of 8.7, 8.5, 8.4, 8.0, 7.4, and 6.9.

The following applies to the Conditional Expression (9).

The lower limit value can be set to any one of 1.5, 1.9, 2.0, 2.4, 2.5, and 2.8.

The upper limit value can be set to any one of 7.5, 7.4, 7.0, 6.7, 6.5, 6.1, and 5.5.

The following applies to Conditional Expression (10) (in units of "%").

The lower limit value can be set to anyone of −12.5, −11.0, −9.5, and −8.0.

The upper limit value can be set to any one of 2.7, 0.49, −1.8, and −4.1.

The following applies to the Conditional Expression (11).

The lower limit value can be set to any one of 64, 65, 66, 67, 69, 70, 74, and 80.

The upper limit value can be set to any one of 95, 91, 86, and 82.

The following applies to the Conditional Expression (12).

The lower limit value can be set to any one of 52, 53, 54, 55.52, 56, 59, 63, and 65.

The upper limit value can be set to any one of 95, 91, 86, and 82.

The following applies to the Conditional Expression (13).

The lower limit value can be set to any one of −1.1, −1.0, −0.8, −0.71, −0.60, −0.50, −0.32, and 0.07.

The upper limit value can be set to any one of 1.5, 1.3, 1.2, 1.1, 1.0, 0.90, 0.80, and 0.70.

The following applies to the Conditional Expression (14).

The lower limit value can be set to any one of 0.59, 0.6, 0.68, 0.7, 0.77, 0.8, and 0.86.

The upper limit value can be set to any one of 2.2, 2.0, 1.8, 1.7, 1.6, and 1.44.

The following applies to the Conditional Expression (15).
The lower limit value can be set to any one of 0.58, 0.6, 0.66, 0.7, 0.74, 0.83, and 0.9.
The upper limit value can be set to any one of 2.2, 2.0, 1.9, 1.8, 1.6, and 1.34.

The following applies to the Conditional Expression (16).
The lower limit value can be set to any one of 0.03, 0.04, 0.05, 0.06, and 0.07.
The upper limit value can be set to any one of 0.4, 0.35, 0.3, 0.28, and 0.24.

The following applies to the Conditional Expression (17).
The lower limit value can be set to any one of 0.12, 0.13, 0.15, 0.18, and 0.20.
The upper limit value can be set to any one of 1.7, 1.5, 1.2, and 0.97.

The following applies to the Conditional Expression (18).
The lower limit value can be set to any one of 0.35, 0.4, 0.42, 0.5, 0.55, 0.67, and 0.79.
The upper limit value can be set to any one of 1.4, 1.3, 1.2, 1.1, 1.0, and 0.94.

The following applies to the Conditional Expression (19).
The lower limit value can be set to any one of 54, 55, 56, 58, 59, 63, and 67.
The upper limit value can be set to any one of 95, 91, 86, and 82.

The following applies to the Conditional Expression (20).
The lower limit value can be set to any one of 19, 20, 23, and 25.
The upper limit value can be set to any one of 47, 45, 42, and 40.

The following applies to the Conditional Expression (21).
The lower limit value can be set to any one of 2.5, 2.6, 2.8, 3.0, and 3.30.
The upper limit value can be set to any one of 6.5, 6.2, 5.5, 5.4, 4.6, and 3.83.

The following applies to the Conditional Expression (22).
The lower limit value can be set to any one of 0.56, 0.63, 0.69, 0.7, 0.75, and 0.85.
The upper limit value can be set to any one of 1.8, 1.7, 1.6, 1.5, 1.4, and 1.26.

The following applies to the Conditional Expression (23).
The lower limit value can be set to any one of 0.2, 0.29, 0.33, 0.35, 0.37, 0.40, and 0.53.
The upper limit value can be set to any one of 1.6, 1.3, 1.2, 1.1, 1.0, and 0.9.

The following applies to the Conditional Expression (24).
The lower limit value can be set to any one of 0.31, 0.35, 0.38, 0.4, 0.44, 0.45, and 0.51.
The upper limit value can be set to any one of 1.3, 1.2, 1.1, 1.0, 0.9, and 0.65.

The following applies to the Conditional Expression (25).
The lower limit value can be set to any one of −0.08, −0.05, −0.03, −0.01, and 0.00.
The upper limit value can be set to any one of 0.2, 0.15, and 0.1.

The following applies to the Conditional Expression (26).
The lower limit value can be set to any one of 2.70, 2.89, 3.0, 3.09, 3.1, 3.2, 3.28, and 4.0.
The upper limit value can be set to any one of 12.7, 12, 10, 10.4, 8.1, 8.0, 7.0, and 5.80.

The following applies to the Conditional Expressions (27) and (27-1).
The lower limit value can be set to any one of −1.7, −1.5, −1.4, −1.2, −0.98, −0.97, −0.8, and −0.7.
The upper limit value can be set to any one of 0.8, 0.7, 0.6, 0.5, 0.4, 0.3, −0.3, and 0.27.

The following applies to the Conditional Expression (28) (in units of "° (degrees)").
The lower limit value can be set to anyone of 28.8, 30.74, 32.65, 34, 34.57, 37, 39, and 41.
The upper limit value can be set to any one of 67, 59, 51, and 43.05.

The following applies to the Conditional Expression (29).
The lower limit value can be set to any one of 6.9, 7.0, 8.3, 9.5, 9.8, 11.1, 12, 13.5, 14, and 21.
The upper limit value can be set to any one of 100, 81, 80, 63, 60, 45, 44, 40, 35, 30, and 26.

The following applies to the Conditional Expressions (30) and (30-1).
The lower limit value can be set to any one of 0.65, 0.76, 0.8, 0.9, 1.1, and 1.26.
The upper limit value can be set to any one of 1.8, 1.79, 1.78, 1.75, 1.70, and 1.65.

The following applies to the Conditional Expression (31).
The lower limit value can be set to any one of 0.8, 1.0, 1.2, 1.3, 1.7, and 1.97.
The upper limit value can be set to any one of 5.0, 4.9, 4.8, 4.7, 4.6, 4.3, 4.0, 3.5, and 4.48.

The following applies to the Conditional Expression (32).
The lower limit value can be set to any one of −14.4, −10, −8.7, −6.0, −5.0, −4.0, −3.1, 0.0, 1.0, 2.6, and 4.5.
The upper limit value can be set to any one of 112, 100, 83, 75, 60, 55, 50, 45, 40, and 27.

The following applies to the Conditional Expression (33).
The lower limit value can be set to any one of 1.5, 3.0, 4.0, 4.5, 5.0, 6.0, 7.0, 7.5, 8.0, 9.0, 10.6.
The upper limit value can be set to any one of 113, 100, 85, 75, 60, 58, 50, 45, 40, and 30.

The following applies to the Conditional Expression (34).
The lower limit value can be set to any one of −1.2, −0.4, 0.4, 1.1, 2.0, and 3.5.
The upper limit value can be set to any one of 120, 108, 90, 77, 70, 60, 50, 45, 40, and 14.

The following applies to the Conditional Expression (35).
The lower limit value can be set to any one of 1.6, 4, 6.1, 8, 9, 10.7, 12, 14, and 15.3.
The upper limit value can be set to any one of 112, 100, 84, 75, 60, 56, 50, 45, 40, and 28.

The following applies to the Conditional Expression (36).
The lower limit value can be set to any one of 0.050, 0.059, 0.069, and 0.08.
The upper limit value can be set to any one of 0.3, 0.25, 0.2, and 0.15.

The following applies to the Conditional Expression (37).
The lower limit value can be set to any one of 0.016, 0.022, 0.028, and 0.03.
The upper limit value can be set to any one of 2.4, 1.9, 1.3, and 0.70.

The following applies to the Conditional Expression (38) (in units of "mm").
The lower limit value can be set to any one of 2.7, 2.90, 3.0, 3.1, 3.30, 3.4, 3.5, 3.8, and 4.1.
The upper limit value can be set to any one of 31, 22, 13, and 4.00.

The following is detailed explanation of examples of the variable magnification optical system based on drawings. The examples do not limit the present invention.

The following is explanation of lens cross-sectional views of each of the examples.

FIG. 1A, FIG. 2A, FIG. 3A, FIG. 4A, FIG. 5A, and FIG. 6A show a cross-sectional view at a wide angle end.

FIG. 1B, FIG. 2B, FIG. 3B, FIG. 4B, FIG. 5B, and FIG. 6B show a cross-sectional view at an intermediate focal length state.

FIG. 1C, FIG. 2C, FIG. 3C, FIG. 4C, FIG. 5C, and FIG. 6C show a cross-sectional view at a telephoto end The following is explanation of aberration diagrams of each of the examples.

FIG. 7A, FIG. 8A, FIG. 9A, FIG. 10A, FIG. 11A, and FIG. 12A show a spherical aberration (SA) at a wide angle end.

FIG. 7B, FIG. 8B, FIG. 9B, FIG. 10B, FIG. 11B, and FIG. 12B show an astigmatism (AS) at a wide angle end.

FIG. 7C, FIG. 8c, FIG. 9C, FIG. 10O, FIG. 11C, and FIG. 12C show a distortion (DT) at a wide angle end.

FIG. 7D, FIG. 8d, FIG. 9D, FIG. 10D, FIG. 11D, and FIG. 12D show a chromatic aberration of magnification (CC) at a wide angle end.

In addition, FIG. 7E, FIG. 8E, FIG. 9E, FIG. 10E, FIG. 11E, and FIG. 12E show a spherical aberration (SA) at an intermediate focal length state.

FIG. 7F, FIG. 8F, FIG. 9F, FIG. 10F, FIG. 11F, and FIG. 12F shows an astigmatism (AS) at an intermediate focal length state.

FIG. 7G, FIG. 8G, FIG. 9G, FIG. 10G, FIG. 11G, and FIG. 12G show a distortion (DT) at an intermediate focal length state.

FIG. 7H, FIG. 8H, FIG. 9H, FIG. 10H, FIG. 11H, and FIG. 12H show a chromatic aberration of magnification (CC) at an intermediate focal length state.

In addition, FIG. 7I, FIG. 8I, FIG. 9I, FIG. 10I, FIG. 11I, and FIG. 12I show a spherical aberration (SA) at a telephoto end.

FIG. 7J, FIG. 8J, FIG. 9J, FIG. 10J, FIG. 11J, and FIG. 12J show an astigmatism (AS) at a telephoto end.

FIG. 7K, FIG. 8K, FIG. 9K, FIG. 10K, FIG. 11K, and FIG. 12K show a distortion (DT) at a telephoto end.

FIG. 7L, FIG. 8L, FIG. 9L, FIG. 10L, FIG. 11L, and FIG. 12L show a chromatic aberration of magnification (CC) at a telephoto end.

Both the lens cross-sectional views and the aberration diagrams are diagrams at a time of focusing to an object at infinity.

The first lens unit is indicated with G1, the second lens unit is indicated with G2, the third lens unit is indicated with G3, the fourth lens unit is indicated with G4, the fifth lens unit is indicated with G5, the sixth lens unit is indicated with G6, the aperture stop (aperture diaphragm) is indicated with S, and the image surface (image pickup surface) is indicated with I. Moreover, a cover glass C of the image pickup element can be disposed between the sixth lens unit G6 and the image surface I.

The variable magnification optical system according to Example 1 includes, sequentially from the object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a positive refractive power. An aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11.

The sixth lens unit G6 includes a biconcave negative lens L12 and a biconvex positive lens L13. Herein, the biconcave negative lens L12 and the biconvex positive lens L13 are cemented.

At the time of changing magnification, the first lens unit G1 is fixed, the second lens unit G2 is moved to the image side, the third lens unit G3 is moved to the object side, the fourth lens unit G4 is moved to the image side, the fifth lens unit G5 is moved to the image side, and the sixth lens unit G6 is fixed. The aperture stop S is fixed.

At the time of focusing, the fifth lens unit G5 is moved along the optical axis. At the time of image stabilization, the fourth lens unit G4 is moved in a direction perpendicular to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

The variable magnification optical system according to Example 2 includes, sequentially from the object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11.

The sixth lens unit G6 includes a negative meniscus lens L12 having a convex surface facing the object side, and a positive meniscus lens L13 having a convex surface facing the object side. Herein, the negative meniscus lens L12 and the positive meniscus lens L13 are cemented.

At the time of changing magnification, the first lens unit G1 is fixed, the second lens unit G2 is moved to the image side, the third lens unit G3 is moved to the object side, the fourth lens unit G4, the fifth lens unit G5, and the sixth lens unit G6 are fixed. The aperture stop S is fixed.

At the time of focusing, the fifth lens unit G5 is moved along the optical axis. At the time of image stabilization, the fourth lens unit G4 is moved in a direction perpendicular to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

The variable magnification optical system according to Example 3 includes, sequentially from the object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11.

The sixth lens unit G6 includes a negative meniscus lens L12 having a convex surface facing the object side, and a biconvex positive lens L13. Herein, the negative meniscus lens L12 and the biconvex positive lens L13 are cemented.

At the time of changing magnification, the first lens unit G1 is fixed, the second lens unit G2 is moved to the image side, the third lens unit G3 is moved to the object side, and the fourth lens unit G4 is moved to the object side, and thereafter moved to the image side, and the fifth lens unit G5 and the sixth lens unit G6 are fixed. The aperture stop S is fixed.

At the time of focusing, the fifth lens unit G5 is moved along the optical axis. At the time of image stabilization, the fourth lens unit G4 is moved in a direction perpendicular to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

The variable magnification optical system according to Example 4 includes, sequentially from the object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11.

The sixth lens unit G6 includes a negative meniscus lens L12 having a convex surface facing the object side, and a biconvex positive lens L13. Herein, the negative meniscus lens L12 and the biconvex positive lens L13 are cemented.

At the time of changing magnification, the first lens unit G1 is moved to the image side, and thereafter moved to the object side, the second lens unit G2 is moved to the image side, the third lens unit G3 is moved to the object side, and the fourth lens unit G4, the fifth lens unit G5, and the sixth lens unit G6 are fixed. The aperture stop S is fixed.

At the time of focusing, the fifth lens unit G5 is moved along the optical axis. At the time of image stabilization, the fourth lens unit G4 is moved in a direction perpendicular to the optical axis.

An aspherical surface is provided on each of eight surfaces in total, that is, both surfaces of the biconcave negative lens L5, both surfaces of the biconvex positive lens L7, both surfaces of the biconcave negative lens L10, and both surfaces of the biconvex positive lens L11.

The variable magnification optical system according to Example 5 includes, sequentially from the object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a positive refractive power. The aperture stop S is disposed between the second lens unit G2 and the third lens unit G3.

The first lens unit G1 includes a negative meniscus lens L1 having a convex surface facing the object side, a positive meniscus lens L2 having a convex surface facing the object side, and a positive meniscus lens L3 having a convex surface facing the object side. Herein, the negative meniscus lens L1 and the positive meniscus lens L2 are cemented.

The second lens unit G2 includes a negative meniscus lens L4 having a convex surface facing the object side, a biconcave negative lens L5, and a biconvex positive lens L6.

The third lens unit G3 includes a biconvex positive lens L7, a negative meniscus lens L8 having a convex surface facing the object side, and a biconvex positive lens L9. Herein, the negative meniscus lens L8 and the biconvex positive lens L9 are cemented.

The fourth lens unit G4 includes a biconcave negative lens L10.

The fifth lens unit G5 includes a biconvex positive lens L11, and a negative meniscus lens L12 having a convex surface facing the image side. Herein, the biconvex positive lens L11 and the negative meniscus lens L12 are cemented.

The sixth lens unit G6 includes a negative meniscus lens L13 having a convex surface facing the object side, and a biconvex positive lens L14. Herein, the negative meniscus lens L13 and the biconvex positive lens L14 are cemented.

At the time of changing magnification, the first lens unit G1 is fixed, the second lens unit G2 is moved to the image side, the third lens unit G3 is moved to the object side, and the fourth lens unit G4 is moved to the object side, and thereafter moved to the image side, and the fifth lens unit G5 and the sixth lens unit G6 are fixed. The aperture stop S is fixed.

At the time of focusing, the fifth lens unit G5 is moved along the optical axis. At the time of image stabilization, the fourth lens unit G4 or the fifth lens unit G5 is moved in a direction perpendicular to the optical axis.

An aspherical surface is provided on each of seven surfaces in total, that is, both of the surfaces of the biconcave negative lens L5, both of the surfaces of the biconvex positive lens L7, both of the surfaces of the biconcave negative lens L10, and the object-side surface of the biconvex positive lens L11.

The variable magnification optical system according to Example 6 includes, sequentially from the object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a negative refractive power. An aperture stop S is disposed between the second lens unit G2 and the third lens unit G3.

The first lens unit G1 includes a negative meniscus lens L1 having a convex surface facing the object side, a biconvex positive lens L2, a positive meniscus lens L3 having a convex surface facing the object side, and a positive meniscus lens L4 having a convex surface facing the object side. Herein, the negative meniscus lens L1 and the biconvex positive lens L2 are cemented.

The second lens unit G2 includes a negative meniscus lens L5 having a convex surface facing the object side, a biconcave negative lens L6, and a biconvex positive lens L7.

The third lens unit G3 includes a biconvex positive lens L8, a negative meniscus lens L9 having a convex surface facing the object side, and a biconvex positive lens L10. Herein, the negative meniscus lens L9 and the biconvex positive lens L10 are cemented.

The fourth lens unit G4 includes a biconcave negative lens L11.

The fifth lens unit G5 includes a biconvex positive lens L12.

The sixth lens unit G6 includes a biconcave negative lens L13 and a biconvex positive lens L14. Herein, the biconcave negative lens 13 and the biconvex positive lens L14 are cemented.

At the time of changing magnification, the first lens unit G1 is fixed, the second lens unit G2 is moved to the image side, the third lens unit and the fourth lens unit G4 are fixed, the fifth lens unit G5 is moved to the object side, and thereafter moved to the image side, and the sixth lens unit G6 is fixed. The aperture stop S is fixed.

At the time of focusing, the fifth lens unit G5 is moved along the optical axis. At the time of image stabilization, the fourth lens unit G4 is moved in a direction perpendicular to the optical axis.

An aspherical surface is provided on each of eight surfaces in total, that is, both of the surfaces of the negative meniscus lens L5, both of the surfaces of the biconvex positive lens L8, both of the surfaces of the biconcave negative lens L11, and both of the surfaces of the biconvex positive lens L12.

Table 2A, Table 2B, Table 2C and Table 2D illustrate a result of classification of the lens units based on two criteria. The lens units can be classified based on whether the lens unit makes a different movement relatively to a lens that is adjacently positioned. The movement relative to the adjacently positioned lens differs, depending on whether such a movement is made at the time of changing magnification, at the time of focusing, or at the time of image stabilization. Classification of the lens units differs among the case where the lens units are classified based on the relative movement at the time of changing magnification, the case where the lens units are classified based on the relative movement at the time of focusing, and the case where the lens units are classified based on the relative movement at the time of image stabilization.

For example, in Example 2, the following is classification in the case where the lens units are classified based on the relative movement at the time of changing magnification.

First lens unit: L1, L2, L3
Second lens unit: L4, L5, L6
Third lens unit: L7, L8, L9
Fourth lens unit: L10, L11, L12, L13

The following is classification in the case where the lens units are classified based on the relative movement at the time of image stabilization.

First lens unit: L1, L2, L3, L4, L5, L6, L7, L8, L9
Second lens unit: L10
Third lens unit: L11, L12, L13

The following is classification in the case where the lens units are classified based on the relative movement at the time of focusing.

First lens unit: L1, L2, L3, L4, L5, L6, L7, L8, L9, L10
Second lens unit: L11
Third lens unit: L12, L13

In the manner described above, the number of lens units and the number of lenses included in one lens unit differ among the case where the lens units are classified based on the relative movement at the time of changing magnification, the case where the lens units are classified based on the relative movement at the time of focusing, and the case where the lens units are classified based on the relative movement at the time of image stabilization.

When a group of lenses formed of the smallest number of lenses is regarded as one lens unit, the following is the lens units in the case where the lens units are classified based on the relative movement at the time of changing magnification, the relative movement at the time of focusing, and the relative movement at the time of image stabilization.

First lens unit: L1, L2, L3
Second lens unit: L4, L5, L6
Third lens unit: L7, L8, L9
Fourth lens unit: L10
Fifth lens unit: L11
Sixth lens unit: L12, L13

Table 1A, Table 1B and Table 10 illustrate the case where the lens units are classified based on change in space only at a time of changing magnification as "Classification 1", and the case where the lens units are classified based on change in space at a time of changing magnification and change in space at a time of focusing as "Classification 2".

TABLE 1A

|  | Example 1 | Example 2 |
|---|---|---|
| Classification 1 | six lens units | four lens units |
| Classification 2 | six lens units | six lens units |

TABLE 1B

|  | Example 3 | Example 4 |
|---|---|---|
| Classification 1 | five lens units | four lens units |
| Classification 2 | six lens units | six lens units |

TABLE 1C

|  | Example 5 | Example 6 |
|---|---|---|
| Classification 1 | four lens units | five lens units |
| Classification 2 | six lens units | five lens units |

Numerical data of each example described above is shown below. In Surface data, r denotes radius of curvature of each lens surface, d denotes a distance between respective lens surfaces, and denotes a refractive index of each lens for a d-line, vd denotes an Abbe number for each lens and *denotes an aspheric surface.

Further, in Zoom Data, f denotes a focal length of the variable magnification optical system, FNO, denotes an F number, ω denotes a half angle of view, IH denotes an image height, LTL denotes a lens total length of the optical system, and BF denotes a back focus. Further, back focus is a distance from a rearmost lens surface to a paraxial image surface. The lens total length is a distance from a frontmost lens surface to the rearmost lens surface plus back focus. WE denotes a wide angle end, ST denotes a intermediate focal length state, TE denotes a telephoto end.

Further, in Unit Focal Length, each of f1, f2 . . . is a focal length of each lens unit.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'e-n' (where, n is an integral number) indicates '$10^{-n}$'. Moreover, these symbols are commonly used in the following numerical data for each example.

EXAMPLE 1

Unit mm

Surface Data

| Surface no. | r | d | nd | vd |
|---|---|---|---|---|
| Object plane | ∞ | ∞ | | |
| 1 | 76.358 | 1.400 | 1.85478 | 24.80 |
| 2 | 34.099 | 9.961 | 1.49700 | 81.54 |

-continued

| Surface no. | r | d | nd | vd |
|---|---|---|---|---|
| 3 | 750.873 | 0.150 | | |
| 4 | 35.998 | 6.007 | 1.83481 | 42.73 |
| 5 | 128.422 | Variable | | |
| 6 | 115.893 | 0.800 | 1.77250 | 49.60 |
| 7 | 9.600 | 6.946 | | |
| 8* | −19.203 | 0.820 | 1.85135 | 40.10 |
| 9* | 18.055 | 0.828 | | |
| 10 | 28.409 | 3.119 | 2.00069 | 25.46 |
| 11 | −42.211 | Variable | | |
| 12 (Stop) | ∞ | Variable | | |
| 13* | 21.462 | 4.500 | 1.80610 | 40.88 |
| 14* | −69.689 | 0.100 | | |
| 15 | 16.891 | 2.110 | 2.00069 | 25.46 |
| 16 | 9.055 | 4.952 | 1.49700 | 81.54 |
| 17 | −35.239 | Variable | | |
| 18* | −29.799 | 0.858 | 1.51633 | 64.14 |
| 19* | 11.466 | Variable | | |
| 20* | 19.994 | 4.974 | 1.59201 | 67.02 |
| 21* | −11.555 | Variable | | |
| 22 | −67.886 | 0.523 | 1.92286 | 20.88 |
| 23 | 9.332 | 3.735 | 1.90043 | 37.37 |
| 24 | −50.184 | 4.825 | | |
| Image plane | ∞ | | | |

Aspherical Surface Data

8th surface
k=0.0000
A4=1.4190e−004, A6=−5.0390e−006, A8=1.1656e−007, A10=−1.4459e−009, A12=6.9370e−012, A14=0.0000e+000

9th surface
k=0.0000
A4=3.1502e−005, A6=−4.6522e−006, A8=1.1052e−007, A10=−1.3514e−009, A12=6.5108e−012, A14=0.0000e+000

13th surface
k=0.0000
A4=−1.1778e−005, A6=−1.4823e−007, A8=3.9038e−009, A10=−1.2515e−010, A12=5.4754e−013, A14=0.0000e+000

14th surface
k=0.0000
A4=1.6142e−005, A6=−9.8514e−008, A8=−4.7755e−009, A10=2.6274e−011, A12=−2.5866e−013, A14=0.0000e+000

18th surface
k=0.0000
A4=−4.4383e−004, A6=4.0371e−006, A8=1.3468e−007, A10=−4.6965e−009, A12=6.9962e−011, A14=0.0000e+000

19th surface
k=0.0000
A4=−5.4052e−004, A6=−1.3916e−006, A8=3.0352e−007, A10=−8.0286e−009, A12=1.0508e−010, A14=0.0000e+000

20th surface
k=0.0000
A4=−3.4323e−005, A6=−3.0201e−006, A8=2.2878e−008, A10=−9.9332e−010, A12=0.0000e+000, A14=0.0000e+000

21th surface
k=0.0000
A4=2.7302e-004, A6=-3.3353e-006, A8=7.7118e-009, A10=-3.8748e-010, A12=0.0000e+000, A14=0.0000e+000

Zoom Data

|     | WE      | ST      | TE      |
| --- | ------- | ------- | ------- |
| f   | 4.001   | 14.360  | 58.297  |
| FNO.| 1.417   | 2.395   | 3.630   |
| 2ω  | 86.3    | 27.6    | 6.8     |
| IH  | 3.60    | 3.60    | 3.60    |
| LTL | 112.102 | 112.102 | 112.102 |
| BF  | 4.825   | 4.825   | 4.825   |
| d5  | 0.401   | 21.095  | 32.932  |
| d11 | 33.728  | 13.034  | 1.197   |
| d12 | 10.618  | 7.177   | 1.195   |
| d17 | 0.999   | 5.013   | 11.520  |
| d19 | 7.557   | 7.640   | 7.635   |
| d21 | 2.190   | 1.534   | 1.014   |

Unit Focal Length
f1=58.51995 f2=-9.45149 f3-15.19986 f4=-15.9238 f5=13.14017 f6=389.62769

EXAMPLE 2

Unit mm

Surface Data

| Surface no. | r       | d        | nd      | vd    |
| ----------- | ------- | -------- | ------- | ----- |
| Object plane| ∞       | ∞        |         |       |
| 1           | 81.040  | 1.400    | 1.85478 | 24.80 |
| 2           | 31.264  | 8.940    | 1.49700 | 81.54 |
| 3           | 354.912 | 0.150    |         |       |
| 4           | 36.279  | 5.450    | 1.90043 | 37.37 |
| 5           | 172.059 | Variable |         |       |
| 6           | 107.527 | 0.800    | 1.75500 | 52.32 |
| 7           | 10.000  | 6.239    |         |       |
| 8*          | -20.630 | 0.800    | 1.85135 | 40.10 |
| 9*          | 22.049  | 2.062    |         |       |
| 10          | 41.189  | 2.700    | 2.00069 | 25.46 |
| 11          | -53.219 | Variable |         |       |
| 12 (Stop)   | ∞       | Variable |         |       |
| 13*         | 17.884  | 3.700    | 1.82080 | 42.71 |
| 14*         | -98.517 | 0.739    |         |       |
| 15          | 24.943  | 0.550    | 1.95375 | 32.32 |
| 16          | 9.050   | 5.700    | 1.59282 | 68.63 |
| 17          | -30.778 | Variable |         |       |
| 18*         | -15.087 | 0.550    | 1.49700 | 81.54 |
| 19*         | 13.007  | 6.050    |         |       |
| 20*         | 14.756  | 5.219    | 1.49700 | 81.54 |
| 21*         | -12.076 | 0.800    |         |       |
| 22          | 31.498  | 0.500    | 1.92286 | 18.90 |
| 23          | 8.411   | 4.250    | 1.88300 | 40.76 |
| 24          | 87.922  | 5.200    |         |       |
| Image plane | ∞       |          |         |       |

Aspherical Surface Data
8th surface
k=0.0000
A4=2.1520e-004, A6=-6.4489e-006, A8=9.7910e-008, A10=-7.9110e-010, A12=2.5549e-012, A14=0.0000e+000
9th surface
k=0.0000
A4=1.3630e-004, A6=-6.1502e-006, A8=9.1768e-008, A10=-6.2920e-010, A12=1.4410e-012, A14=0.0000e+000
13th surface
k=0.0000
A4=-1.3970e-005, A6=-4.7758e-007, A8=-1.3134e-008, A10=8.1039e-011, A12=0.0000e+000, A14=0.0000e+000
14th surface
k=0.0000
A4=2.9296e-005, A6=-1.9795e-007, A8=-9.9355e-009, A10=6.0400e-011, A12=0.0000e+000, A14=0.0000e+000
18th surface
k=0.0000
A4=-3.4204e-004, A6=9.6433e-006, A8=4.7726e-009, A10=-1.8121e-009, A=0.0000e+000, A14=0.0000e+000
19th surface
k=0.0000
A4=-5.1284e-004, A6=5.8114e-006, A8=7.5767e-008, A10=-2.2253e-009, A12=0.0000e+000, A14=0.0000e+000
20th surface
k=0.0000
A4=-1.1498e-006, A6=-2.2945e-006, A8=4.0844e-009, A10=-5.8297e-011, A12=0.0000e+000, A14=0.0000e+000
21th surface
k=0.0000
A4=3.1930e-004, A6=-2.8428e-006, A8=4.3333e-009, A10=7.6108e-012, A12=0.0000e+000, A14=0.0000e+000

Zoom Data

|     | WE      | ST      | TE      |
| --- | ------- | ------- | ------- |
| f   | 3.951   | 14.220  | 44.208  |
| FNO.| 1.634   | 1.902   | 1.972   |
| 2ω  | 86.4    | 26.5    | 8.6     |
| IH  | 3.41    | 3.41    | 3.41    |
| LTL | 106.27  | 106.27  | 106.27  |
| BF  | 5.200   | 5.200   | 5.200   |
| d5  | 0.373   | 21.442  | 32.369  |
| d11 | 33.356  | 12.287  | 1.360   |
| d12 | 8.080   | 4.581   | 1.072   |
| d17 | 2.662   | 6.161   | 9.670   |

Unit Focal Length
f1=56.59748 f2=-9.95663 f3=15.24881 f4=-13.96397 f5=14.28508 f6=65.84716

EXAMPLE 3

Unit mm

Surface Data

| Surface no. | r        | d        | nd      | vd    |
| ----------- | -------- | -------- | ------- | ----- |
| Object plane| ∞        | ∞        |         |       |
| 1           | 96.913   | 1.600    | 1.92119 | 23.96 |
| 2           | 35.025   | 6.931    | 1.51633 | 64.14 |
| 3           | 275.273  | 0.250    |         |       |
| 4           | 42.405   | 4.600    | 1.91082 | 35.25 |
| 5           | 264.575  | Variable |         |       |
| 6           | 264.575  | 0.950    | 1.78800 | 47.37 |
| 7           | 10.900   | 5.812    |         |       |
| 8           | -120.313 | 0.800    | 1.85135 | 40.10 |

-continued

| Surface no. | r | d | nd | vd |
|---|---|---|---|---|
| 9 | 15.518 | 5.151 | | |
| 10 | 45.483 | 2.700 | 1.92286 | 20.88 |
| 11 | −120.498 | Variable | | |
| 12 (Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | Variable | | |
| 20* | 13.004 | 3.800 | 1.58313 | 59.38 |
| 21* | −850.000 | 3.800 | | |
| 22 | 18.320 | 0.600 | 2.00100 | 29.13 |
| 23 | 8.400 | 5.727 | 1.61800 | 63.40 |
| 24 | −31.484 | 2.042 | | |
| 25 | ∞ | 0.500 | 1.51633 | 64.14 |
| 26 | ∞ | 3.500 | | |
| Image plane | ∞ | | | |

Aspherical Surface Data
8th surface
k=0.0000
A4=1.5897e−004, A6=−4.6243e−006, A8=−6.0294e−008,
A10=−4.3744e−010, A12=1.4215e−012, A14=0.0000e+000
9th surface
k=0.0000
A4=5.4622e−005, A6=−4.8681e−006, A8=6.2006e−008,
A10=−4.3749e−010, A12=1.3677e−012, A14=0.0000e+000
13th surface
k=0.0000
A4=−8.0152e−007, A6=−3.4395e−007, A8=9.0517e−009,
A10=−1.4953e−010, A12=9.3464e−013, A14=0.0000e+000
14th surface
k=0.0000
A4=2.4705e−005, A6=−4.0759e−007, A8=1.0962e−008,
A10=−2.0152e−010, A12=1.4434e−012, A14=0.0000e+000
18th surface
k=0.0000
A4=1.5541e−004, A6=−6.7393e−006, A8=2.3846e−007,
A10=−5.0744e−009, A12=5.5675e−011, A14=0.0000e+000
19th surface
k=0.0000
A4=1.4156e−004, A6=−9.5105e−006, A8=3.6964e−007,
A10=−8.9290e−009, A12=1.0492e−010, A14=0.0000e+000
20th surface
k=0.0000
A4=2.1326e−005, A6=−1.5883e−006, A8=2.2701e−008,
A10=−3.9311e−010, A12=1.3883e−012, A14=0.0000e+000
21th surface
k=0.0000
A4=8.9785e−005, A6=−2.2240e−006, A8=4.2912e−008,
A10=−8.1741e−010, A12=4.8550e−012, A14=0.0000e+000

Zoom Data

| | WE | ST | TE |
|---|---|---|---|
| f | 3.920 | 13.900 | 55.458 |
| FNO. | 1.642 | 2.762 | 3.803 |
| 2ω | 93.9 | 31.9 | 8.1 |
| IH | 4.00 | 4.00 | 4.00 |
| LTL | 135.2677 | 135.2677 | 135.2677 |
| BF | 3.500 | 3.500 | 3.500 |
| d5 | 0.701 | 19.946 | 37.993 |
| d11 | 38.792 | 19.547 | 1.500 |
| d12 | 25.310 | 5.263 | 1.200 |
| d17 | 1.806 | 8.048 | 22.221 |
| d19 | 3.300 | 17.105 | 6.995 |

Unit Focal Length
f1=69.5426 f2=−10.66131 f3=21.0955 f4=−16.72209 f5=22.00062 f6=35.18717

EXAMPLE 4

Unit mm

Surface Data

| Surface no. | r | d | nd | vd |
|---|---|---|---|---|
| Object plane | ∞ | ∞ | | |
| 1 | 96.913 | 1.600 | 1.92119 | 23.96 |
| 2 | 35.025 | 6.931 | 1.51633 | 64.14 |
| 3 | 275.273 | 0.250 | | |
| 4 | 42.405 | 4.600 | 1.91082 | 35.25 |
| 5 | 264.575 | Variable | | |
| 6 | 264.575 | 0.950 | 1.78800 | 47.37 |
| 7 | 10.900 | 5.812 | | |
| 8* | −120.313 | 0.800 | 1.85135 | 40.10 |
| 9* | 15.518 | 5.151 | | |
| 10 | 45.483 | 2.700 | 1.92286 | 20.88 |
| 11 | −120.498 | Variable | | |
| 12 (Stop) | ∞ | Variable | | |
| 13* | 19.628 | 4.725 | 1.80610 | 40.88 |
| 14* | −850.000 | 5.541 | | |
| 15 | 28.431 | 0.650 | 1.85478 | 24.80 |
| 16 | 10.174 | 5.150 | 1.49700 | 81.54 |
| 17 | −30.905 | Variable | | |
| 18* | −58.733 | 0.700 | 1.58313 | 59.38 |
| 19* | 11.744 | 3.300 | | |
| 20* | 13.004 | 3.800 | 1.58313 | 59.38 |
| 21* | −850.000 | 3.800 | | |
| 22 | 18.320 | 0.600 | 2.00100 | 29.13 |
| 23 | 8.400 | 5.727 | 1.61800 | 63.40 |
| 24 | −31.484 | 5.870 | | |
| Image plane | ∞ | | | |

Aspherical Surface Data
8th surface
k=0.0000
A4=1.5897e−004, A6=−4.6243e−006, A8=6.0294e−008,
A10=−4.3744e−010, A12=1.4215e−012, A14=0.0000e+000
9th surface
k=0.0000
A4=5.4622e−005, A6=−4.8681e−006, A8=6.2006e−008,
A10=−4.3749e−010, A12=1.3677e−012, A14=0.0000e+000
13th surface
k=0.0000
A4=−8.0152e−007, A6=−3.4395e−007, A8=9.0517e−009,
A10=−1.4953e−010, A12=9.3464e−013, A14=0.0000e+000

14th surface
k=0.0000
A4=2.4705e-005, A6=-4.0759e-007, A8=1.0962e-008, A10=-2.0152e-010, A12=1.4434e-012, A14=0.0000e+000
18th surface
k=0.0000
A4=1.5541e-004, A6=-6.7393e-006, A8=2.3846e-007, A10=-5.0744e-009, A12=5.5675e-011, A14=0.0000e+000
19th surface
k=0.0000
A4=0.4156e-004, A6=-9.5105e-006, A8=3.6964e-007, A10=-8.9290e-009, A12=1.0492e-010, A14=0.0000e+000
20th surface
k=0.0000
A4=2.1326e-005, A6=-1.5883e-006, A8=2.2701e-008, A10=-3.9311e-010, A12=1.3883e-012, A14=0.0000e+000
21th surface k=0.0000
A4=8.9785e-005, A6=-2.2240e-006, A8=4.2912e-008, A10=-8.1741e-010, A12=4.8550e-012, A14=0.0000e+000

Zoom Data

|     | WE      | ST      | TE      |
| --- | ------- | ------- | ------- |
| f   | 3.920   | 12.513  | 53.868  |
| FNO.| 1.702   | 2.246   | 3.635   |
| 2ω  | 88.0    | 30.9    | 7.4     |
| IH  | 3.57    | 3.57    | 3.57    |
| LTL | 135.268 | 121.687 | 131.637 |
| BF  | 5.870   | 5.870   | 5.870   |
| d5  | 0.702   | 19.945  | 37.993  |
| d11 | 42.422  | 9.598   | 1.500   |
| d12 | 21.680  | 15.215  | 1.200   |
| d17 | 1.807   | 8.272   | 22.287  |

Unit Focal Length
f1=69.5426 f2=-10.66131 f3=21.0955 f4=-16.72209 f5=22.00062 f6=35.18716

EXAMPLE 5

Unit mm

Surface Data

| Surface no. | r        | d        | nd      | vd    |
| ----------- | -------- | -------- | ------- | ----- |
| Object plane| ∞        | ∞        |         |       |
| 1           | 96.913   | 1.600    | 1.92119 | 23.96 |
| 2           | 35.025   | 6.931    | 1.51633 | 64.14 |
| 3           | 275.273  | 0.250    |         |       |
| 4           | 42.405   | 4.600    | 1.91082 | 35.25 |
| 5           | 264.575  | Variable |         |       |
| 6           | 264.575  | 0.950    | 1.78800 | 47.37 |
| 7           | 10.900   | 5.812    |         |       |
| 8*          | -120.313 | 0.800    | 1.85135 | 40.10 |
| 9*          | 15.518   | 5.151    |         |       |
| 10          | 45.483   | 2.700    | 1.92286 | 20.88 |
| 11          | -120.498 | Variable |         |       |
| 12 (Stop)   | ∞        | Variable |         |       |
| 13*         | 19.628   | 4.725    | 1.80610 | 40.88 |
| 14*         | -850.000 | 5.541    |         |       |
| 15          | 28.431   | 0.650    | 1.85478 | 24.80 |
| 16          | 10.174   | 5.150    | 1.49700 | 81.54 |
| 17          | -30.905  | Variable |         |       |
| 18*         | -58.733  | 0.700    | 1.58313 | 59.38 |

-continued

| Surface no. | r        | d        | nd      | vd    |
| ----------- | -------- | -------- | ------- | ----- |
| 19*         | 11.744   | Variable |         |       |
| 20*         | 13.004   | 3.800    | 1.58313 | 59.38 |
| 21          | -25.125  | 0.500    | 1.60562 | 43.70 |
| 22          | -850.000 | 3.500    |         |       |
| 23          | 18.320   | 0.600    | 2.00100 | 29.13 |
| 24          | 8.400    | 5.727    | 1.63854 | 55.38 |
| 25          | -31.484  | 1.986    |         |       |
| 26          | ∞        | 0.500    | 1.51633 | 64.14 |
| 27          | ∞        | 3.500    |         |       |
| Image plane | ∞        |          |         |       |

Aspherical Surface Data
8th surface
k=0.0000
A4=1.5897e-004, A6=-4.6243e-006, A8=6.0294e-008, A10=-4.3744e-010, A12=1.4215e-012, A14=0.0000e+000
9th surface
k=0.0000
A4=5.4622e-005, A6=-4.8681e-006, A8=6.2006e-008, A10=-4.3749e-010, A12=1.3677e-012, A14=0.0000e+000
13th surface
k=0.0000
A4=-8.0152e-007, A6=-3.4395e-007, A8=9.0517e-009, A10=-1.4953e-010, A12=9.3464e-013, A14=0.0000e+000
14th surface
k=0.0000
A4=2.4705e-005, A6=-4.0759e-007, A8=1.0962e-008, A10=-2.0152e-010, A12=1.4434e-012, A14=0.0000e+000
18th surface
k=0.0000
A4=1.5541e-004, A6=-6.7393e-006, A8=2.3846e-007, A10=-5.0744e-009, A12=5.5675e-011, A14=0.0000e+000
19th surface
k=0.0000
A4=1.4156e-004, A6=-9.5105e-006, A8=3.6964e-007, A10=-8.9290e-009, A12=1.0492e-010, A14=0.0000e+000
20th surface
k=0.0000
A4=-4.0000e-005, A6=-8.0000e-007, A8=2.4500e-008, A10=-4.0300e-010, A12=1.6334e-012, A14=9.5550e-015

Zoom Data

|     | WE       | ST       | TE       |
| --- | -------- | -------- | -------- |
| f   | 3.858    | 13.681   | 54.586   |
| FNO.| 1.616    | 2.718    | 3.743    |
| 2ω  | 93.6     | 31.6     | 8.1      |
| IH  | 3.90     | 3.90     | 3.90     |
| LTL | 135.4117 | 135.4117 | 135.4117 |
| BF  | 3.500    | 3.500    | 3.500    |
| d5  | 0.701    | 19.946   | 37.993   |
| d11 | 38.792   | 19.547   | 1.500    |
| d12 | 25.310   | 5.263    | 1.201    |
| d17 | 1.806    | 8.048    | 22.220   |
| d19 | 3.300    | 17.105   | 6.995    |

Unit Focal Length
f1=69.5426 f2=−10.66131 f3=21.0955 f4=−16.72209 f5=22.3873 f6=31.96736

EXAMPLE 6

Unit mm

Surface Data

| Surface no. | r | d | nd | vd |
|---|---|---|---|---|
| Object plane | ∞ | ∞ | | |
| 1 | 79.517 | 1.100 | 2.00330 | 28.27 |
| 2 | 45.491 | 6.851 | 1.43700 | 95.10 |
| 3 | −687.604 | 0.100 | | |
| 4 | 50.578 | 4.150 | 1.49700 | 81.54 |
| 5 | 555.118 | 0.100 | | |
| 6 | 29.923 | 4.250 | 1.59282 | 68.63 |
| 7 | 76.911 | Variable | | |
| 8 | 150.040 | 0.650 | 1.88202 | 37.22 |
| 9* | 5.666 | 4.069 | | |
| 10 | −13.844 | 0.700 | 1.88300 | 40.76 |
| 11 | 334.372 | 0.100 | | |
| 12 | 21.015 | 1.900 | 1.95906 | 17.47 |
| 13 | −68.494 | Variable | | |
| 14 (Stop) | ∞ | 0.800 | | |
| 15* | 16.100 | 6.517 | 1.49700 | 81.54 |
| 16* | −18.939 | 0.144 | | |
| 17 | 30.290 | 0.800 | 1.95906 | 17.47 |
| 18 | 20.553 | 5.602 | 1.59282 | 68.63 |
| 19 | −23.052 | 0.830 | | |
| 20* | −62.097 | 0.600 | 1.69680 | 55.53 |
| 21* | 14.000 | Variable | | |
| 22* | 11.683 | 2.600 | 1.49700 | 81.54 |
| 23* | −38.228 | Variable | | |
| 24 | −50.000 | 0.500 | 1.65412 | 39.68 |
| 25 | 5.000 | 3.917 | 1.53775 | 74.70 |
| 26 | −18.511 | 2.794 | | |
| Image plane | ∞ | | | |

Aspherical Surface Data
8th surface
k=0.0000
A4=1.4563e−004, A6=−8.1300e−006, A8=2.4155e−007, A10=−4.3334e−009, A12=3.2588e−011, A14=0.0000e+000
9th surface
k=0.0000
A4=4.2136e−005, A6=−2.1915e−005, A8=9.8346e−007, A10=−3.7075e−008, A12=−8.9279e−011, A14=0.0000e+000
15th surface
k=0.0000
A4=−6.8790e−005, A6=−9.3832e−008, A8=3.1300e−010, A10=−1.0048e−012
16th surface
k=0.0000
A4=1.1899e−004, A6=−4.1425e−007, A8=3.6636e−009, A10=−5.2358e−012, A12=0.0000e+000, A14=0.0000e+000
20th surface
k=0.0000
A4=1.4274e−004, A6=−3.1072e−006, A8=7.8038e−008, A10=−8.8650e−010, A12=7.2486e−012, A14=−5.0943e−014
21th surface
k=0.0000
A4=6.8931e−005, A6=−1.5697e−006, A8=1.3021e−008, A10=8.2153e−010, A12=8.8275e−012, A14=−3.6668e−013
22th surface
k=0.0000
A4=−5.9011e−005, A6=−1.2149e−007, A8=−1.4798e−007, A10=0.0000e+000, A12=0.0000e+000, A14=0.0000e+000
23th surface
k=0.0000
A4=7.2308e−005, A6=1.6790e−006, A8=−3.2715e−007, A10=4.4426e−009, A12=0.0000e+000, A14=0.0000e+000

Zoom Data

| | WE | ST | TE |
|---|---|---|---|
| f | 4.351 | 24.502 | 109.997 |
| FNO. | 1.258 | 2.799 | 4.475 |
| 2ω | 76.6 | 15.0 | 3.3 |
| IH | 3.30 | 3.30 | 3.30 |
| LTL | 94.333 | 94.333 | 94.333 |
| BF | 2.794 | 2.794 | 2.794 |
| d7 | 0.412 | 23.766 | 32.083 |
| d13 | 33.048 | 9.694 | 1.377 |
| d21 | 9.731 | 2.989 | 10.014 |
| d23 | 2.068 | 8.810 | 1.785 |

Unit Focal Length
f1=45.45958 f2=−6.61814 f3=12.30182 f4=−16.3426 f5=18.32165 f6=−218.10859

Next, the following is values of the conditional expressions in each of the examples. The values described in the following item (1) correspond to the value of Conditional Expression (1-1). The values described in the following item (27) correspond to the value of Conditional Expression (27-1). The values described in the following item (30) correspond to the value of Conditional Expression (30-1).

| | Example 1 | Example 2 | Example 3 |
|---|---|---|---|
| (1)DG5G6aw/fG5 | 0.167 | 0.056 | 0.173 |
| (2)ΔSS/LTLw | 0 | 0 | 0 |
| (3)\|fG2/fw\| | 2.362 | 2.520 | 2.720 |
| (4)fG2 × PG1G2a | 0.008 | 0.035 | 0.000 |
| (5)(LTLt − LTLw)/LTLw | 0.000 | 0.000 | 0.000 |
| (6)fG1/fw | 14.626 | 14.325 | 17.741 |
| (7)fG1/ft | 1.004 | 1.280 | 1.254 |
| (8)\|fG1/fG2\| | 6.192 | 5.684 | 6.523 |
| (9)fG3/fw | 3.799 | 3.860 | 5.382 |
| (10)DTw | −4.03 | −8.01 | −4.75 |
| (11)vdG3P1 | 81.54 | 68.63 | 81.54 |
| (12)vdG4N1 | 64.14 | 81.54 | 59.38 |
| (13)SFG4 | 0.444 | 0.074 | 0.667 |
| (14)fG5/fG56w | 0.985 | 1.206 | 1.387 |
| (15)\|fG5/fG4\| | 0.825 | 1.023 | 1.316 |
| (16)DG56aw/fG56w | 0.164 | 0.068 | 0.240 |
| (17)DG56aw/fw | 0.547 | 0.202 | 0.969 |
| (18)\|MGG4backw × (MGG4w − 1)\| | 0.795 | 0.809 | 0.878 |
| (19)vdG5P | 67.02 | 81.54 | 59.38 |
| (20)vdG6N | 20.88 | 18.9 | 29.13 |
| (21)fG1/fG3 | 3.85 | 3.712 | 3.297 |
| (22)\|fG3/fG4\| | 0.955 | 1.092 | 1.262 |
| (23)fG2/fG4 | 0.594 | 0.713 | 0.638 |
| (24)\|fG2/fG3\| | 0.622 | 0.653 | 0.505 |
| (25)fG1 × PG1NPa | 0.000 | 0.000 | 0.000 |
| (26)fG5/fw | 3.284 | 3.616 | 5.613 |
| (27)SFG5 | 0.267 | 0.100 | −0.970 |
| (28)ΩHw/2 | 39.260 | 39.314 | 43.045 |
| (29)ft/fw | 14.571 | 11.190 | 14.148 |
| (30)FNOw | 1.417 | 1.634 | 1.642 |
| (31)FNOt | 3.630 | 1.972 | 3.803 |

-continued

|  | Example 1 | Example 2 | Example 3 |
|---|---|---|---|
| (32)ft/fw + 143.9 × tan(ΩHw/2) − 121.88 | 10.3 | 7.1 | 26.7 |
| (33)ft/fw + 126.52 × tan(ΩHw/2) − 101.91 | 16.1 | 12.9 | 30.4 |
| (34)ft/fw + 13.38 × tan(ΩHw/2) − 21.0 | 4.5 | 1.1 | 5.6 |
| (35)ft/fw + 80.72 × tan(ΩHw/2) − 62.0 | 18.5 | 15.3 | 27.5 |
| (36)ΣG1/LTLw | 0.156 | 0.150 | 0.099 |
| (37)|fG5/fG6| | 0.034 | 0.217 | 0.625 |
| (38)Rimg | 3.600 | 3.414 | 4.000 |

|  | Example 4 | Example 5 | Example 6 |
|---|---|---|---|
| (1)DG5G6aw/fG5 | 0.173 | 0.156 | 0.113 |
| (2)ΔSS/LTLw | 0 | 0 | 0 |
| (3)|fG2/fw| | 2.720 | 2.763 | 1.521 |
| (4)fG2 × PG1G2a | 0.000 | 0.000 | −0.042 |
| (5)(LTLt − LTLw)/LTLw | −0.027 | 0.000 | 0.000 |
| (6)fG1/fw | 17.741 | 18.025 | 10.448 |
| (7)fG1/ft | 1.291 | 1.274 | 0.413 |
| (8)|fG1/fG2| | 6.523 | 6.523 | 6.869 |
| (9)fG3/fw | 5.382 | 5.468 | 2.827 |
| (10)DTw | −5.77 | −5.12 | −4.04 |
| (11)vdG3P1 | 81.54 | 81.54 | 81.54 |
| (12)vdG4N1 | 59.38 | 59.38 | 55.53 |
| (13)SFG4 | 0.667 | 0.667 | 0.632 |
| (14)fG5/fG56w | 1.387 | 1.441 | 0.855 |
| (15)|fG5/fG4| | 1.316 | 1.339 | 1.121 |
| (16)DG56aw/fG56w | 0.240 | 0.225 | 0.097 |
| (17)DG56aw/fw | 0.969 | 0.907 | 0.475 |
| (18)|MGG4backw × (MGG4w − 1)| | 0.878 | 0.864 | 0.944 |
| (19)vdG5P | 59.38 | 59.38 | 81.54 |
| (20)vdG6N | 29.13 | 29.13 | 39.68 |
| (21)fG1/fG3 | 3.297 | 3.297 | 3.695 |
| (22)|fG3/fG4| | 1.262 | 1.262 | 0.753 |
| (23)fG2/fG4 | 0.638 | 0.638 | 0.405 |
| (24)|fG2/fG3| | 0.505 | 0.505 | 0.538 |
| (25)fG1 × PG1NPa | 0.000 | 0.000 | 0.000 |
| (26)fG5/fw | 5.612 | 5.803 | 4.211 |
| (27)SFG5 | −0.970 | −0.970 | −0.532 |
| (28)ΩHw/2 | 40.116 | 42.887 | 34.570 |
| (29)ft/fw | 13.742 | 14.148 | 25.281 |
| (30)FNOw | 1.702 | 1.616 | 1.258 |
| (31)FNOt | 3.635 | 3.743 | 4.475 |
| (32)ft/fw + 143.9 × tan(ΩHw/2) − 121.88 | 13.1 | 25.9 | 2.6 |
| (33)ft/fw + 126.52 × tan(ΩHw/2) − 101.91 | 18.4 | 29.8 | 10.6 |
| (34)ft/fw + 13.38 × tan(ΩHw/2) − 21.0 | 4.0 | 5.6 | 13.5 |
| (35)ft/fw + 80.72 × tan(ΩHw/2) − 62.0 | 19.8 | 27.1 | 18.9 |
| (36)ΣG1/LTLw | 0.099 | 0.099 | 0.176 |
| (37)|fG5/fG6| | 0.625 | 0.700 | 0.084 |
| (38)Rimg | 3.570 | 3.900 | 3.300 |

Figure 13:
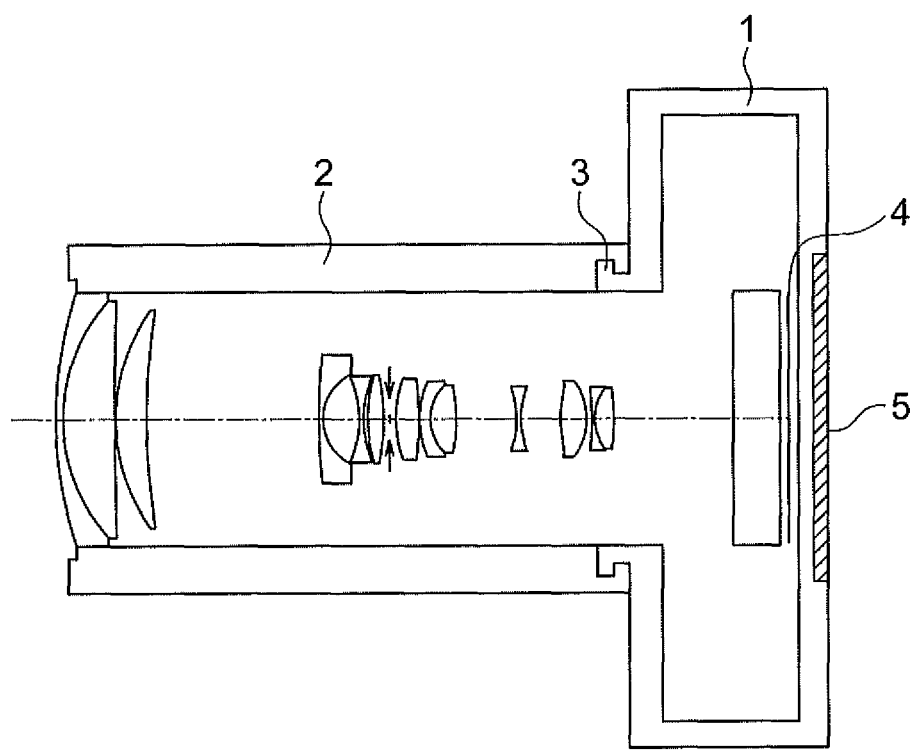
FIG. 13 is a cross-sectional view of an image pickup apparatus.

FIG. 13 is a cross-sectional view of a single-lens mirrorless camera as an electronic image pickup apparatus. In FIG. 13, a photographic optical system 2 cab be disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount can be used. In this example, a bayonet-type mount is used. Moreover, an image pickup element surface 4 and a back monitor 5 can be disposed in the body of the single-lens mirrorless camera 1. As an image pickup element, an element such as a small-size CCD (charge coupled device) or a CMOS (complementary metal-oxide semiconductor) can be used.

Moreover, as the photographic optical system 2 of the single-lens mirrorless camera 1, the variable magnification optical system described in any one of the examples from the first example to the sixth example can be used.

Figure 14:
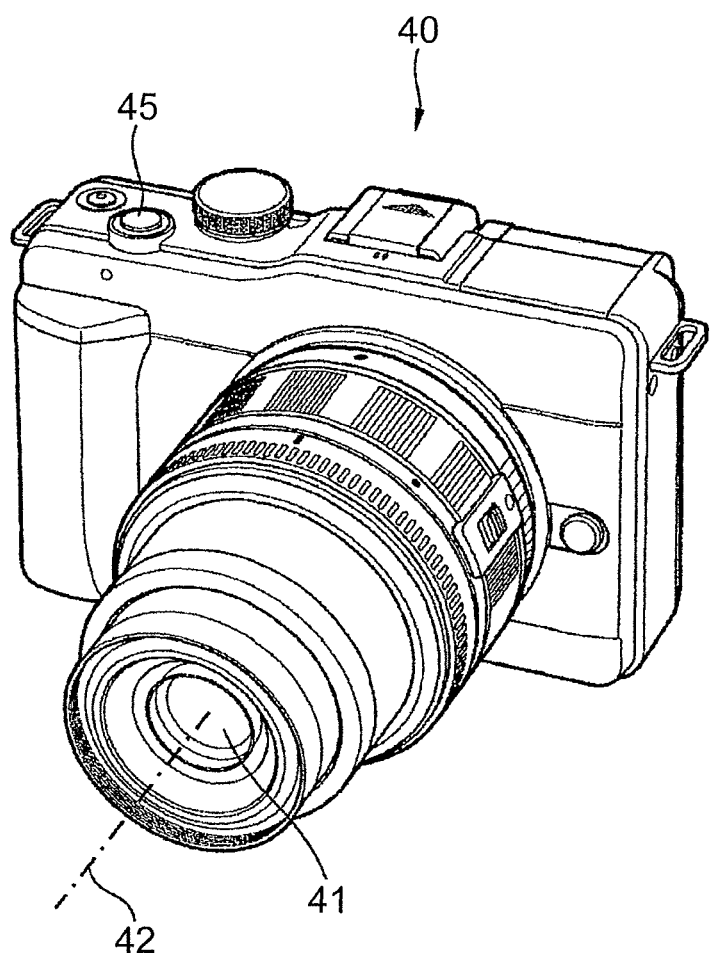
FIG. 14 is a front perspective view of the image pickup apparatus.
Figure 15:
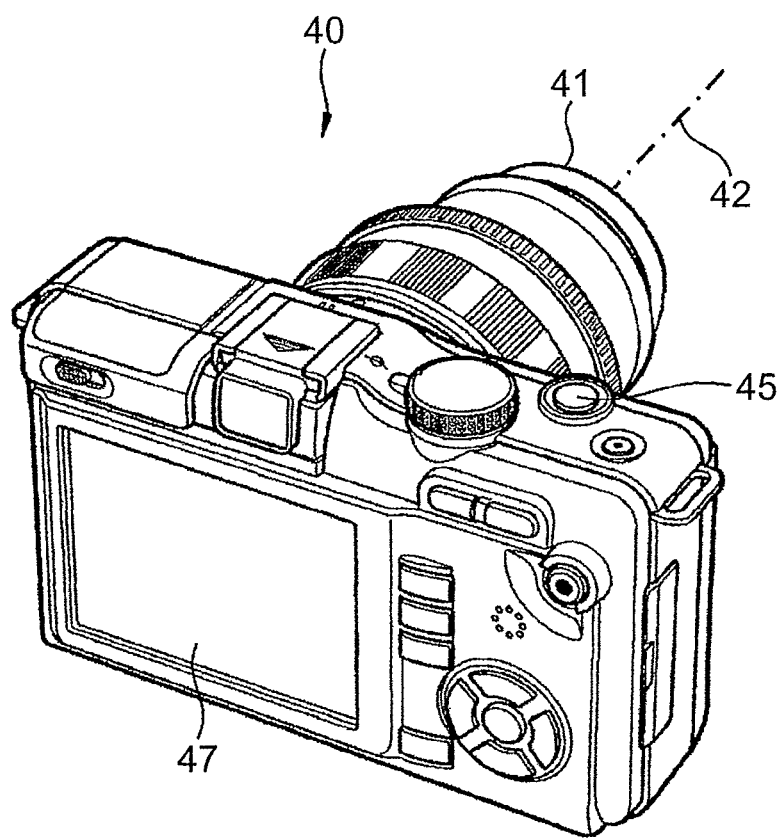
FIG. 15 is a rear perspective view of the image pickup apparatus.

FIG. 14 and FIG. 15 are conceptual diagrams of an arrangement of the image pickup apparatus. FIG. 14 is a front perspective view of a digital camera 40 as the image pickup apparatus, and FIG. 15 is a rear perspective view of the digital camera 40. The variable magnification optical system according to the present example can be used in a photographic optical system 41 of the digital camera 40.

The digital camera 40 according to the present embodiment can include the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography can be carried out by the photographic optical system 41 such as the variable magnification optical system according to the first example. An object image which is formed by the photographic optical system 41 can be formed on an image pickup element (photoelectric conversion surface) which is provided near an image forming surface. The object image which has been received optically by the image pickup element can be displayed on the liquid-crystal display monitor 47 which is provided to a rear surface of the camera, as an electronic image by a processor. Moreover, it is possible to record the electronic image which has been photographed, in a storage means.

Figure 16:
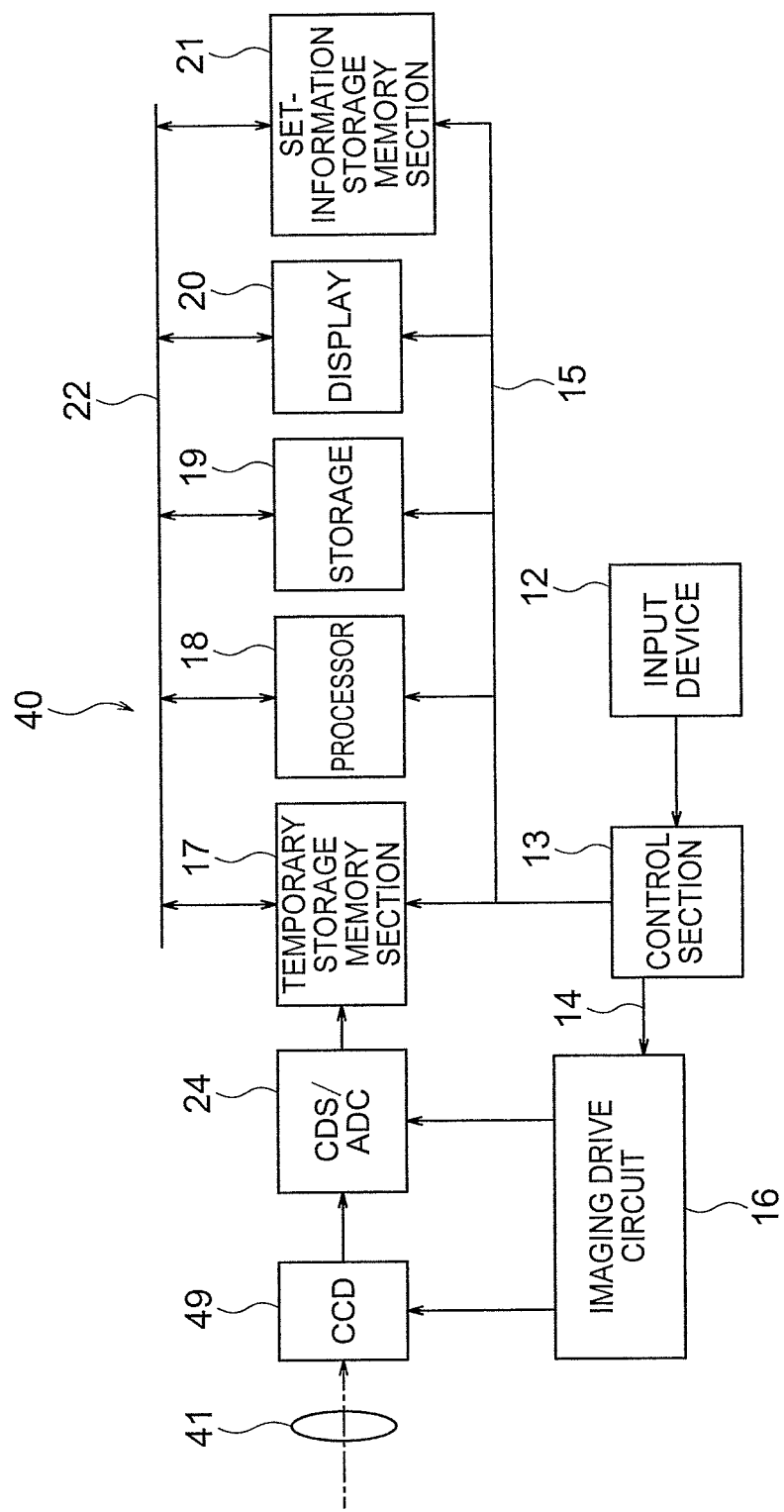
FIG. 16 is a structural block diagram of an internal circuit of a main part of the image pickup apparatus.

FIG. 16 is a structural block diagram of an internal circuit of main components of the digital camera 40. In the following description, the processor described above can include for instance, a CDS/ADC section 24, a temporary storage memory 117, and a processor 18, and a memory can consist of a storage 19 for example.

As shown in FIG. 16, the digital camera 40 can include an input device 12, a control section 13 which is connected to the input device 12, the temporary storage memory 17 and an imaging drive circuit 16 which are connected to a control-signal output port of the control section 13, via a bus 14 and a bus 15, the processor 18, the storage 19, a display 20, and a set-information storage memory section 21.

The temporary storage memory 17, the processor 18, the storage 19, the display 20, and the set-information storage memory section 21 are structured to be capable of mutually inputting and outputting data via a bus 22. Moreover, the CCD 49 and the CDS/ADC section 24 can be connected to the imaging drive circuit 16.

The input device 12 can include various input buttons and switches, and can inform the control section 13 of event information which is input from outside (by a user of the digital camera) via these input buttons and switches. The control section 13 is a central processing unit (CPU), and can include a built-in computer program memory which is not shown in the diagram. The control section 13 can control the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and can output to the CDS/ADC section 24, The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 can be a buffer which includes an SDRAM (Synchronous Dynamic Random Access Memory) for example, and can be a memory device which stores temporarily the RAW data which is output from the CDS/ADC section 24. The processor 18 is a circuit which reads the RAW data stored in the temporary storage memory 17, or the RAW data stored in the storage 19, and carries out electrically various image-processing including the distortion correction, based on image-quality parameters specified by the control section 13.

The storage 19 is a recording medium in the form of a card or a stick including a flash memory for instance, detachably mounted. The storage 19 can record and maintain the RAW data transferred from the temporary storage memory 17 and image data subjected to image processing in the processor 18 in the card flash memory and the stick flash memory.

The display 20 includes the liquid-crystal display monitor, and can display photographed RAW data, image data and operation menu on the liquid-crystal display monitor. The set-information storage memory section 21 can include a ROM section in which various image quality parameters are stored in advance, and a RAM section which stores image quality parameters which are selected by an input operation on the operating section 12, from among the image quality parameters which are read from the ROM section.

Figure 17:
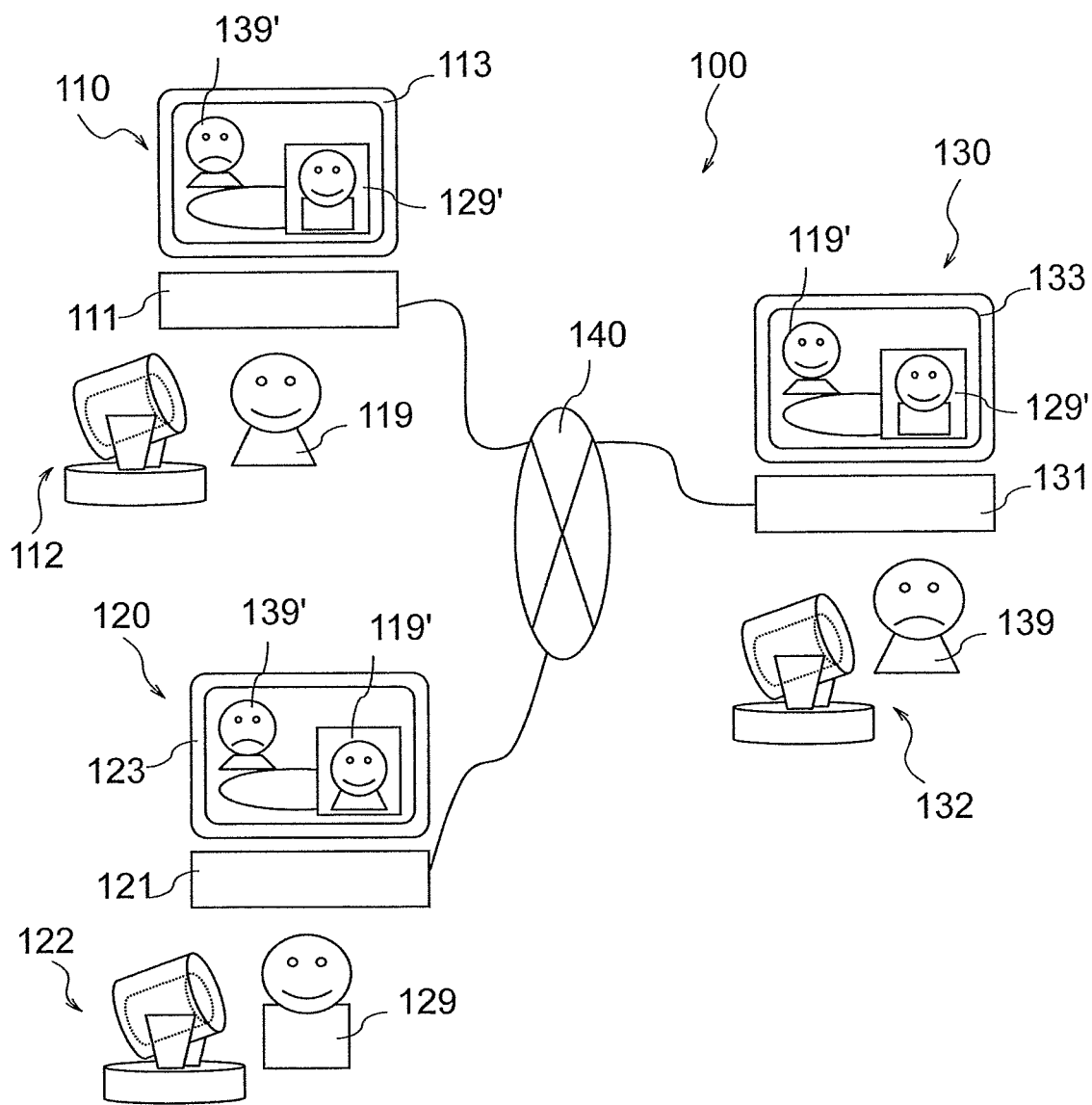
FIG. 17 is a diagram illustrating an arrangement of a television conference system.

FIG. 17 shows an arrangement of a television conference system. The television conference system 100 can include a plurality of television conference apparatuses 110, 120, and 130. Moreover, each of the television conference apparatuses 110, 120, and 130 is can be connected to a network such as a wide area network (WAN) 140.

The television conference apparatus 110 can include a main unit 111, a camera 112, and a display 113. Similarly, the television conference apparatus 120 and the television conference apparatus 130 can include same units. The camera 112 can include variable magnification optical system of example 1 and an image pickup sensor. Photography of conference participants and conference material can be carried out by the image pickup sensor.

The television conference apparatuses 110, 120, and 130 can be disposed at bases (remote places) which are mutually isolated. Therefore, image of each of conference participant 119, 129, 139 can be transmitted to a television conference apparatus used by other conference participants, via the wide area network (WAN) 140. As a result, an image 129' of the conference participants 129 and an image 139' of the conference participants 139 can be displayed on the display 113. Moreover, an audio can be also transmitted together with the transmission of images. Concerning the display 123 and the display 133, display is performed as with the display 113.

In such manner, by using the television conference system 100, even when the bases are remote places, each of the conference participants 119, 129, and 139 is able to get on with the meeting while watching and listening to other conference participants. A television conference apparatus to be used at each base is not necessarily required to be the same apparatus.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

The present invention can provide a variable magnification optical system securing a wide angle of view at the wide angle end and a small F-number, and having favorably corrected aberrations, and an image pickup apparatus using the same.

As described above, the present invention is suitable for a variable magnification optical system securing a wide angle of view at the wide angle end and a small F-number, and having favorably corrected aberrations, and an image pickup apparatus using the same.

What is claimed is:

1. A variable magnification optical system comprising: sequentially from an object side,
a first lens unit having a positive refractive power;
a second lens unit having a negative refractive power;
a third lens unit having a positive refractive power;
a fourth lens unit; and
a fifth lens unit having a positive refractive power,
wherein:
each of the lens units makes a different movement relatively to a lens unit that is adjacently positioned at least at one of a time of changing magnification, a time of focusing, and a time of image stabilization,
the fourth lens unit is moved in a direction orthogonal to an optical axis, and
the following Conditional Expression (34) is satisfied:

$$-2.0 \leq ft/fw + 13.38 \times \tan(\Omega Hw/2) - 21.0 \leq 140 \tag{34}$$

where
fw is a focal length of the variable magnification optical system at a wide angle end,
ft is a focal length of the variable magnification optical system at a telephoto end, and
$\Omega Hw$ is a total angle of view in a horizontal direction at the wide angle end.

2. A variable magnification optical system comprising: sequentially from an object side,
a first lens unit having a positive refractive power;
a second lens unit having a negative refractive power;
a third lens unit having a positive refractive power;
a fourth lens unit; and
a fifth lens unit having a positive refractive power,
wherein:
each of the lens units makes a different movement relatively to a lens unit that is adjacently positioned at least at one of a time of changing magnification, a time of focusing, and a time of image stabilization,
the second lens unit is moved in such that a space between the first lens unit and the second lens unit is widened at a telephoto end than at a wide angle end, at a time of focusing to an object at infinity,
the fourth lens unit is moved in a direction orthogonal to an optical axis, and
the following Conditional Expression (33) is satisfied:

$$-1.5 \leq ft/fw + 126.52 \times \tan(\Omega Hw/2) - 101.91 \leq 140 \tag{33},$$

where
fw is a focal length of the variable magnification optical system at the wide angle end,
ft is a focal length of the variable magnification optical system at the telephoto end, and
$\Omega Hw$ is a total angle of view in a horizontal direction at the wide angle end.

3. An image pickup apparatus comprising:
an optical system; and
an image pickup element having an image pickup surface, and converting an image formed on the image pickup surface with the optical system into an electric signal, wherein
the optical system is the variable magnification optical system according to claim 1.

4. A variable magnification optical system comprising: sequentially from an object side,
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
each of the lens units makes a different movement relatively to a lens unit that is adjacently positioned at least at one of a time of changing magnification, a time of focusing, and a time of image stabilization,
the second lens unit is moved such that a space between the first lens unit and the second lens unit is widened at a telephoto end than at a wide angle end, and
the following Conditional Expressions (27-1) and (30-1) are satisfied:

$$-5.0 \leq SFG5 \leq 0.91 \quad (27\text{-}1), \text{ and}$$

$$0.6 \leq FNOw \leq 1.79 \quad (30\text{-}1)$$

where
SFG5 is expressed by the following Equation:

$$SFG5=(RG5f+RG5r)/(RG5f-RG5r),$$

RG5f is a radius of curvature of a lens surface positioned closest to the object in the fifth lens unit,
RG5r is a radius of curvature of a lens surface positioned closest to an image in the fifth lens unit, and
FNOw is an F-number at the wide angle end.

5. A variable magnification optical system comprising: sequentially from an object side,
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
each of the lens units makes a different movement relatively to a lens unit that is adjacently positioned at least at one of a time of changing magnification, a time of focusing, and a time of image stabilization,
the second lens unit is moved such that a space between the first lens unit and the second lens unit is widened at a telephoto end than at a wide angle end, and
the following Conditional Expressions (28), (29), and (30-1) are satisfied:

$$26.9° \leq \Omega Hw/2 \leq 75° \quad (28),$$

$$5.5 \leq ft/fw \leq 120 \quad (29), \text{ and}$$

$$0.6 \leq FNOw \leq 1.79 \quad (30\text{-}1)$$

where
ΩHw is a total angle of view in the horizontal direction at the wide angle end,
ft is a focal length of the variable magnification optical system at the telephoto end,
fw is a focal length of the variable magnification optical system at the wide angle end, and
FNOw is an F-number at the wide angle end.

6. A variable magnification optical system comprising: sequentially from an object side,
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
each of the lens units makes a different movement relatively to a lens unit that is adjacently positioned at least at one of a time of changing magnification, a time of focusing, and a time of image stabilization,
the second lens unit is moved such that a space between the first lens unit and the second lens unit is widened at a telephoto end than at a wide angle end,
the fourth lens unit is moved in a direction orthogonal to an optical axis, and
the following Conditional Expressions (29) and (30-1) are satisfied:

$$5.5 \leq ft/fw \leq 120 \quad (29), \text{ and}$$

$$0.6 \leq FNOw \leq 1.79 \quad (30\text{-}1)$$

where
ft is a focal length of the variable magnification optical system at the telephoto end,
fw is a focal length of the variable magnification optical system at the wide angle end, and
FNOw is an F-number at the wide angle end.

7. An image pickup apparatus comprising:
an optical system; and
an image pickup element having an image pickup surface, and converting an image formed on the image pickup surface with the optical system into an electric signal, wherein
the optical system is the variable magnification optical system according to claim 4.

8. A variable magnification optical system comprising: sequentially from an object side,
a first lens unit having a positive refractive power;
a second lens unit having a negative refractive power;
a third lens unit having a positive refractive power;
a fourth lens unit having a negative refractive power;
a fifth lens unit having a positive refractive power; and
a sixth lens unit,
wherein:
the sixth lens unit includes a negative lens and a positive lens,
each of the lens units makes a different movement relatively to a lens unit that is adjacently positioned at least at one of a time of changing magnification, a time of focusing, and a time of image stabilization,
the second lens unit is moved in such a manner that a larger distance is ensured between the first lens unit and the second lens unit at a telephoto end than at a wide angle end,
the aperture stop is positioned between a lens surface positioned closest to an image in the second lens unit and a lens surface positioned closest to the image in the third lens unit, or is adjacently positioned to a lens surface positioned closest to the image in the third lens unit,
the fourth lens unit is fixed at a time of changing magnification,
the fourth lens unit is moved in a direction orthogonal to an optical axis, and the following Conditional Expression (1) is satisfied:

$$0.012 \leq DG5G6aw/fG5 \leq 5.0 \quad (1)$$

where

DG5G6aw is an air space between the fifth lens unit and the sixth lens unit at the wide angle end, and fG5 is a focal length of the fifth lens unit.

9. A variable magnification optical system comprising: sequentially from an object side, a first lens unit having a positive refractive power;

a second lens unit having a negative refractive power;

a third lens unit having a positive refractive power;

a fourth lens unit having a negative refractive power;

a fifth lens unit having a positive refractive power; and a sixth lens unit, wherein:

the sixth lens unit includes a negative lens and a positive lens, each of the lens units makes a different movement relatively to a lens unit that is adjacently positioned at least at one of a time of changing magnification, a time of focusing, and a time of image stabilization, the second lens unit is moved in such a manner that a larger distance is ensured between the first lens unit and the second lens unit at a telephoto end than at a wide angle end, the aperture stop is positioned between a lens surface positioned closest to an image in the second lens unit and a lens surface positioned closest to the image in the third lens unit, or is adjacently positioned to a lens surface positioned closest to the image in the third lens unit, the sixth lens unit is fixed at a time of changing magnification, and the following Conditional Expression (1-1) is satisfied:

$$0.014 \leq DG5G6aw/fG5 \leq 5.0 \quad (1\text{-}1)$$

where

DG5G6aw is an air space between the fifth lens unit and the sixth lens unit at the wide angle end, and fG5 is a focal length of the fifth lens unit.

10. The variable magnification optical system according to claim 8, wherein the sixth lens unit is fixed at a time of changing magnification.

11. The variable magnification optical system according to claim 8, wherein the fifth lens unit is moved in at least one of a direction along the optical axis and a direction orthogonal to the optical axis.

12. The variable magnification optical system according to claim 8, wherein a whole length of the variable magnification optical system is kept constant at a time of changing magnification.

13. The variable magnification optical system according to claim 8, wherein the following Conditional Expression (2) is satisfied:

$$0.0 \leq \Delta SS/LTLw \leq 0.11 \quad (2)$$

where $\Delta SS$ is a maximum amount of movement of the aperture stop at a time of changing magnification, and LTLw is a whole length of the variable magnification optical system at the wide angle end.

14. The variable magnification optical system according to claim 8, wherein the following Conditional Expression (3) is satisfied:

$$1.30 \leq |fG2/fw| \leq 4.50 \quad (3)$$

where fG2 is a focal length of the second lens unit, and fw is a focal length of the variable magnification optical system at the wide angle end.

15. The variable magnification optical system according to claim 8, wherein the following Conditional Expression (4) is satisfied:

$$-0.065 \leq fG2 \times PG1G2a \leq 0.190 \quad (4)$$

where

PG1G2a is expressed by the following Equation:

$$PG1G2a = 1/RG1B - 1/RG2F,$$

RG1B is a radius of curvature of a lens surface positioned closest to the image in the first lens unit, and RG2F is a radius of curvature of a lens surface positioned closest to the object in the second lens unit.

16. The variable magnification optical system according to claim 8, wherein the following Conditional Expression (5) is satisfied:

$$-0.11 \leq (LTLt - LTLw)/LTLw \leq 0.11 \quad (5)$$

where

LTLt is a whole length of the variable magnification optical system at the telephoto end, and LTLw is a whole length of the variable magnification optical system at the wide angle end.

17. The variable magnification optical system according to claim 8, wherein the following Conditional Expression (6) is satisfied:

$$4.0 \leq fG1/fw \leq 35 \quad (6)$$

where fG1 is a focal length of the first lens unit, and fw is a focal length of the variable magnification optical system at the wide angle end.

18. The variable magnification optical system according to claim 8, wherein the following Conditional Expression (7) is satisfied:

$$0.30 \leq fG1/ft \leq 2.5 \quad (7)$$

where fG1 is a focal length of the first lens unit, and ft is a focal length of the variable magnification optical system at the telephoto end.

19. The variable magnification optical system according to claim 8, wherein the following Conditional Expression (8) is satisfied:

$$3.5 \leq |fG1/fG2| \leq 9.1 \quad (8)$$

where fG1 is a focal length of the first lens unit, and fG2 is a focal length of the second lens unit.

20. The variable magnification optical system according to claim 8, wherein the following Conditional Expression (9) is satisfied:

$$1.0 \leq fG3/fw \leq 8.0 \quad (9)$$

where fG3 is a focal length of the third lens unit, and fw is a focal length of the variable magnification optical system at the wide angle end.

21. The variable magnification optical system according to claim 8, wherein the following Conditional Expression (10) is satisfied:

$$-14\% < DTw < 5\% \quad (10)$$

where

DTw is a distortion amount at a maximum angle of view at the wide angle end, and is indicated with the following Equation:

$$DTw=(IHw1-IHw2)/IHw2\times 100(\%),$$

IHw1 is a real image height when light flux including a ray of the maximum angle of view is imaged on the image surface at the wide angle end, IHw2 is a paraxial image height when light flux including the ray of the maximum angle of view is imaged on the image surface wide angle end, and both of the image heights are obtained at a time of focusing to an infinite object point.

22. The variable magnification optical system according to claim 8, wherein the first lens unit includes a negative lens, and a positive meniscus lens having a convex surface facing the object side.

23. The variable magnification optical system according to claim 8, wherein the first lens unit includes a negative lens and two positive lenses.

24. The variable magnification optical system according to claim 8, wherein the third lens unit includes a positive lens and a negative lens.

25. The variable magnification optical system according to claim 8, wherein the third lens unit is moved so as to be positioned closer to the object at the telephoto end than at the wide angle end.

26. The variable magnification optical system according to claim 8, wherein the third lens unit is fixed at a time of changing magnification.

27. The variable magnification optical system according to claim 8, wherein the third lens unit includes a predetermined positive lens satisfying the following Conditional Expression (11):

$$63\le vdG3P1\le 100 \quad (11)$$

where vdG3P1 is Abbe number of the predetermined positive lens.

28. The variable magnification optical system according to claim 8, wherein:

the third lens unit includes a first positive lens and a cemented lens, and the cemented lens consists of a positive lens and a negative lens.

29. The variable magnification optical system according to claim 8, wherein a relative position between the third lens unit and the fourth lens unit, or a relative position between the fourth lens unit and the fifth lens unit is changed between the wide angle end and the telephoto end.

30. The variable magnification optical system according to claim 8, wherein the fourth lens unit includes a predetermined negative lens satisfying the following Conditional Expression (12):

$$51\le vdG4N1\le 100 \quad (12)$$

where vdG4N1 is Abbe number of the predetermined negative lens.

31. The variable magnification optical system according to claim 8, wherein the following Conditional Expression (13) is satisfied:

$$-1.5\le SFG4\le 1.8 \quad (13)$$

where

SFG4 is expressed by the following Equation:

$$SFG4=(RG4f+RG4r)/(RG4f-RG4r),$$

RG4f is a radius of curvature of a lens surface positioned closest to the object in the fourth lens unit, and RG4r is a radius of curvature of a lens surface positioned closest to the image in the fourth lens unit.

32. The variable magnification optical system according to claim 8, wherein the fourth lens unit consists of one negative lens.

33. The variable magnification optical system according to claim 8, wherein the fifth lens unit is formed of a lens component with no air space.

34. The variable magnification optical system according to claim 8, wherein the sixth lens unit consists of a negative lens and a positive lens.

35. The variable magnification optical system according to claim 8, wherein:

the fifth lens unit consists of one positive lens, and the sixth lens unit consists of one negative lens and one positive lens.

36. The variable magnification optical system according to claim 8, wherein the following Conditional Expression (14) is satisfied:

$$0.5\le fG5/fG56w\le 2.5 \quad (14)$$

where fG5 is a focal length of the fifth lens unit, and fG56w is a composite focal length of the fifth lens unit and the sixth lens unit at the wide angle end.

37. The variable magnification optical system according to claim 8, wherein the following Conditional Expression (15) is satisfied:

$$0.5\le |fG5/fG4|\le 2.5 \quad (15)$$

where fG4 is a focal length of the fourth lens unit, and fG5 is a focal length of the fifth lens unit.

38. The variable magnification optical system according to claim 8, wherein the following Conditional Expression (16) is satisfied:

$$0.026\le DG56aw/fG56w\le 0.4 \quad (16)$$

where

DG56aw is an air space between the fifth lens unit and the sixth lens unit at the wide angle end, and fG56w is a composite focal length of the fifth lens unit and the sixth lens unit at the wide angle end.

39. The variable magnification optical system according to claim 8, wherein the following Conditional Expression (17) is satisfied:

$$0.1\le DG56aw/fw\le 2.0 \quad (17)$$

where

DG56aw is an air space between the fifth lens unit and the sixth lens unit at the wide angle end, and fw is a focal length of the variable magnification optical system at the wide angle end.

40. The variable magnification optical system according to claim 8, wherein the following Conditional Expression (18) is satisfied:

$$0.3\le |MGG4backw\times (MGG4w-1)|\le 1.5 \quad (18)$$

where

MGG4w is a lateral magnification in the fourth lens unit at the wide angle end,

MGG4backw is a lateral magnification in a predetermined optical system at the wide angle end, the predetermined optical system is an optical system including entire lenses that are positioned closer to an image side than the fourth lens unit is, and the lateral magnification is a lateral magnification at a time of focusing to an object at infinity.

41. The variable magnification optical system according to claim 8, wherein:

the fifth lens unit consists of one positive lens, and the following Conditional Expression (19) is satisfied:

$$52 \leq vdG5P \leq 100 \quad (19)$$

where vdG5P is Abbe number of the positive lens in the fifth lens unit.

42. The variable magnification optical system according to claim 8, wherein the following Conditional Expression (20) is satisfied:

$$18.5 \leq vdG6N \leq 50 \quad (20)$$

where vdG6N is minimum Abbe number among Abbe numbers of negative lenses in the sixth lens unit.

43. The variable magnification optical system according to claim 8, wherein the aperture stop is positioned between the second lens unit and the third lens unit.

44. The variable magnification optical system according to claim 8, wherein the aperture stop is fixed at a time of changing magnification.

45. The variable magnification optical system according to claim 8, wherein the following Conditional Expression (21) is satisfied:

$$2.3 \leq fG1/fG3 \leq 7 \quad (21)$$

where fG1 is a focal length of the first lens unit, and fG3 is a focal length of the third lens unit.

46. The variable magnification optical system according to claim 8, wherein the following Conditional Expression (22) is satisfied:

$$0.5 \leq |fG3/fG4| \leq 2.0 \quad (22)$$

where fG3 is a focal length of the third lens unit, and fG4 is a focal length of the fourth lens unit.

47. The variable magnification optical system according to claim 8, wherein the following Conditional Expression (23) is satisfied:

$$0.25 \leq fG2/fG4 \leq 1.5 \quad (23)$$

where fG2 is a focal length of the second lens unit, and fG4 is a focal length of the fourth lens unit.

48. The variable magnification optical system according to claim 8, wherein the following Conditional Expression (24) is satisfied:

$$0.25 \leq |fG2/fG3| \leq 1.5 \quad (24)$$

where fG2 is a focal length of the second lens unit, and fG3 is a focal length of the third lens unit.

49. The variable magnification optical system according to claim 8, wherein:

the first lens unit includes, sequentially from the object side, a negative lens and a positive lens, the positive lens in the first lens unit is in proximity to the negative lens in the first lens unit, and the following Conditional Expression (25) is satisfied:

$$-0.1 \leq fG1 \times PG1NPa \leq 0.27 \quad (25)$$

where fG1 is a focal length of the first lens unit,

PG1NPa is expressed by the following Equation:

$$PG1NPa = 1/RG1NB - 1/RG1PF,$$

RG1NB is a radius of curvature of an image-side lens surface of the negative lens in the first lens unit, and RG1PF is a radius of curvature of an object-side lens surface of the positive lens in the first lens unit.

50. The variable magnification optical system according to claim 8, wherein the following Conditional Expression (26) is satisfied:

$$2.5 \leq fG5/fw \leq 15 \quad (26)$$

where fG5 is a focal length of the fifth lens unit, and fw is a focal length of the variable magnification optical system at the wide angle end.

51. The variable magnification optical system according to claim 8, wherein the following Conditional Expression (27) is satisfied:

$$-1.9 \leq SFG5 \leq 0.95 \quad (27)$$

where

SFG5 is expressed by the following Equation:

$$SFG5 = (RG5f + RG5r)/(RG5f - RG5r), \text{ where}$$

RG5f is a radius of curvature of a lens surface positioned closest to the object in the fifth lens unit, and RG5r is a radius of curvature of a lens surface positioned closest to an image in the fifth lens unit.

52. The variable magnification optical system according to claim 8, wherein the aperture stop is moved only in one direction or fixed, at a time of changing magnification.

53. The variable magnification optical system according to claim 8, wherein the following Conditional Expression (28) is satisfied:

$$26.9° \leq \Omega Hw/2 \leq 75° \quad (28)$$

where $\Omega$Hw is a total angle of view in the horizontal direction at the wide angle end.

54. The variable magnification optical system according to claim 8, wherein the following Conditional Expression (29) is satisfied:

$$5.5 \leq ft/fw \leq 120 \quad (29)$$

where ft is a focal length of the variable magnification optical system at the telephoto end, and fw is a focal length of the variable magnification optical system at the wide angle end.

55. The variable magnification optical system according to claim 8, wherein the following Conditional Expression (30) is satisfied:

$$0.6 \leq FNOw \leq 1.84 \quad (30)$$

where

FNOw is an F-number at the wide angle end.

56. The variable magnification optical system according to claim 8, wherein the following Conditional Expression (31) is satisfied:

$$0.7 \leq FNOt \leq 5.1 \quad (31)$$

where

FNOt is an F-number at the telephoto end.

57. The variable magnification optical system according to claim 8, wherein the following Conditional Expression (32) is satisfied:

$$-20 \leq ft/fw + 143.9 \times \tan(\Omega Hw/2) - 121.88 \leq 140 \quad (32)$$

where fw is a focal length of the variable magnification optical system at the wide angle end, ft is a focal length of the variable magnification optical system at the telephoto end, and ΩHw is a total angle of view in the horizontal direction at the wide-angle.

58. The variable magnification optical system according to claim 8, wherein the following Conditional Expression (33) is satisfied:

$$-1.5 \leq ft/fw + 126.52 \times \tan(\Omega Hw/2) - 101.91 \leq 140 \quad (33)$$

where fw is a focal length of the variable magnification optical system at the wide angle end, ft is a focal length of the variable magnification optical system at the telephoto end, and ΩHw is a total angle of view in the horizontal direction at the wide angle end.

59. The variable magnification optical system according to claim 8, wherein the following Conditional Expression (34) is satisfied:

$$-2.0 \leq ft/fw + 13.38 \times \tan(\Omega Hw/2) - 21.0 \leq 140 \quad (34)$$

where fw is a focal length of the variable magnification optical system at the wide angle end, ft is a focal length of the variable magnification optical system at the telephoto end, and ΩHw is a total angle of view in the horizontal direction at the wide angle end.

60. The variable magnification optical system according to claim 8, wherein the following Conditional Expression (35) is satisfied:

$$-3 \leq ft/fw + 80.72 \times \tan(\Omega Hw/2) - 62.0 \leq 140 \quad (35)$$

where fw is a focal length of the variable magnification optical system at the wide angle end, ft is a focal length of the variable magnification optical system at the telephoto end, and ΩHw is a total angle of view in the horizontal direction at the wide angle end.

61. The variable magnification optical system according to claim 8, further comprising a positive lens and a negative lens between the fifth lens unit and an image plane.

62. The variable magnification optical system according to claim 8, wherein the following Conditional Expression (36) is satisfied:

$$0.04 \leq \Sigma G1/LTLw \leq 0.33 \quad (36)$$

where

ΣG1 is a thickness of the first lens unit, and

LTLw is a whole length of the variable magnification optical system at the wide angle end.

63. The variable magnification optical system according to claim 8, wherein the fourth lens unit and the fifth lens unit are both moved at a time of focusing.

64. The variable magnification optical system according to claim 8, wherein the following Conditional Expression (37) is satisfied:

$$0.01 \leq |fG5/fG6| \leq 3.0 \quad (37)$$

where fG5 is a focal length of the fifth lens unit, and fG6 is a focal length of the sixth lens unit.

65. An image pickup apparatus comprising:

an optical system; and an image pickup element having an image pickup surface, and converting an image formed on the image pickup surface with the optical system into an electric signal, wherein the optical system is the variable magnification optical system according to claim 8.

* * * * *